(12) United States Patent
Knatt

(10) Patent No.: US 12,326,289 B2
(45) Date of Patent: Jun. 10, 2025

(54) METHOD OF SERVICING AN ICE MAKER SENSOR

(71) Applicant: True Manufacturing Co., Inc., O'Fallon, MO (US)

(72) Inventor: Kevin Knatt, St. Louis, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 0 days.

(21) Appl. No.: 18/630,070

(22) Filed: Apr. 9, 2024

(65) Prior Publication Data

US 2024/0271848 A1 Aug. 15, 2024

Related U.S. Application Data

(62) Division of application No. 16/823,002, filed on Mar. 18, 2020, now Pat. No. 11,519,652, and a division of application No. 18/052,095, filed on Nov. 2, 2022, now Pat. No. 11,982,484.

(51) Int. Cl.
*F25C 5/187* (2018.01)
*F25C 1/045* (2018.01)

(52) U.S. Cl.
CPC ............ *F25C 5/187* (2013.01); *F25C 1/045* (2013.01); *F25C 2700/02* (2013.01)

(58) Field of Classification Search
CPC ...... F25C 5/187; F25C 1/045; F25C 2700/02; G01F 23/292
See application file for complete search history.

(56) References Cited

U.S. PATENT DOCUMENTS

| 2,723,536 | A | 11/1955 | Mason |
| 3,171,266 | A | 3/1965 | Louis |
| 3,430,452 | A | 3/1969 | Dedricks et al. |
| 3,731,496 | A | 5/1973 | Frazier |
| 3,788,095 | A | 1/1974 | Grace et al. |

(Continued)

FOREIGN PATENT DOCUMENTS

| CN | 207937002 U | 10/2018 |
| CN | 110709656 A | 1/2020 |

(Continued)

OTHER PUBLICATIONS

US 10,852,003 B2, 12/2020, Stroh (withdrawn)

*Primary Examiner* — Lionel Nouketcha
(74) *Attorney, Agent, or Firm* — Stinson LLP

(57) ABSTRACT

An ice maker has a bottom wall with a sensor opening. A time-of-flight sensor is supported in relation to the bottom wall such that the time-of-flight sensor can an optical pulse signal through the sensor opening toward the ice bin and subsequently detect a photon of the optical pulse signal that returns to the time-of-flight sensor through the sensor opening after reflecting off of one of a floor of the ice bin and ice in the ice bin. The time of flight sensor is configured to determine a duration between the emission of the optical pulse and the detection of the reflected photon(s). Based on the determined duration, the time-of-flight sensor or another processor can determine an amount of ice in the ice bin. The ice maker can be configured so that the time-of-flight sensor is removable, allowing a window pane of the time-of-flight sensor to be periodically cleaned.

24 Claims, 39 Drawing Sheets

(56) References Cited

U.S. PATENT DOCUMENTS

| | | | |
|---|---|---|---|
| 3,812,686 A | 5/1974 | Tester | |
| 3,913,349 A | 10/1975 | Johnson | |
| 5,020,336 A | 6/1991 | Hida | |
| 5,479,707 A | 1/1996 | Alvarez et al. | |
| 5,699,150 A | 12/1997 | Katayama | |
| 5,879,626 A * | 3/1999 | Watterson | G02B 27/0006 |
| | | | 422/62 |
| 5,922,030 A | 7/1999 | Shank et al. | |
| 6,058,732 A | 5/2000 | Kato et al. | |
| 6,105,385 A | 8/2000 | Kato et al. | |
| 6,109,055 A | 8/2000 | Kato et al. | |
| 6,196,007 B1 | 3/2001 | Schlosser et al. | |
| 6,209,340 B1 | 4/2001 | Lu | |
| 6,257,009 B1 | 7/2001 | Tsuchikawa | |
| 6,324,855 B1 | 12/2001 | Mullis | |
| 6,414,301 B1 | 7/2002 | Borg et al. | |
| 6,418,736 B1 | 7/2002 | Cover | |
| 6,453,696 B1 | 9/2002 | Kawasumi et al. | |
| 6,463,746 B1 | 10/2002 | Bethuy et al. | |
| 6,484,530 B1 | 11/2002 | Hobino et al. | |
| 6,607,096 B2 | 8/2003 | Glass et al. | |
| 6,612,126 B2 | 9/2003 | Kawasumi et al. | |
| 6,637,227 B2 | 10/2003 | Stensrud et al. | |
| 6,668,575 B2 | 12/2003 | Stensrud et al. | |
| 6,681,580 B2 | 1/2004 | Shedivy et al. | |
| 6,705,107 B2 | 3/2004 | Schlosser et al. | |
| 6,761,036 B2 | 7/2004 | Teague et al. | |
| 6,821,362 B2 | 11/2004 | Satou | |
| 6,854,277 B2 | 2/2005 | Gist et al. | |
| 6,880,358 B2 | 4/2005 | Lucas et al. | |
| 6,907,744 B2 | 6/2005 | Miller et al. | |
| 7,010,932 B2 | 3/2006 | Kuroyanagi et al. | |
| 7,017,355 B2 | 3/2006 | Allison et al. | |
| D526,338 S | 8/2006 | McDougal et al. | |
| 7,168,262 B2 | 1/2007 | Hirano et al. | |
| D537,457 S | 2/2007 | McDougal et al. | |
| D540,830 S | 4/2007 | Gunshi | |
| 7,197,889 B2 | 4/2007 | Wakatsuki et al. | |
| 7,204,091 B2 | 4/2007 | Allison et al. | |
| 7,273,990 B2 | 9/2007 | Yoshida et al. | |
| 7,281,386 B2 | 10/2007 | McDougal et al. | |
| 7,284,391 B2 | 10/2007 | Miller et al. | |
| 7,287,671 B2 | 10/2007 | Morrow, Sr. et al. | |
| D557,716 S | 12/2007 | Okuda | |
| 7,343,749 B2 | 3/2008 | Tuschikawa et al. | |
| 7,444,828 B2 | 11/2008 | Kadowaki et al. | |
| 7,444,829 B2 | 11/2008 | Mori et al. | |
| D597,107 S | 7/2009 | Ohtake | |
| 7,779,641 B2 | 8/2010 | Lee et al. | |
| 7,802,444 B2 | 9/2010 | Landers et al. | |
| 7,832,219 B2 | 11/2010 | Baranowski et al. | |
| 7,975,497 B2 | 7/2011 | Kaga et al. | |
| 7,980,090 B2 | 7/2011 | Lanzani | |
| 8,042,344 B2 | 10/2011 | Morimoto et al. | |
| D649,565 S | 11/2011 | LaFond et al. | |
| 8,087,533 B2 | 1/2012 | Sellers | |
| D653,682 S | 2/2012 | Herning et al. | |
| 8,132,454 B2 * | 3/2012 | Nommer | G07D 7/12 |
| | | | 73/159 |
| 8,136,365 B2 | 3/2012 | Kaga et al. | |
| 8,230,696 B2 | 7/2012 | Yamaguchi et al. | |
| D668,272 S | 10/2012 | Ebelt et al. | |
| D668,275 S | 10/2012 | LaFond et al. | |
| D669,920 S | 10/2012 | LaFond et al. | |
| D673,185 S | 12/2012 | LaFond et al. | |
| 8,336,741 B2 | 12/2012 | Graviss et al. | |
| 8,341,968 B2 | 1/2013 | Landers et al. | |
| 8,375,738 B2 | 2/2013 | Kawasumi et al. | |
| 8,387,826 B2 | 3/2013 | Tsubouchi et al. | |
| 8,484,935 B2 | 7/2013 | LeBlanc et al. | |
| 8,505,595 B2 | 8/2013 | Bragg et al. | |
| 8,528,357 B2 | 9/2013 | Kondo et al. | |
| D690,743 S | 10/2013 | Lafond et al. | |
| D692,032 S | 10/2013 | LaFond et al. | |
| 8,567,013 B2 | 10/2013 | Yamaoka et al. | |
| 8,677,774 B2 | 3/2014 | Yamaguchi et al. | |
| 8,677,777 B2 | 3/2014 | Yamaguchi et al. | |
| D705,825 S | 5/2014 | Lafond et al. | |
| 8,738,302 B2 | 5/2014 | Tirumala et al. | |
| 8,763,851 B2 | 7/2014 | Jiang et al. | |
| 8,844,312 B2 | 9/2014 | Yoshida et al. | |
| 9,038,410 B2 | 5/2015 | Erbs et al. | |
| D734,783 S | 6/2015 | Yong et al. | |
| 9,052,130 B2 | 6/2015 | Schlosser | |
| 9,061,881 B2 | 6/2015 | Brown et al. | |
| D734,371 S | 7/2015 | Lei et al. | |
| 9,097,450 B2 | 8/2015 | Kim et al. | |
| 9,126,815 B2 | 9/2015 | Cooper et al. | |
| 9,146,049 B2 | 9/2015 | Yamaguchi et al. | |
| 9,151,528 B2 | 10/2015 | Erbs et al. | |
| 9,188,378 B2 * | 11/2015 | Maples | F25C 5/187 |
| 9,217,597 B2 | 12/2015 | Mueller et al. | |
| 9,243,833 B2 | 1/2016 | Yun et al. | |
| 9,316,426 B2 | 4/2016 | Almblad | |
| 9,346,659 B2 | 5/2016 | Brown | |
| 9,351,571 B2 | 5/2016 | Myers et al. | |
| 9,389,009 B2 | 7/2016 | Olson, Jr. et al. | |
| 9,612,330 B2 | 4/2017 | Parodi-Keravec et al. | |
| 9,625,199 B2 | 4/2017 | Antoine et al. | |
| 9,643,828 B2 | 5/2017 | Brown et al. | |
| 9,803,907 B2 | 10/2017 | Erbs et al. | |
| 9,933,195 B2 | 4/2018 | Roth et al. | |
| 9,939,186 B2 | 4/2018 | Roth et al. | |
| 10,001,306 B2 | 6/2018 | Litchy et al. | |
| 10,059,580 B2 | 8/2018 | Wyatt et al. | |
| 10,107,540 B2 | 10/2018 | Olson, Jr. et al. | |
| 10,156,393 B2 | 12/2018 | Tarr et al. | |
| 10,264,943 B2 | 4/2019 | Toga et al. | |
| 10,266,383 B2 | 4/2019 | Haskayne | |
| 10,274,239 B2 | 4/2019 | Kobayashi et al. | |
| 10,300,161 B2 | 5/2019 | Erbs | |
| 10,480,843 B2 | 11/2019 | Short et al. | |
| 10,731,864 B2 | 8/2020 | Wild | |
| 10,801,770 B2 | 10/2020 | Broadbent | |
| 10,829,347 B2 | 11/2020 | Rudy et al. | |
| 10,866,020 B2 | 12/2020 | Hoti et al. | |
| 2004/0140812 A1 * | 7/2004 | Scallante | B08B 3/04 |
| | | | 374/E13.006 |
| 2008/0110186 A1 | 5/2008 | Maples | |
| 2009/0100847 A1 | 4/2009 | Moon et al. | |
| 2009/0179040 A1 | 7/2009 | Hawkins | |
| 2009/0255280 A1 | 10/2009 | Kim et al. | |
| 2014/0137593 A1 | 5/2014 | Broadbent | |
| 2014/0137594 A1 | 5/2014 | Broadbent | |
| 2014/0137984 A1 | 5/2014 | Broadbent | |
| 2014/0144175 A1 | 5/2014 | Broadbent | |
| 2014/0208781 A1 | 7/2014 | Broadbent | |
| 2014/0208792 A1 | 7/2014 | Broadbent | |
| 2014/0209125 A1 | 7/2014 | Broadbent | |
| 2014/0216071 A1 | 8/2014 | Broadbent | |
| 2015/0192338 A1 | 7/2015 | Knatt | |
| 2015/0377538 A1 | 12/2015 | Rockwell | |
| 2016/0007801 A1 | 1/2016 | Bressner et al. | |
| 2016/0016133 A1 | 1/2016 | Merritt et al. | |
| 2016/0045063 A1 | 2/2016 | Mantle et al. | |
| 2016/0054043 A1 | 2/2016 | Broadbent | |
| 2016/0054044 A1 | 2/2016 | Jeong et al. | |
| 2016/0095450 A1 | 4/2016 | Trulaske, Sr. | |
| 2016/0159520 A1 | 6/2016 | Vemula et al. | |
| 2016/0290697 A1 | 10/2016 | Broadbent et al. | |
| 2016/0298893 A1 | 10/2016 | Knatt et al. | |
| 2016/0327352 A1 | 11/2016 | Broadbent et al. | |
| 2016/0334157 A1 | 11/2016 | Broadbent et al. | |
| 2016/0370061 A1 | 12/2016 | Erbs | |
| 2017/0003062 A1 | 1/2017 | Olson, Jr. et al. | |
| 2017/0023284 A1 | 1/2017 | Broadbent | |
| 2017/0067678 A1 | 3/2017 | Melton et al. | |
| 2017/0176077 A1 | 6/2017 | Knatt | |
| 2017/0183210 A1 | 6/2017 | Wyatt et al. | |
| 2017/0351336 A1 | 12/2017 | Yang et al. | |
| 2017/0370628 A1 | 12/2017 | Knatt | |
| 2018/0017304 A1 | 1/2018 | Knatt | |
| 2018/0023847 A1 | 1/2018 | Kobayashi et al. | |
| 2018/0023874 A1 | 1/2018 | Kobayashi et al. | |

(56) References Cited

U.S. PATENT DOCUMENTS

| | | |
|---|---|---|
| 2018/0031294 A1 | 2/2018 | Olson, Jr. et al. |
| 2018/0106521 A1 | 4/2018 | Broadbent et al. |
| 2018/0142932 A1 | 5/2018 | Knatt et al. |
| 2018/0283760 A1 | 10/2018 | Knatt et al. |
| 2018/0313593 A1* | 11/2018 | Olvera .................. F25D 17/08 |
| 2019/0008004 A1 | 1/2019 | Wild |
| 2020/0041190 A1 | 2/2020 | Sakakibara |
| 2020/0400358 A1 | 12/2020 | Romagnoli |
| 2021/0222937 A1 | 7/2021 | Knatt et al. |
| 2021/0222940 A1 | 7/2021 | Knatt et al. |

FOREIGN PATENT DOCUMENTS

| | | |
|---|---|---|
| EP | 2636975 A1 | 9/2013 |
| GB | 1244831 | 9/1971 |
| JP | H08285419 A | 11/1996 |
| JP | 09166658 A | 6/1997 |
| JP | 2006010181 A | 1/2006 |
| JP | 2013257050 A | 12/2013 |
| JP | 2018054207 A | 4/2018 |
| WO | 20150065564 A1 | 5/2015 |
| WO | 20150171121 A1 | 11/2015 |
| WO | 20160007738 A1 | 1/2016 |
| WO | 20160011103 A1 | 1/2016 |
| WO | 20160025845 A1 | 2/2016 |
| WO | 20160057064 A1 | 4/2016 |
| WO | 201600654866 A1 | 4/2016 |
| WO | 20160089410 A1 | 6/2016 |
| WO | 201600146082 A1 | 9/2016 |
| WO | 20160181702 A1 | 11/2016 |
| WO | 20160205685 A1 | 12/2016 |
| WO | 20170004212 A1 | 1/2017 |
| WO | 20170077295 A1 | 5/2017 |
| WO | 20170083359 A1 | 5/2017 |
| WO | 2017095691 A1 | 6/2017 |
| WO | 2017102494 A1 | 6/2017 |
| WO | 2017162680 A1 | 9/2017 |
| WO | 2017180578 A1 | 10/2017 |
| WO | 2017182214 A1 | 10/2017 |
| WO | 2018007318 A1 | 1/2018 |
| WO | 20180011711 A1 | 1/2018 |
| WO | 20180022097 A1 | 2/2018 |
| WO | 20180147843 A1 | 8/2018 |
| WO | 20180148096 A1 | 8/2018 |
| WO | 2018158186 A1 | 9/2018 |
| WO | 2019143354 A1 | 7/2019 |
| WO | 2019164480 A1 | 8/2019 |

* cited by examiner

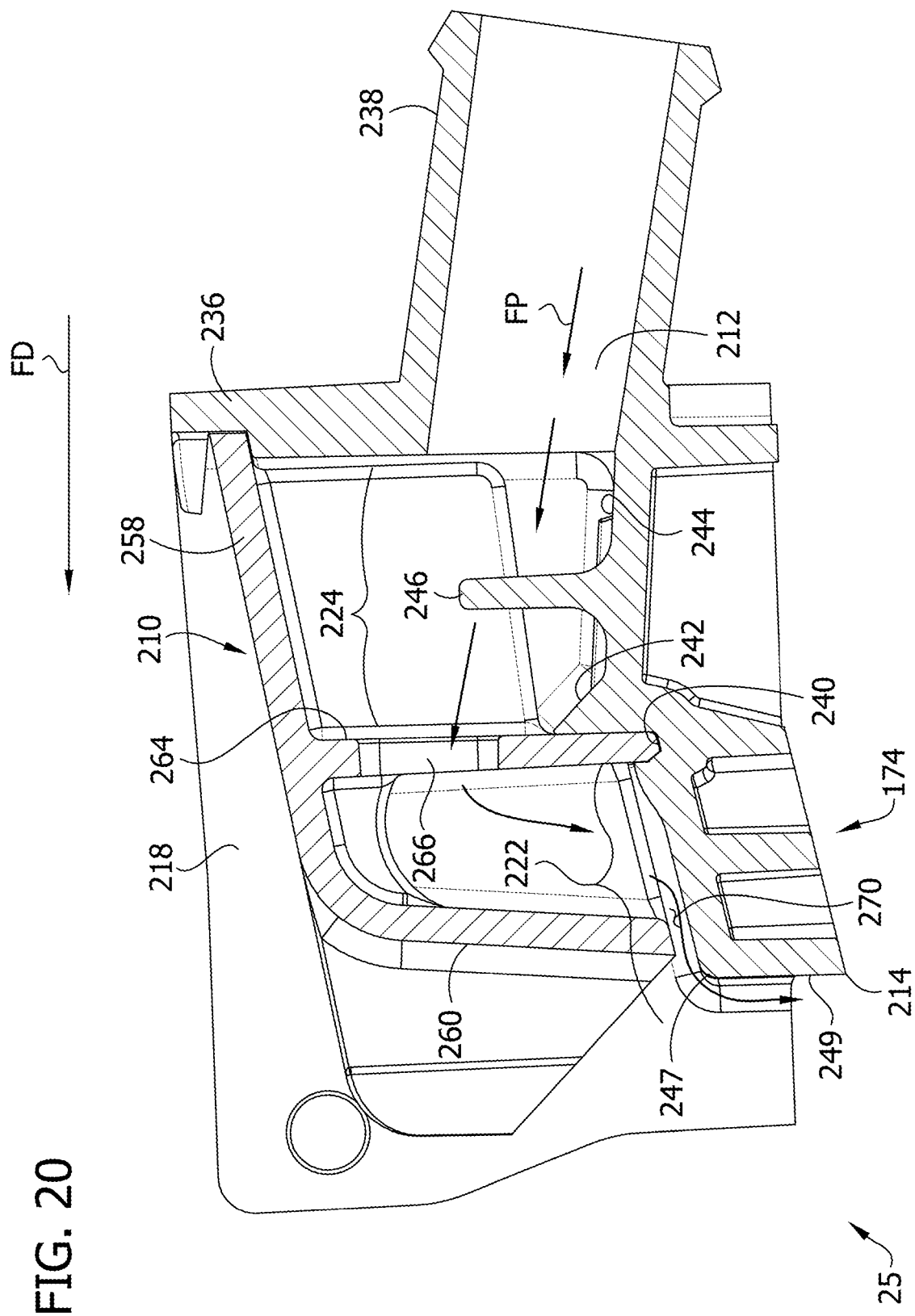

METHOD OF SERVICING AN ICE MAKER SENSOR

FIELD

The present disclosure pertains to an ice maker of the type that is configured to deposit ice into an ice bin below the ice maker.

BACKGROUND

Ice makers are well-known and in extensive commercial and residential use. One type of ice maker includes an evaporator assembly that comprises a freeze plate which defines a plurality of ice molds in a two-dimensional vertical grid. Refrigerant tubing extends along the back of the freeze plate and forms an evaporator configured to cool the freeze plate. A water distributor is positioned above the freeze plate to direct water onto the freeze plate that freezes into ice in the molds. The ice, once formed, can be released from the molds by various harvest mechanisms. It is known to position the ice maker above a bin so that the harvested ice falls from the ice maker into the ice bin. Ice makers can detect the amount of ice in the bin using various mechanisms such as capacitive, ultrasonic, infrared, or mechanical sensors.

SUMMARY

In one aspect, an ice maker comprises a freeze plate defining a plurality of molds in which the ice maker is configured to form ice. The freeze plate has a front defining open front ends of the molds, a back defining enclosed rear ends of the molds, a top portion and a bottom portion spaced apart along a height, and a first side portion and a second side portion spaced apart along a width. A distributor adjacent the top portion of the freeze plate is configured to direct water imparted through the distributor to flow downward along the front of the freeze plate along the width of the freeze plate. The distributor comprises a first end portion and a second end portion spaced apart along a width of the distributor. A bottom wall extends widthwise from the first end portion to the second end portion and extends generally forward from an upstream end portion to a downstream end portion. The distributor is configured to direct the water imparted therethrough to flow in a generally forward direction from the upstream end portion to the downstream end portion. A weir extends upward from the bottom wall at a location spaced apart between the upstream end portion and the downstream end portion. The weir is configured so that the water flows across the weir as it flows along the bottom wall from the upstream end portion to the downstream end portion. The bottom wall comprises a ramp surface, immediately upstream of the weir, sloping upward in the generally forward direction.

In another aspect, an ice maker comprises a freeze plate defining a plurality of molds in which the ice maker is configured to form ice. The freeze plate has a front defining open front ends of the molds, a back defining enclosed rear ends of the molds, a top portion and a bottom portion spaced apart along a height, and a first side portion and a second side portion spaced apart along a width. A distributor adjacent the top portion of the freeze plate is configured to direct water imparted through the distributor to flow downward along the front of the freeze plate along the width of the freeze plate. The distributor comprises a first end portion and a second end portion spaced apart along a width of the distributor. A bottom wall extends widthwise from the first end portion to the second end portion and extends generally forward from an upstream end portion to a downstream end portion. The distributor is configured to direct the water imparted therethrough to flow in a generally forward direction from the upstream end portion to the downstream end portion. The downstream end portion of the bottom wall defines a downwardly curving surface tension curve. The downwardly curving surface tension curve is configured so that surface tension causes the water imparted through the distributor to adhere to the curve and be directed downward by the curve toward the top end portion of the freeze plate.

In another aspect, an ice maker comprises a freeze plate defining a plurality of molds in which the ice maker is configured to form ice. The freeze plate has a front defining open front ends of the molds, a back defining enclosed rear ends of the molds, a top portion and a bottom portion spaced apart along a height, and a first side portion and a second side portion spaced apart along a width. A distributor adjacent the top portion of the freeze plate is configured to direct water imparted through the distributor to flow downward along the front of the freeze plate along the width of the freeze plate. The distributor comprises a first end portion and a second end portion spaced apart along a width of the distributor. A bottom wall extends widthwise from the first end portion to the second end portion and extends generally forward from an upstream end portion to a downstream end portion. The distributor is configured to direct the water imparted therethrough to flow in a generally forward direction from the upstream end portion to the downstream end portion. An overhanging front wall has a bottom edge margin spaced apart above the bottom wall adjacent the downstream end portion thereof such that a flow restriction is defined between the bottom wall and the overhanging front wall. The flow restriction comprises a gap extending widthwise between the first end portion and the second end portion of the distributor and is configured to restrict a rate at which water flows through the flow restriction to the downstream end portion of the bottom wall.

In yet another aspect, an ice maker comprises a freeze plate defining a plurality of molds in which the ice maker is configured to form ice. The freeze plate has a top portion and a bottom portion spaced apart along a height and a first side portion and a second side portion spaced apart along a width. A distributor extends along the width of the freeze plate adjacent the top portion of the freeze plate. The distributor is configured to direct water imparted through the distributor to flow from the top portion of the freeze plate to the bottom portion along the width of the freeze plate. The distributor comprises a first distributor piece and a second distributor piece. The second distributor piece is configured to be releasably coupled to the first distributor piece without separate fasteners to form the distributor.

In another aspect, an ice maker comprises a freeze plate defining a plurality of molds in which the ice maker is configured to form ice. The freeze plate has a top portion and a bottom portion spaced apart along a height and a first side portion and a second side portion spaced apart along a width. A distributor adjacent the top portion of the freeze plate has a width extending along the width of the freeze plate. The distributor has an inlet and an outlet and defining a distributor flow path extending from the inlet to the outlet. The distributor is configured to direct water imparted through the distributor along the distributor flow path and discharge the water from the outlet such that the water flows from the top portion of the freeze plate to the bottom portion along the width of the freeze plate. The distributor comprises a first distributor piece and a second distributor piece. The second distributor piece is releasably coupled to the first distributor piece to form the distributor. The first distributor piece comprises a bottom wall defining a groove extending widthwise and the second distributor piece comprising a generally vertical weir defining a plurality of openings spaced apart along the width of the distributor. The weir has a free bottom edge margin received in the groove such that water flowing along the distributor flow path is inhibited from flowing through an interface between the bottom edge margin of the weir and the bottom wall and is directed to flow across the weir through the plurality of openings.

In another aspect, an ice maker comprises an evaporator assembly comprising a freeze plate defining a plurality of molds in which the evaporator assembly is configured to form pieces of ice. The freeze plate has a front defining open front ends of the molds and a back extending along closed rear ends of the molds. An evaporator housing has a back and defines an enclosed space between the back of the freeze plate and the back of the evaporator housing. Refrigerant tubing is received in the enclosed space. Insulation substantially fills the enclosed space around the refrigerant tubing. A water system is configured to supply water to the freeze plate such that the water forms into ice in the molds. The evaporator housing includes a distributor piece formed from a single piece of monolithic material. The distributor piece is in direct contact with the insulation and has a bottom wall. The water system is configured direct the water to flow along the bottom wall as the water is supplied to the freeze plate.

In still another aspect, an ice maker comprises an evaporator assembly comprising a freeze plate defining a plurality of molds in which the evaporator assembly is configured to form pieces of ice. The freeze plate has a front defining open front ends of the molds, a back extending along closed rear ends of the molds, a top wall formed from a single piece of monolithic material and defining a top end of at least one of the molds, and at least one stud joined to the top wall and extending upward therefrom. A distributor is configured to distribute water imparted through the distributor over the freeze plate so that the water forms into ice in the molds. The distributor comprises a distributor piece formed from a single piece of monolithic material. The distributor piece comprises a bottom wall defining a portion of a flow path along which the distributor directs water to flow through the distributor. A nut is tightened onto each stud against the distributor piece to directly mount the distributor on the freeze plate.

In another aspect, a distributor for receiving water imparted through the distributor and directing the water to flow along a freeze plate of an ice maker so that the water forms into ice on the freeze plate comprises a rear wall adjacent an upstream end of the distributor, a bottom wall extending forward from the rear wall to a front end portion adjacent a downstream end of the distributor, and a tube protruding rearward from the rear wall. The rear wall has an opening immediately above the bottom wall through which the tube fluidly communicates with the distributor. The bottom wall comprises a rear section that slopes downward to the rear wall and a front section that slopes downward to the front end portion.

In another aspect, an ice maker comprises an enclosure. A freeze plate is received in the enclosure. The freeze plate comprises a back wall and a front opposite the back wall. The freeze plate further comprises a perimeter wall extending forward from the back wall. The perimeter wall comprises a top wall portion, a bottom wall portion, a first side wall portion, and a second side wall portion. The first side wall portion and the second side wall portion define a width of the freeze plate. The freeze plate further comprises a plurality of heightwise divider plates extending from lower ends connected to the bottom wall portion to upper ends connected to the top wall portion and a plurality of widthwise divider plates extending from first ends connected to the first side wall portion to second ends connected to the second side wall portion. The heightwise divider plates and the widthwise divider plates are interconnected to define a plurality of ice molds inboard of the perimeter wall. Each widthwise divider plate defines a plurality of molds immediately above the divider plate and a plurality of molds immediately below the divider plate. Each widthwise divider plate slopes downward and forward away from the back wall of the freeze plate such that included angle between an upper surface of each widthwise divider plate and the back wall is greater than 900 and less than 180°. A distributor is configured to direct water imparted through the distributor to flow downward along the freeze plate along the width of the freeze plate. The freeze plate is supported in the enclosure so that the back wall of the freeze plate slants forward.

In one aspect, an ice maker comprises a bottom wall. The ice maker is configured to be mounted on an ice bin such that the bottom wall is positioned generally above a top of the ice bin. The bottom wall defines a sensor opening. An ice formation device is supported above the bottom wall. The ice formation device is configured to form pieces of ice and to release the pieces of ice so that the pieces of ice fall from the ice formation device past the bottom wall through a drop opening into the ice bin. A time-of-flight sensor is configured to: emit, at a first time, an optical pulse signal through the sensor opening toward the ice bin; detect, at a second time, a photon of the optical pulse signal that returns to the time-of-flight sensor through the sensor opening after reflecting off of one of a floor of the ice bin and ice in the ice bin, and determine a duration between the first time and the second time, the duration being usable to determine an amount of ice in the ice bin.

In another aspect, a method of servicing an ice maker comprises removing a time-of-flight sensor from the ice maker. A window pane on a sensor enclosure of the time-of-flight sensor is cleaned. And after said cleaning the window pane, the time-of-flight sensor is reinstalled in the ice maker.

In another aspect, a method of determining an amount of ice in an ice bin comprises emitting, at a first time, an optical pulse signal through a sensor opening formed in a bottom wall of an ice maker mounted on the ice bin for depositing the ice into the ice bin. At a second time, a photon of the optical pulse signal that returns to the time-of-flight sensor through the sensor opening after reflecting off of one of a floor of the ice bin and ice in the ice bin is detected. A duration between the first time and the second time is determined.

Other aspects will be in part apparent and in part pointed out hereinafter.

BRIEF DESCRIPTION OF THE DRAWINGS

FIG. 20 is a vertical cross section of the distributor;

Corresponding reference characters indicate corresponding parts throughout the drawings.

DETAILED DESCRIPTION

Figure 1:
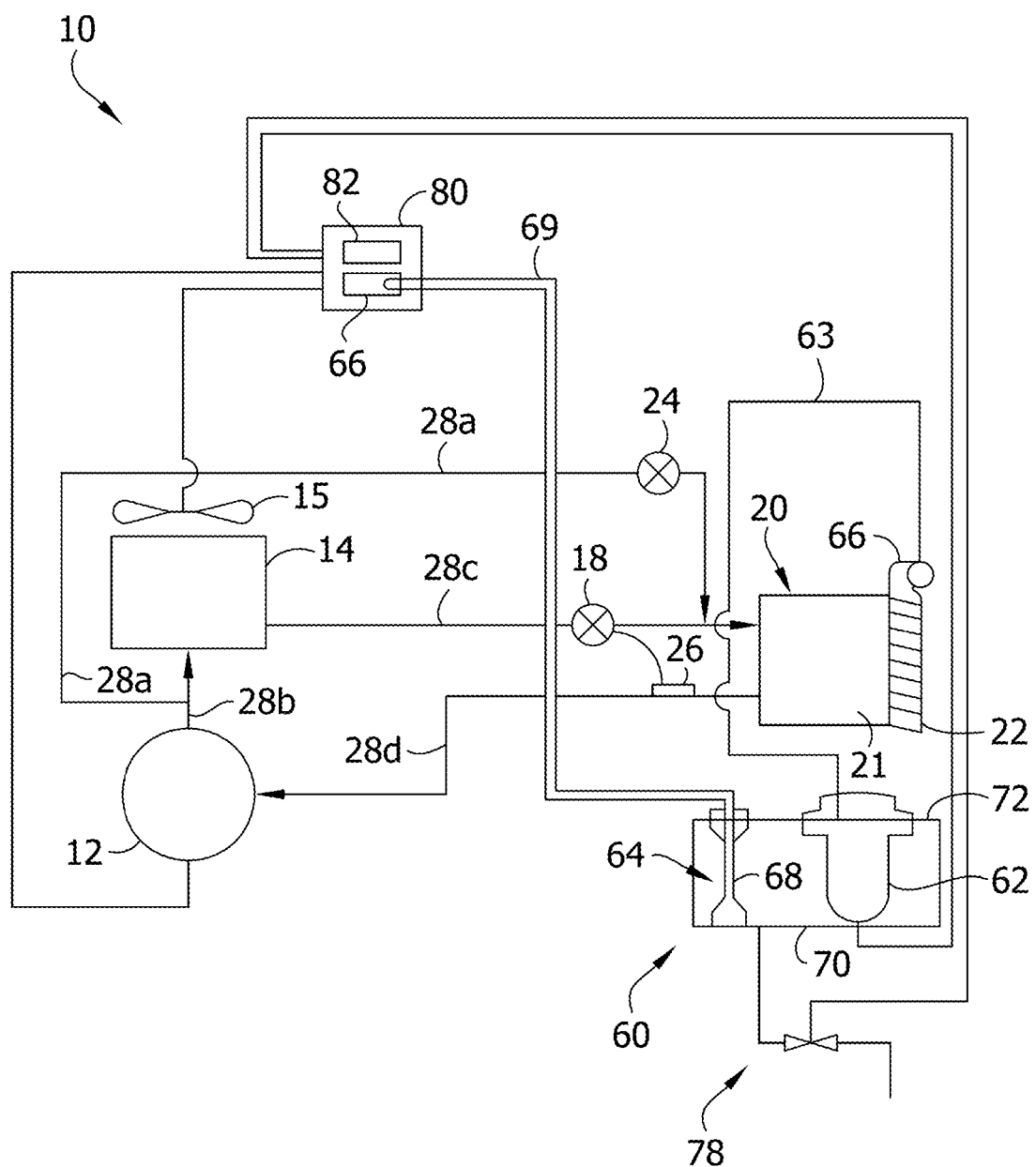
FIG. 1 is a schematic illustration of an ice maker.

Referring to FIG. 1, one embodiment of an ice maker is generally indicated at reference number 10. This disclosure details exemplary features of the ice maker 10 that can be used individually or in combination to enhance ice making uniformity, ice harvesting performance, energy efficiency, assembly precision, and/or accessibility for repair or maintenance. One aspect of the present disclosure pertains to an evaporator assembly that includes an evaporator, a freeze plate, and a water distributor. As will be explained in further detail below, in one or more embodiments, the parts of the evaporator assembly are integrated together into a single unit. In certain embodiments, the water distributor includes a configuration of water distribution features that provides uniform water flow along the width of the freeze plate. In an exemplary embodiment, the water distributor is configured to provide ready access to the interior of the distributor for repair or maintenance. In one or more embodiments, the evaporator assembly is configured to mount the freeze plate within the ice maker in an orientation that reduces the time it takes to passively harvest ice using gravity and heat. Other aspects and features of the ice maker 10 will also be described hereinafter. Though this disclosure describes an ice maker that combines a number of different features, it will be understood that other ice makers can use any one or more of the features disclosed herein without departing from the scope of this disclosure.

The disclosure begins with an overview of the ice maker 10, before providing a detailed description of an exemplary embodiment of an evaporator assembly.

I. Refrigeration System

Referring FIG. 1, a refrigeration system of the ice maker 10 includes a compressor 12, a heat rejecting heat exchanger 14, a refrigerant expansion device 18 for lowering the temperature and pressure of the refrigerant, an evaporator assembly 20 (broadly, an ice formation device), and a hot gas valve 24. As shown, the heat rejecting heat exchanger 14 may comprise a condenser for condensing compressed refrigerant vapor discharged from the compressor 12. In other embodiments, for example, in refrigeration systems that utilize carbon dioxide refrigerants where the heat of rejection is trans-critical, the heat rejecting heat exchanger is able to reject heat from the refrigerant without condensing the refrigerant. The illustrated evaporator assembly 20 integrates an evaporator 21 (e.g., serpentine refrigerant tubing), a freeze plate 22, and a water distributor 25 into one unit, as will be described in further detail below. Hot gas valve 24 is used, in one or more embodiments, to direct warm refrigerant from the compressor 15 directly to the evaporator 21 to remove or harvest ice cubes from the freeze plate 22 when the ice has reached the desired thickness.

The refrigerant expansion device 18 can be of any suitable type, including a capillary tube, a thermostatic expansion valve or an electronic expansion valve. In certain embodiments, where the refrigerant expansion device 18 is a thermostatic expansion valve or an electronic expansion valve, the ice maker 10 may also include a temperature sensor 26 placed at the outlet of the evaporator tubing 21 to control the refrigerant expansion device 18. In other embodiments, where the refrigerant expansion device 18 is an electronic expansion valve, the ice maker 10 may also include a pressure sensor (not shown) placed at the outlet of the evaporator tubing 21 to control the refrigerant expansion device 19 as is known in the art. In certain embodiments that utilize a gaseous cooling medium (e.g., air) to provide condenser cooling, a condenser fan 15 may be positioned to blow the gaseous cooling medium across the condenser 14. A form of refrigerant cycles through these components via refrigerant lines 28a, 28b, 28c, 28d.

II. Water System

Referring still to FIG. 1, a water system of the illustrated ice maker 10 includes a sump assembly 6o that comprises a water reservoir or sump 70, a water pump 62, a water line 63, and a water level sensor 64. The water system of the ice maker 10 further includes a water supply line (not shown) and a water inlet valve (not shown) for filling sump 70 with water from a water source (not shown). The illustrated water system further includes a discharge line 78 and a discharge valve 79 (e.g., purge valve, drain valve) disposed thereon for draining water from the sump 70. The sump 70 may be positioned below the freeze plate 22 to catch water coming off of the freeze plate such that the water may be recirculated by the water pump 62. The water line 63 fluidly connects the water pump 62 to the water distributor 25. During an ice making cycle, the pump 62 is configured to pump water through the water line 63 and through the distributor 25. As will be discussed in greater detail below, the distributor 25 includes water distribution features that distribute the water imparted through the distributor evenly across the front of the freeze plate 22. In an exemplary embodiment, the water line 63 is arranged in such a way that at least some of the water can drain from the distributor through the water line and into the sump when ice is not being made.

In an exemplary embodiment, the water level sensor 64 comprises a remote air pressure sensor 66. It will be understood, however that any type of water level sensor may be used in the ice maker 10 including, but not limited to, a float sensor, an acoustic sensor, or an electrical continuity sensor. The illustrated water level sensor 64 includes a fitting 68 that is configured to couple the sensor to the sump 70 (see also FIG. 4). The fitting 68 is fluidly connected to a pneumatic tube 69. The pneumatic tube 69 provides fluid communication between the fitting 68 and the air pressure sensor 66. Water in the sump 70 traps air in the fitting 68 and compresses the air by an amount that varies with the level of the water in the sump. Thus, the water level in the sump 70 can be determined using the pressure detected by the air pressure sensor 66. Additional details of exemplary embodiments of a water level sensor comprising a remote air pressure sensor are described in U.S. Patent Application Publication No. 2016/0054043, which is hereby incorporated by reference in its entirety.

Figure 4:
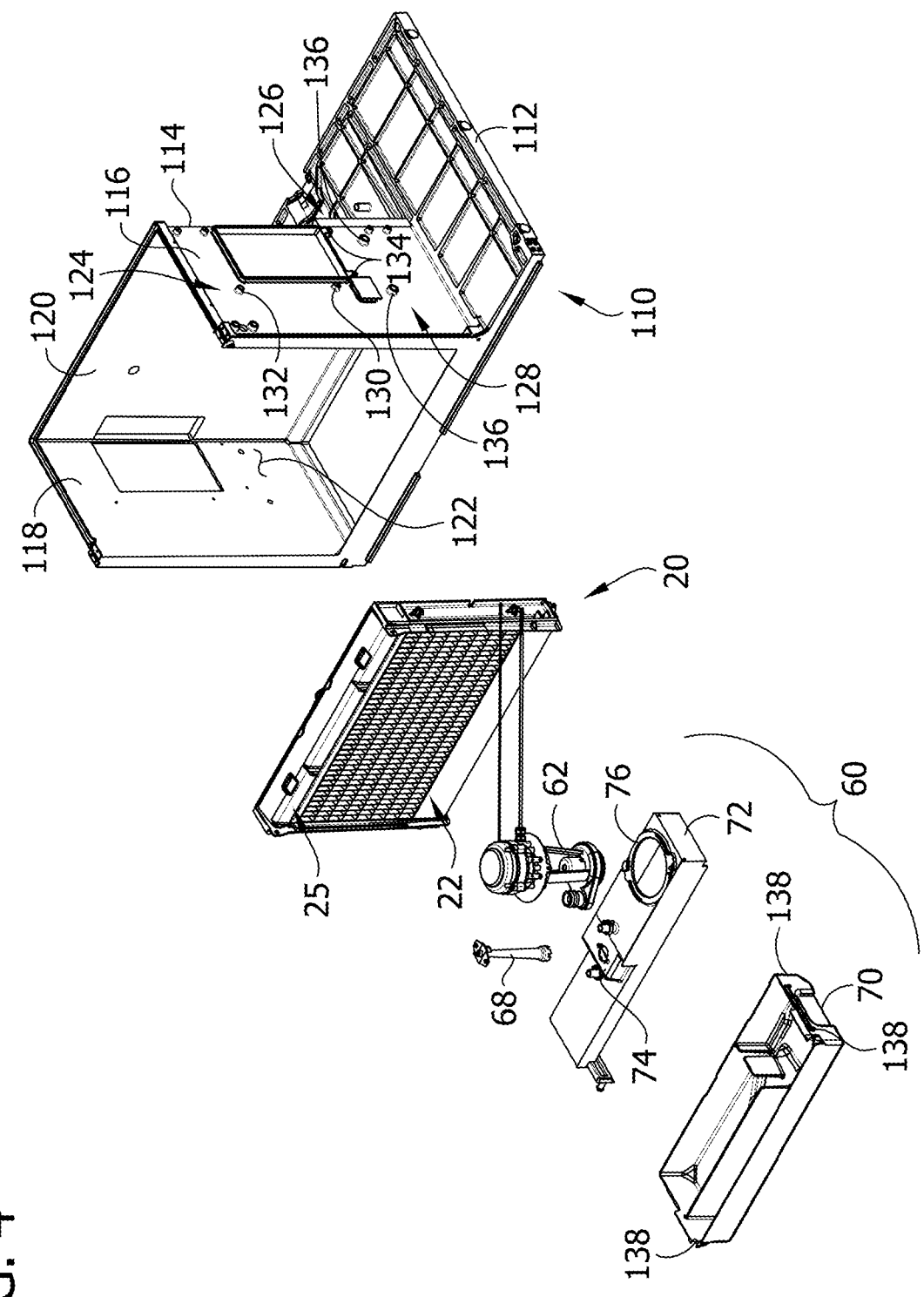
FIG. 4 is an exploded perspective of the subassembly of FIG. 3.

In the illustrated embodiment, the sump assembly 60 further comprises a mounting plate 72 that is configured to operatively support both the water pump 62 and the water level sensor fitting 68 on the sump 70. An exemplary embodiment of a mounting plate 72 is shown in FIG. 4. As described in co-pending U.S. patent application Ser. No. 16/746,828, filed Jan. 18, 2020, entitled ICE MAKER, which is hereby incorporated by reference in its entirety, the mounting plate 72 may define an integral sensor mount 74 for operatively mounting sensor fitting 68 on the sump 70 at a sensing position at which the water level sensor 64 is operative to detect the amount of water in the sump. The mounting plate 72 may also define a pump mount 76 for mounting the water pump 62 on the sump 70 for pumping water from the sump through the water line 63 and the distributor 25. Each of the sensor mount 74 and the pump mount 76 may include locking features that facilitate releasably connecting the respective one of the water level sensor 64 and the water pump 62 to the sump 70.

III. Controller

Referring again to FIG. 1, the ice maker 10 may also include a controller 8o. The controller 8o may be located remote from the ice making device 20 and the sump 70 or may comprise one or more onboard processors, in one or more embodiments. The controller 80 may include a processor 82 for controlling the operation of the ice maker 10 including the various components of the refrigeration system and the water system. The processor 82 of the controller 80 may include a non-transitory processor-readable medium storing code representing instructions to cause the processor to perform a process. The processor 82 may be, for example, a commercially available microprocessor, an application-specific integrated circuit (ASIC) or a combination of ASICs, which are designed to achieve one or more specific functions, or enable one or more specific devices or applications. In certain embodiments, the controller 80 may be an analog or digital circuit, or a combination of multiple circuits. The controller 80 may also include one or more memory components (not shown) for storing data in a form retrievable by the controller. The controller 80 can store data in or retrieve data from the one or more memory components.

In various embodiments, the controller 80 may also comprise input/output (I/O) components (not shown) to communicate with and/or control the various components of ice maker 10. In certain embodiments, for example, the controller 80 may receive inputs such as, for example, one or more indications, signals, messages, commands, data, and/or any other information, from the water level sensor 64, a harvest sensor for determining when ice has been harvested (not shown), an electrical power source (not shown), an ice level sensor (discussed infra, at § XI), and/or a variety of sensors and/or switches including, but not limited to, pressure transducers, temperature sensors, acoustic sensors, etc. In various embodiments, based on those inputs for example, the controller 80 may be able to control the compressor 12, the condenser fan 15, the refrigerant expansion device 18, the hot gas valve 24, the water inlet valve (not shown), the discharge valve 79, and/or the water pump 62, for example, by sending, one or more indications, signals, messages, commands, data, and/or any other information to such components.

IV. Enclosure/Ice Bin

Figure 2:
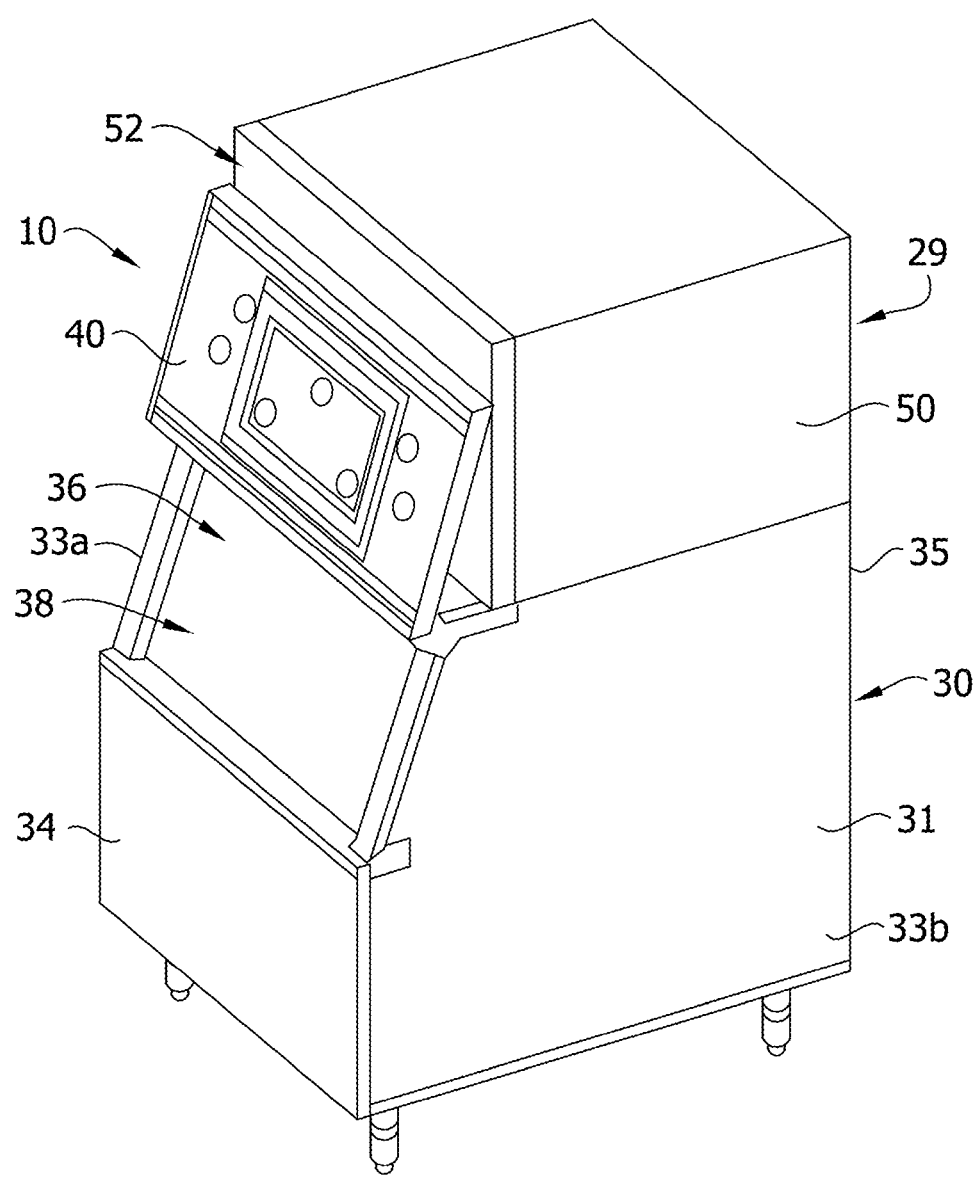
FIG. 2 is a perspective of the ice maker supported on an ice bin.

Referring to FIG. 2, one or more components of the ice maker 10 may be stored inside of an enclosure 29 of the ice maker 10 that defines an interior space. For example, portions or all of the refrigeration system and water system of the ice maker 10 described above can be received in the interior space of the enclosure 29. In the illustrated embodiment, the enclosure 29 is mounted on top of an ice storage bin assembly 30. The ice storage bin assembly 30 includes an ice storage bin 31 having an open top (not shown) through which ice produced by the ice maker 10 falls. The ice is then stored in a cavity 36 until retrieved. The ice storage bin 31 further includes an opening 38 which provides access to the cavity 36 and the ice stored therein. The cavity 36, ice hole (not shown), and opening 38 are formed by a left wall 33a, a right wall 33b, a front wall 34, a back wall 35 and a bottom wall (not shown). The walls of the ice storage bin 31 may be thermally insulated with various insulating materials including, but not limited to, fiberglass insulation or open- or closed-cell foam comprised, for example, of polystyrene or polyurethane, etc. in order to retard the melting of the ice stored in the ice storage bin 31. A door 40 can be opened to provide access to the cavity 36.

The illustrated enclosure 29 is comprised of a cabinet 50 (broadly, a stationary enclosure portion) and a door 52 (broadly, a movable or removable enclosure portion). In FIG. 2, the door 40 of the ice storage bin assembly 30 is raised so that it partially obscures the ice maker door 52. The door 52 is movable with respect to the cabinet 50 (e.g., on a hinge) to selectively provide access to the interior space of the ice maker 10. Thus, a technician may open the door 52 to access the internal components of the ice maker 10 through a doorway (not shown; broadly, an access opening) as required for repair or maintenance. In one or more other embodiments, the door may be opened in other ways, such as by removing the door assembly from the cabinet.

Additional details about an exemplary embodiment of an enclosure within the scope of the present disclosure are described in U.S. patent application Ser. No. 16/746,835, entitled Ice Maker, Ice Dispensing Assembly, and Method of Deploying Ice Maker, filed Jan. 18, 2020, and assigned to the assignee of the present application, which is hereby incorporated by reference in its entirety.

V. Internal Support

Figure 3:
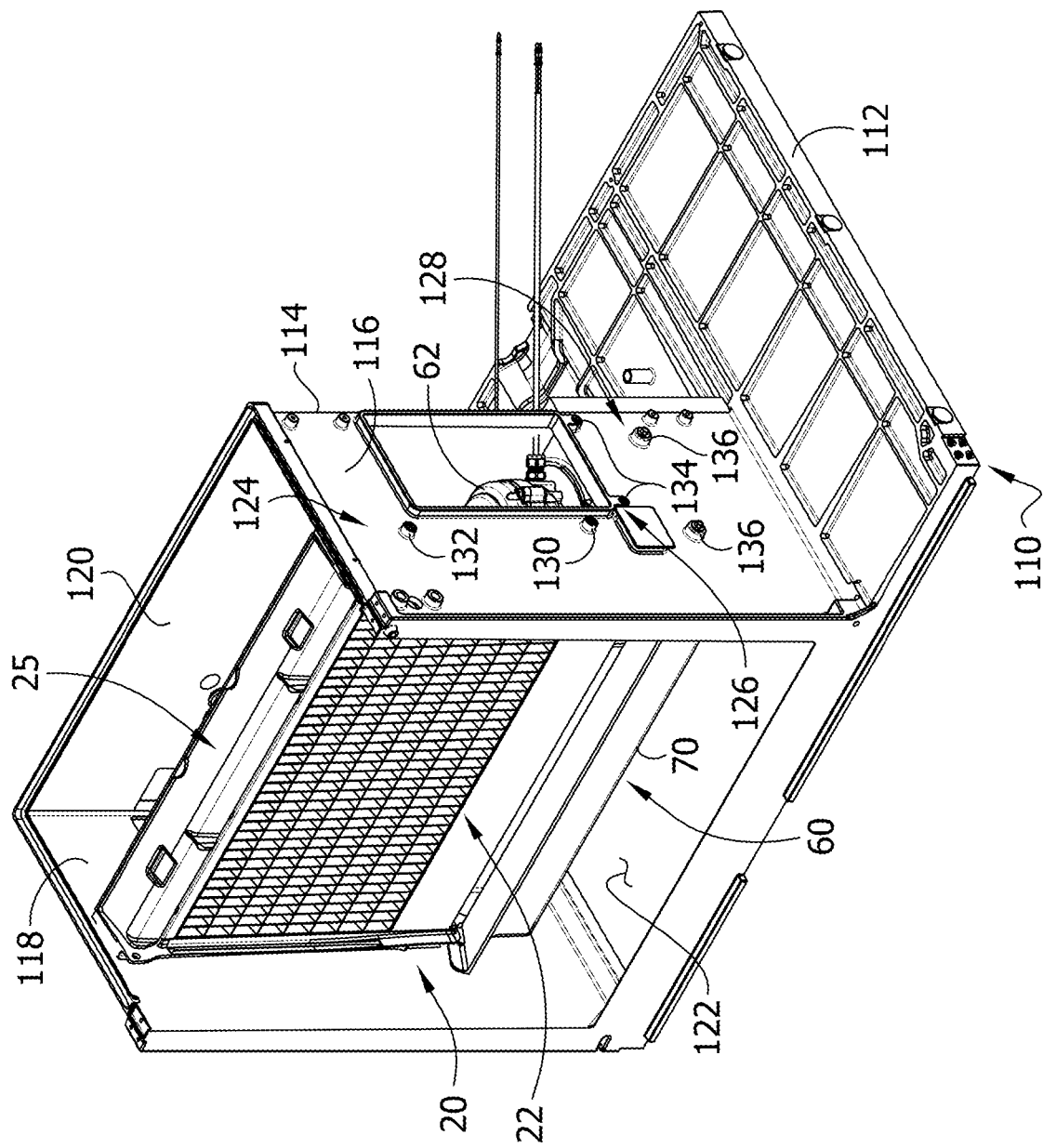
FIG. 3 is a perspective of a subassembly of the ice maker including a support, an evaporator assembly, a sump, a mounting plate, and a sensor fitting.
Figure 5:
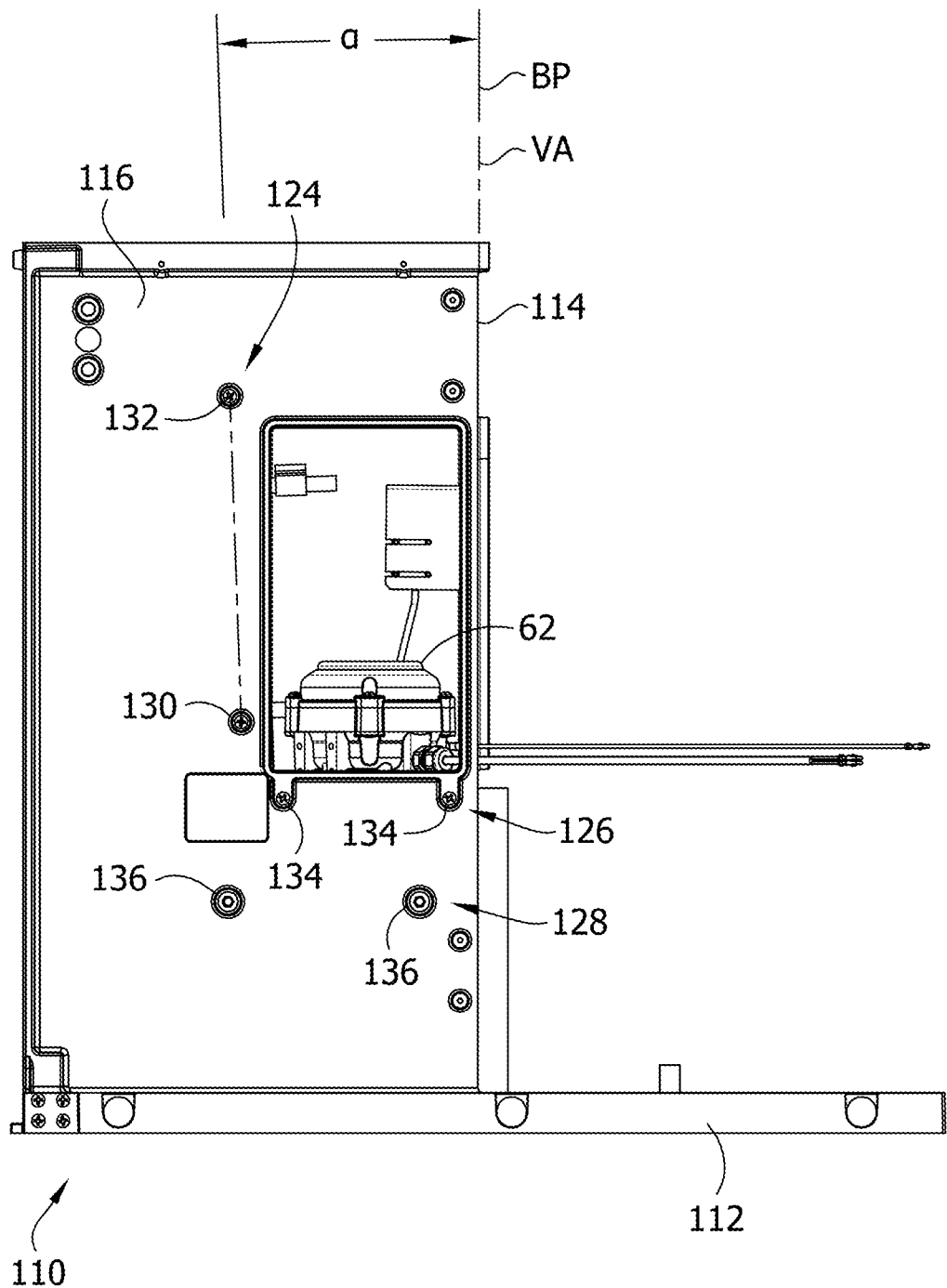
FIG. 5 is a side elevation of the subassembly of FIG. 3.

Referring to FIGS. 3-5, the illustrated ice maker 10 comprises a one-piece support 110 that is configured to support several components of the ice maker inside the enclosure 29. For example, the illustrated support 110 is configured to support the sump 70, the mounting plate 72, and the evaporator assembly 20 at very precise positions to limit the possibility of misplacement of these components. The inventors have recognized that ice maker control schemes that use water level as a control input require accurate placement of the water level sensor in the sump. If the position of the water level sensor deviates from the specified position by even a small amount (e.g., millimeters or less), the control scheme can be disrupted. The inventors have further recognized that the aggregated dimensional tolerances of the parts of conventional assemblies for mounting internal ice maker components can lead to misplacement. Still further, the inventors have recognized that precisely positioning an evaporator assembly in an ice maker can enhance gravity-driven ice making and ice-harvesting performance.

Figure 35:
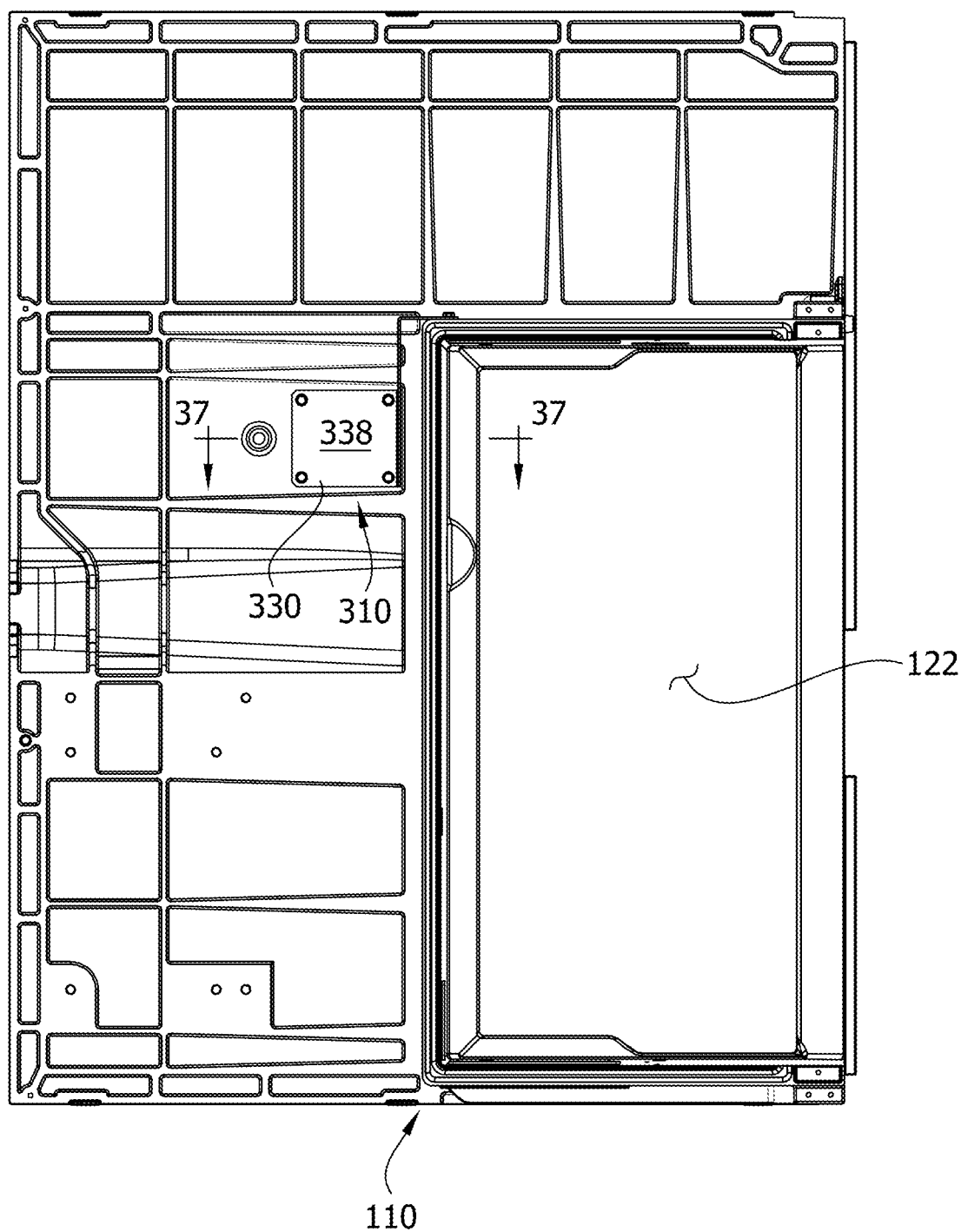
FIG. 35 is a top plan view of the subassembly of FIG. 34.
Figure 36:
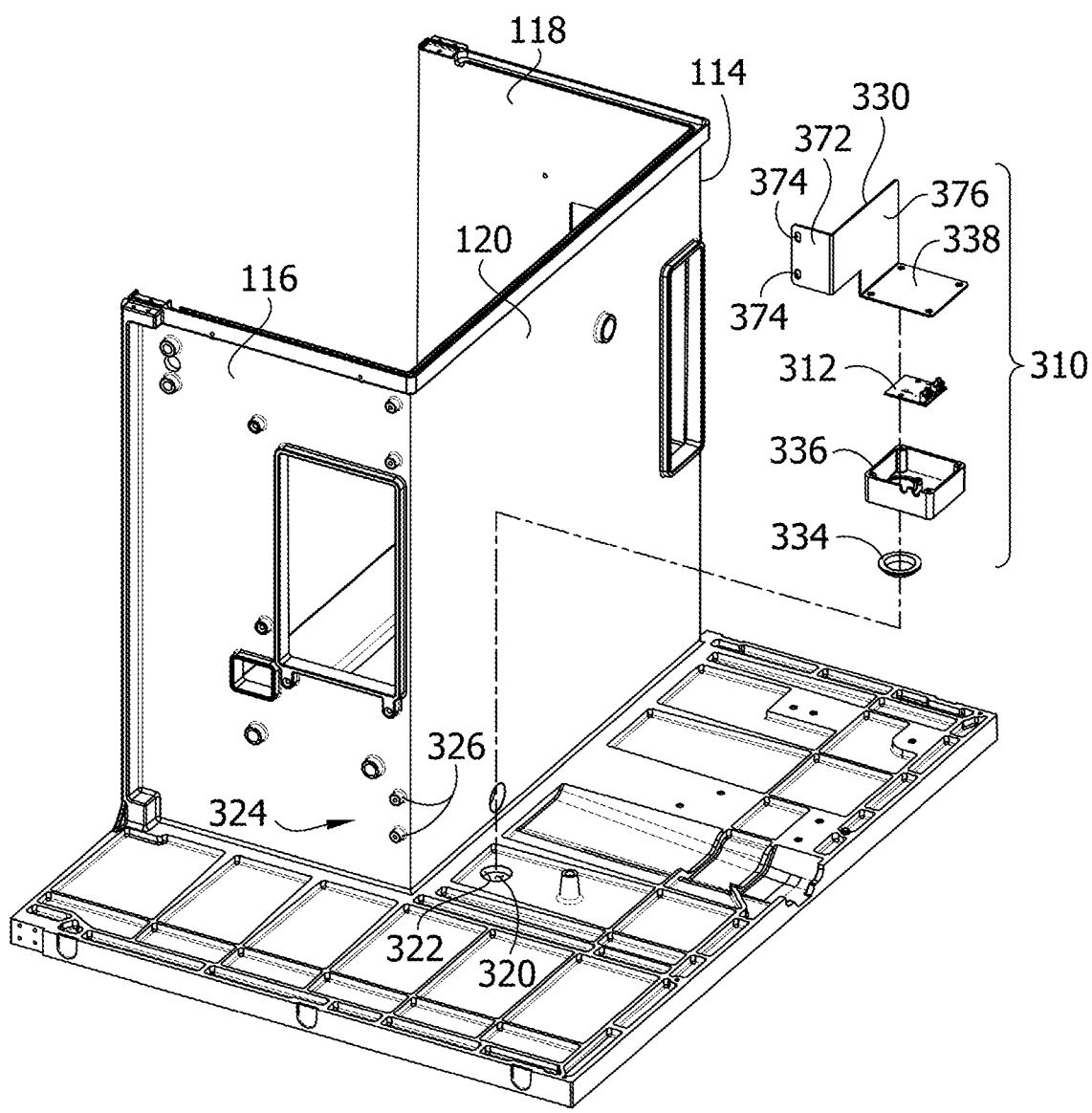
FIG. 36 is an exploded perspective of the sub-assembly of FIG. 34.

In the illustrated embodiment, the support no includes a base 112 and a vertical support wall 114. The illustrated vertical support wall comprises a first side wall portion 116, a second side wall portion 118, and a back wall portion 120 extending widthwise between the first and second side wall portions. A large opening 122 extends widthwise between the front end margins of the side wall portions 116, 118. When the ice maker 10 is fully assembled, this opening 122 is located adjacent a front doorway 268 (FIG. 30) of the enclosure 29 such that a technician can access the components supported on the vertical wall through the opening when the door 52 is open. A drop opening 123 (FIG. 35) is formed in the base 112 of the support and extends widthwise between the side wall portions 116, 118 and forward from the rear wall portion 120. Ice harvested from the ice maker 10 can fall through the drop opening 120 into the ice bin 30 situated below the ice maker.

Each side wall portion 116, 118 includes an integral evaporator mount 124 (broadly, a freeze plate mount). The evaporator mounts 124 are configured to support the evaporator assembly 20 at an operative position in the ice maker 10. Each side wall portion 116, 118 further comprises an integral mounting plate mount 126 that is spaced apart below the evaporator mount 124. The mounting plate mount 126 is configured to support the mounting plate 72 so that the mounting plate can mount the water level sensor fitting 68 and the pump 62 at operative positions in the ice maker 10. An integral sump mount 128 for attaching the sump 70 to the ice maker is spaced apart below the mounting plate mount 126 of each side wall portion 116, 118. In FIGS. 3-5, only the mounts 124, 126, 128 defined by the right side wall portion 116 are shown, but it will be understood that the left side wall portion 118 has substantially identical, mirror-image mounts in the illustrated embodiment.

At least one of the side wall portions 116, 118 that defines the mounts 124, 126, 128 is formed from a single piece of monolithic material. For example, in one or more embodiments, the entire vertical support wall 114 is formed from a single monolithic piece of material. In the illustrated embodiment, the entire support 110, including the base 112 and the vertical support wall 114, is formed from a single piece of monolithic material. In one or more embodiments, the support 11o is a single molded piece. In the illustrated embodiment, the monolithic support no is formed by compression molding. Forming the support 11o from a single piece eliminates the stacking of tolerances that occurs in a multi-part support assembly and thereby increases the accuracy of the placement of the parts that are mounted on the support.

The evaporator mounts 124 are configured to mount the evaporator assembly 20 on the vertical support wall 114 in the enclosure 29 such that the freeze plate 22 slants forward. To accomplish this, each evaporator mount 124 in the illustrated embodiment comprises a lower connection point 130 and an upper connection point 132 forwardly spaced from the lower connection point. As shown in FIG. 5, the connection points 130, 132 are spaced apart along an imaginary line IL1 that is oriented at a forwardly slanted angle α with respect to a plane BP the back wall portion 120 of the vertical support wall 114. In use, the ice maker 10 is positioned so that the plane BP of the back wall portion 120 is substantially parallel to a plumb vertical axis VA. As such, the imaginary line IL1 slants forward with respect to the plumb vertical axis VA at the angle α.

In the illustrated embodiment, each of the upper and lower connection points 130, 132 comprises a screw hole. In use, the evaporator 20 is positioned between the side wall portions 116, 118, and a screw (not shown) is placed through each screw hole into a corresponding pre-formed screw hole associated with the evaporator assembly 20. As explained below, the pre-formed evaporator screw-holes are arranged so that, when they are aligned with the evaporator mount screw holes 130, 132, the freeze plate 22 slants forward. It will be appreciated that an integral evaporator mount can include other types of connection points besides screw holes in one or more embodiments. For example, it is expressly contemplated that one or both of the screw holes 130, 132 could be replaced by an integrally formed stud or other structure that can be used to register and attach a freeze plate to the support at the proper position.

Each mounting plate mount 126 comprises a pair of generally horizontally spaced tapered screw holes 134 (broadly, connection points). Similarly, each sump mount 128 comprises a pair of generally horizontally spaced mounting holes 136 (broadly, connection points). Again, the holes 134, 136 of the mounting plate mount 126 and the sump mount 128 could be replaced with other types of integral connection points in one or more embodiments.

As shown in FIG. 4, in one or more embodiments, the sump 70 is generally sized and arranged for being received in the space between the side wall portions 116, 118 of the vertical support wall 114. Each of a first end portion and a second end portion of the sump 70 that are spaced apart widthwise includes a pair of projections 138 at spaced apart locations. The projections 138 on each end portion of the sump 70 are configured to be received in the pair of mounting holes 136 defined by a respective one of the sump mounts 128. The projections 138, by being received in the mounting holes 136, position the sump 70 at a precisely specified position along the height of the support 110. In addition, a screw (not shown) is inserted through each mounting hole 136 and threaded into each projection 138 to fasten the sump 70 onto the support 11o at the specified position.

Like the sump 70, the illustrated mounting plate 72 comprises a first end portion and a second end portion that are spaced apart widthwise. Each end portion of the mounting plate 114 defines a pair pre-formed screw holes that are configured to be aligned with the screw holes 134 of the corresponding mount 126 of the support 110. Screws (broadly, mechanical fasteners; not shown) pass through the screw holes 134 and thread into the holes that are pre-formed in the mounting plate 72 to connect the mounting plate to the support 11o at a precisely specified position along the height of the support. In one or more embodiments, countersunk screws (e.g., screws with tapered heads) are used to connect the mounting plate 72 to the support 110. The countersunk screws self-center in the tapered screw holes 134.

It can be seen that the one-piece support 11o with integral mounts 124, 126, 128 can be used to ensure that the evaporator assembly 20, the mounting plate 72, and the sump 70 are supported in the ice maker 10 at the specified position. The support 11o can thereby position the freeze plate 22 to optimally balance desired performance characteristics, such as water distribution during ice making and ease/speed of ice-harvesting. Further, the support no can position the mounting plate 72 with respect to the sump 70 so that the pressure sensor fitting 68 mounted in the sensor mount 74 is precisely positioned with respect to the sump for accurately detecting the water level using the sensor 64. Likewise, the support no positions the mounting plate 72 with respect to the sump 70 so that the pump 62 is precisely positioned for pumping water from the sump 70 through the ice maker 10 when the pump is mounted on the pump mount 76.

VI. Freeze Plate

Figure 6:
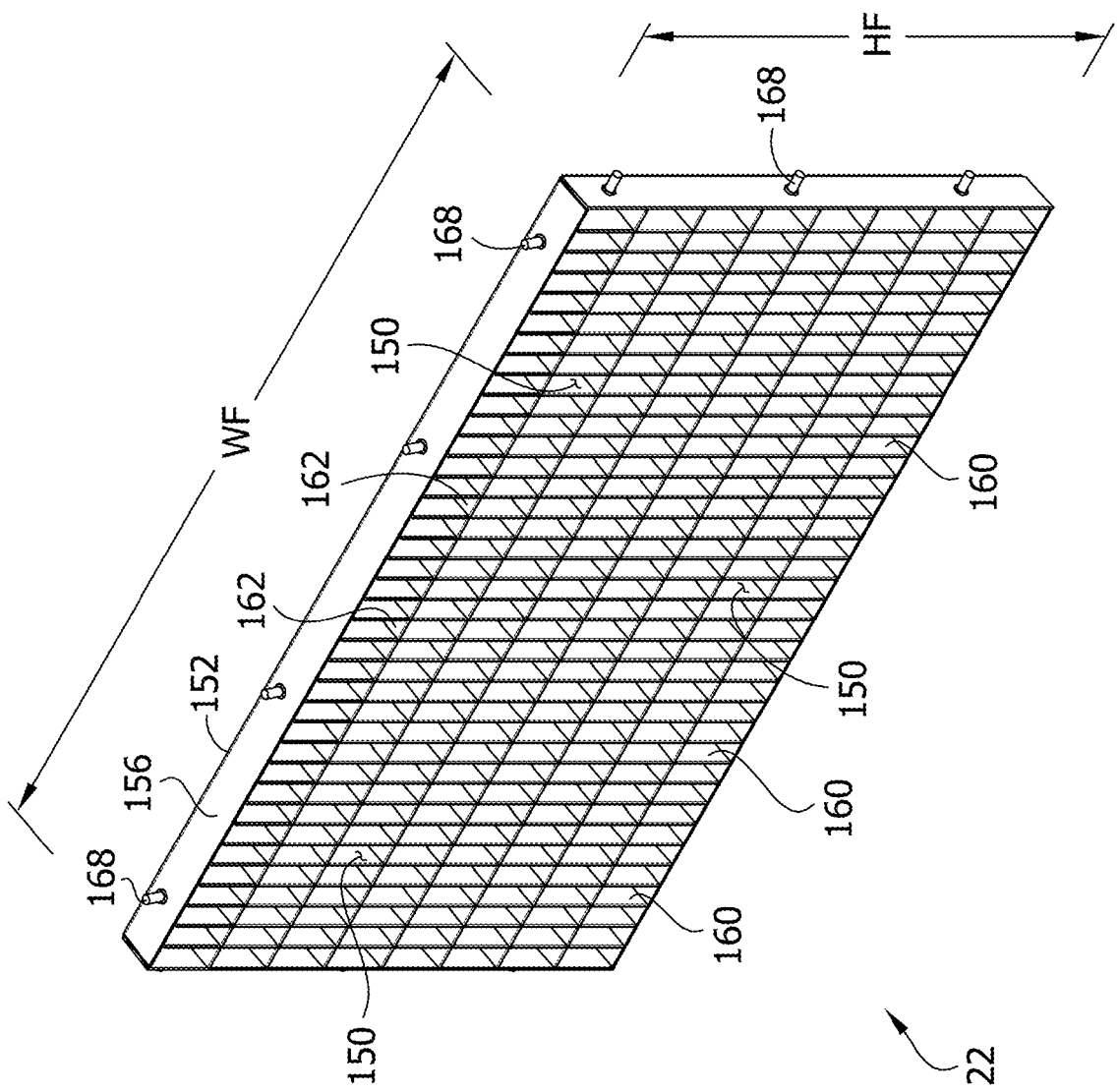
FIG. 6 is a perspective of a freeze plate of the ice maker.
Figure 7:
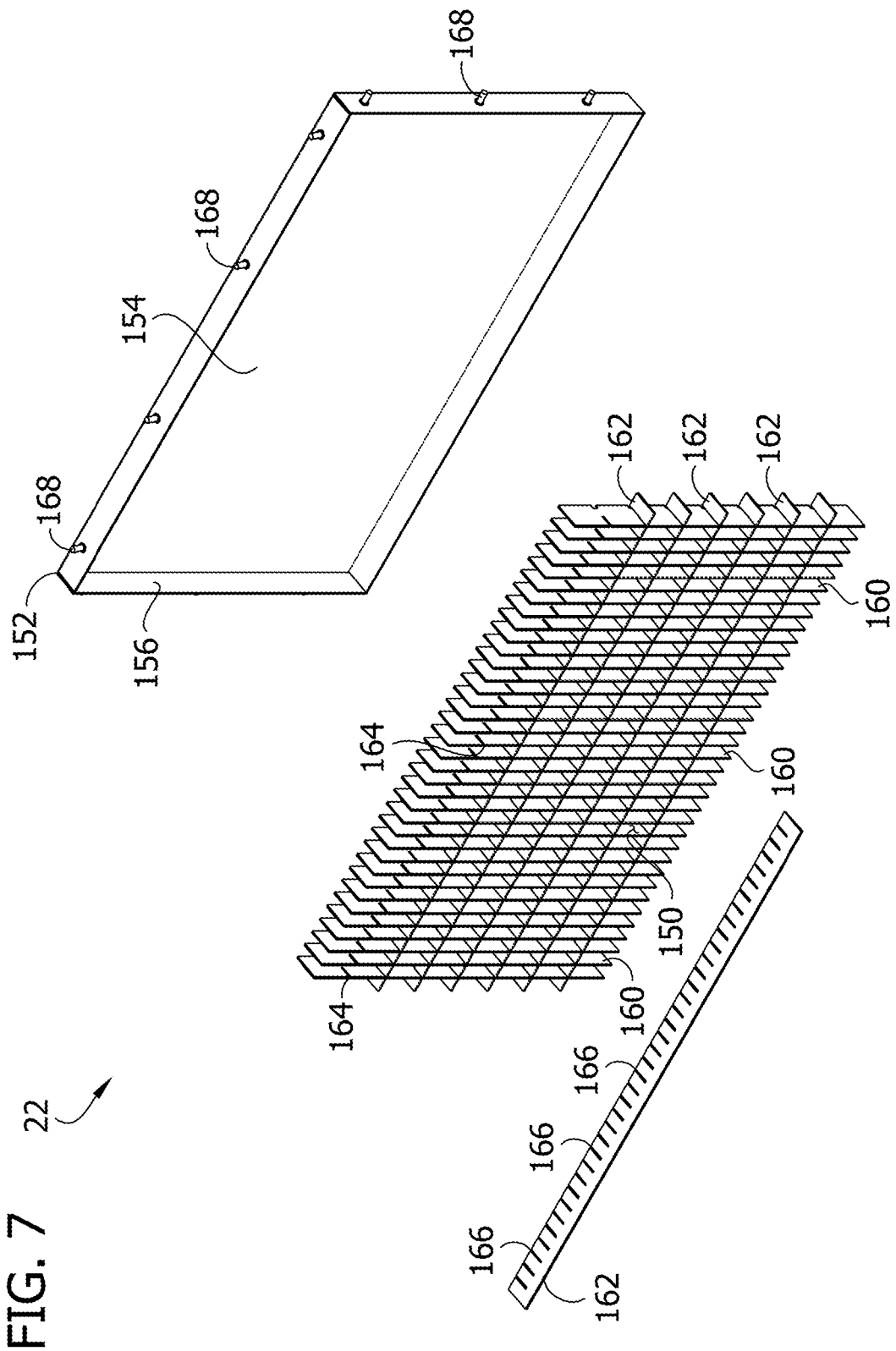
FIG. 7 is an exploded perspective of the freeze plate.
Figure 8:
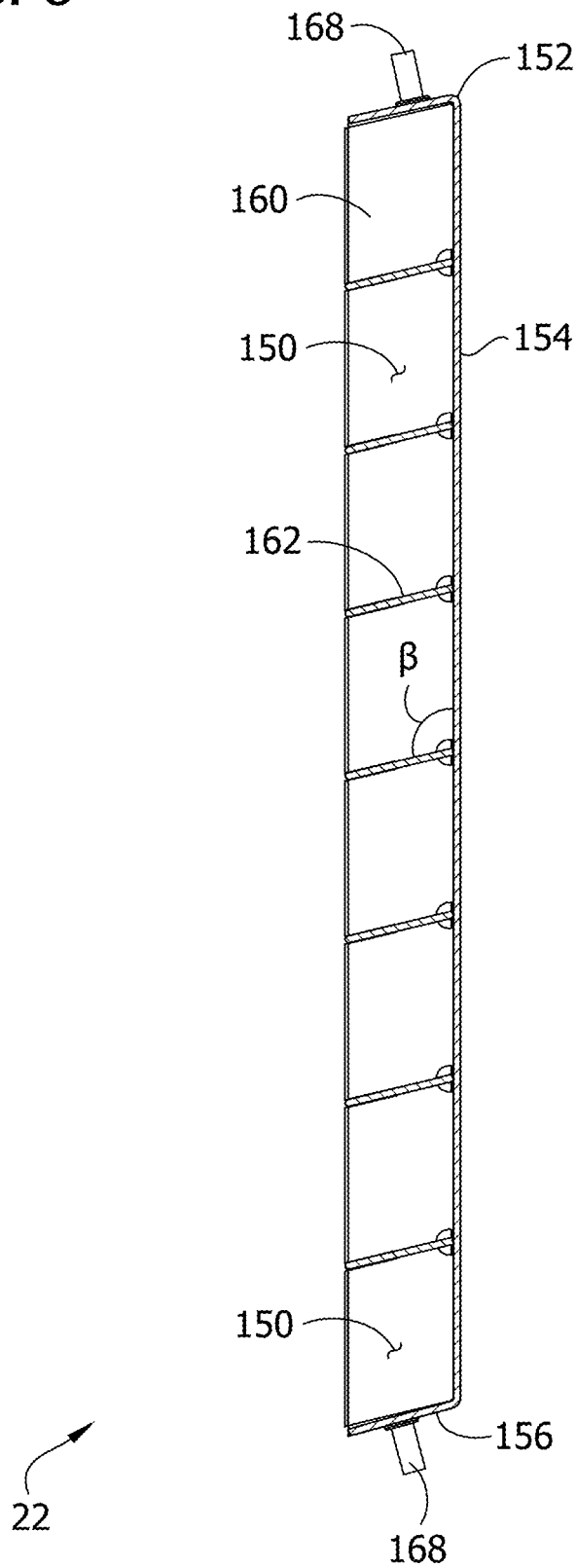
FIG. 8 is a vertical cross section of the freeze plate.

Referring to FIGS. 6-8, an exemplary embodiment of the freeze plate 22 will now be described, before turning to other components of the evaporator assembly 20 that attach the freeze plate to the support no. The freeze plate 22 defines a plurality of molds 150 in which the ice maker 10 is configured to form ice. The freeze plate 22 has a front defining open front ends of the molds 150, a back defining enclosed rear ends of the molds, a top portion and a bottom portion spaced apart along a height HF, and a right side portion (broadly, a first side portion) and a left side portion (broadly, a second side portion) spaced apart along a width WF.

Throughout this disclosure, when the terms "front," "back," "rear," "forward," "rearward," and the like are used in reference to any part of the evaporator assembly 20, the relative positions of the open front ends and enclosed rear ends of the freeze plate molds 150 provide a spatial frame of reference. For instance, the front of the freeze plate 22 that defines the open front ends of the molds 150 is spaced apart from the rear of the freeze plate in a forward direction FD (FIG. 8), and the back of the freeze plate that extends along the enclosed rear ends of the molds is spaced apart from the front of the freeze plate in a rearward direction RD.

In the illustrated embodiment, the freeze plate 22 comprises a pan 152 having a back wall 154 that defines the back of the freeze plate. Suitably, the pan 152 is formed from thermally conductive material such as copper, optionally having one or more surfaces coated with a food-safe material. As is known in the art, the evaporator tubing 21 is thermally coupled to the back wall 154 of the freeze plate 22 for cooling the freeze plate during ice making cycles and warming the freeze plate during harvest cycles.

The pan 152 further comprises a perimeter wall 156 that extends forward from the back wall 154. The perimeter wall 156 includes a top wall portion, a bottom wall portion, a right side wall portion (broadly, a first side wall portion), and a left side wall portion (broadly, a second side wall portion). The side wall portions of the perimeter wall 156 define the opposite sides of the freeze plate 22, and the top and bottom wall portions of the perimeter wall define the top and bottom ends of the freeze plate. The perimeter wall 156 could be formed from one or more discrete pieces that are joined to the back wall 154 or the pan 152, or the entire pan could be formed from a single monolithic piece of material in one or more embodiments. Suitably, the perimeter wall 156 is sealed to the back wall 154 so that water flowing down the freeze plate 22 does not leak through the back of the freeze plate.

A plurality of heightwise and widthwise divider plates 160, 162 are secured to the pan to form a lattice of the ice cube molds 150. In an exemplary embodiment, each heightwise divider plate 16o and each widthwise divider plate 162 is formed from a single piece of monolithic material. Each heightwise divider plate 16o has a right lateral side surface (broadly, a first lateral side surface) and a left lateral side surface (broadly a second lateral side surface) oriented parallel to the right lateral side surface. Each widthwise divider plate 162 has a bottom surface and a top surface oriented parallel to the bottom surface. The heightwise divider plates 162 extend from lower ends that are sealingly connected to the bottom wall portion of the perimeter wall 156 to upper ends that are sealingly connected to the top wall portion of the perimeter wall. The plurality of widthwise divider plates 16o similarly extend from first ends sealingly connected to the right side wall portion of the perimeter wall 156 to second ends sealingly connected to the left side wall portion of the perimeter wall.

Generally, the heightwise divider plates 16o and the widthwise divider plates 162 are interconnected in such a way as to define a plurality of ice molds 150 within the perimeter wall 156. For example, in the illustrated embodiment, each of the heightwise divider plates 16o has a plurality of vertically-spaced, forwardly-opening slots 164; each of the widthwise diver plates has a plurality of horizontally-spaced, rearwardly-opening slots 166; and the heightwise and widthwise divider plates are interlocked at the slots 164, 166 to form the lattice. Suitably, each widthwise divider plate 162 defines a plurality of the molds 150 (e.g., at least three molds) immediately above the divider plate and a plurality of the molds (e.g., at least three molds) immediately below the divider plate. Each heightwise divider plate 16o likewise defines a plurality of the molds 150 (e.g., at least three molds) immediately to one lateral side of the divider plate and a plurality of the molds (e.g., at least three molds) immediately to the opposite lateral side of the divider plate.

Each of the divider plates 160, 162 has a front edge and a back edge. The back edges may suitably be sealingly joined to the back wall 154 of the freeze plate pan 152. When the freeze plate 22 is assembled, the front edges of some or all of the divider plates 160, 162 (e.g., at least the widthwise divider plates) lie substantially on a front plane FP (FIG. 8) of the freeze plate 22. In one or more embodiments, the front plane FP is parallel to the back wall 154.

A plurality of the ice molds 150 formed in the freeze plate 22 are interior ice molds having perimeters defined substantially entirely by the heightwise and widthwise divider plates 160, 162. Others of the molds 150 are perimeter molds having portions of their perimeters formed by the perimeter wall 156 of the freeze plate pan 152. Each interior ice mold 150 has an upper end defined substantially entirely by the bottom surface of one of the widthwise divider plates 162 and a lower end defined substantially entirely by the top surface of an adjacent one of the widthwise divider plates. In addition, each interior mold 150 has a left lateral side defined substantially entirely by a right lateral side surface of a heightwise divider plate 162 and a right lateral side defined substantially entirely by a left lateral side surface of the adjacent heightwise divider plate.

As shown in FIG. 8, each widthwise divider plate 162 slopes downward and forward from the back wall 154 of the freeze plate 22 such that an included angle β between an upper surface of each widthwise divider plate and the back wall is greater than 90°. In one or more embodiments, the included angle β is at least 100° and less than 180°. It can be seen that the included angle between the top surface of each widthwise divider plate 16 and the front plane FP is substantially equal to the included angle β. Further, it can be seen that the included angle between the bottom surface of each horizontal divider plate 162 and the back wall 154 (and also the included angle between the bottom surface of each horizontal divider plate 162 and the front plane FP) is substantially equal to 180° minus β. The top and bottom portions of the perimeter wall 156 of the pan are oriented substantially parallel to the widthwise divider plates 162 in one or more embodiments.

A series of threaded studs 168 extend outward from the perimeter wall 156 at spaced apart locations around the perimeter of the freeze plate 22. As will be explained in further detail below, the threaded studs 168 are used to secure the freeze plate 22 to an evaporator housing 170 that attaches the evaporator assembly 20 to the support 11o. The studs 168 are suitably shaped and arranged to connect the freeze plate 22 to the evaporator housing 170, and further to the support 11o, such that the back wall 154 and front plane FP of the freeze plate slants forward when the freeze plate is installed in the ice maker 10.

VII. Evaporator Housing

Referring to FIGS. 9-14, the evaporator housing 170 will now be described in greater detail. In general, the evaporator housing 170 is configured to support the evaporator tubing 21 and the freeze plate 22. As will be explained in further detail below, the water distributor 25 is integrated directly into (i.e., forms a part of) the evaporator housing 170. The evaporator housing 170 comprises a frame including a bottom piece 172, a top piece 174, and first and second side pieces 176 that together extend around the perimeter of the freeze plate 22. Each of the bottom piece 172, the top piece 174, and the opposite side pieces 176 is formed from a single, monolithic piece of material (e.g., molded plastic), in one or more embodiments. The inner surfaces of the bottom piece 172, the top piece 174, and the opposite side pieces 176 may include a gasket (not shown) to aid in watertight sealing of the evaporator housing. The top piece 174 of the evaporator housing 170 forms a bottom piece (broadly, a first piece) of the two-piece distributor 25 in the illustrated embodiment.

Figure 14:
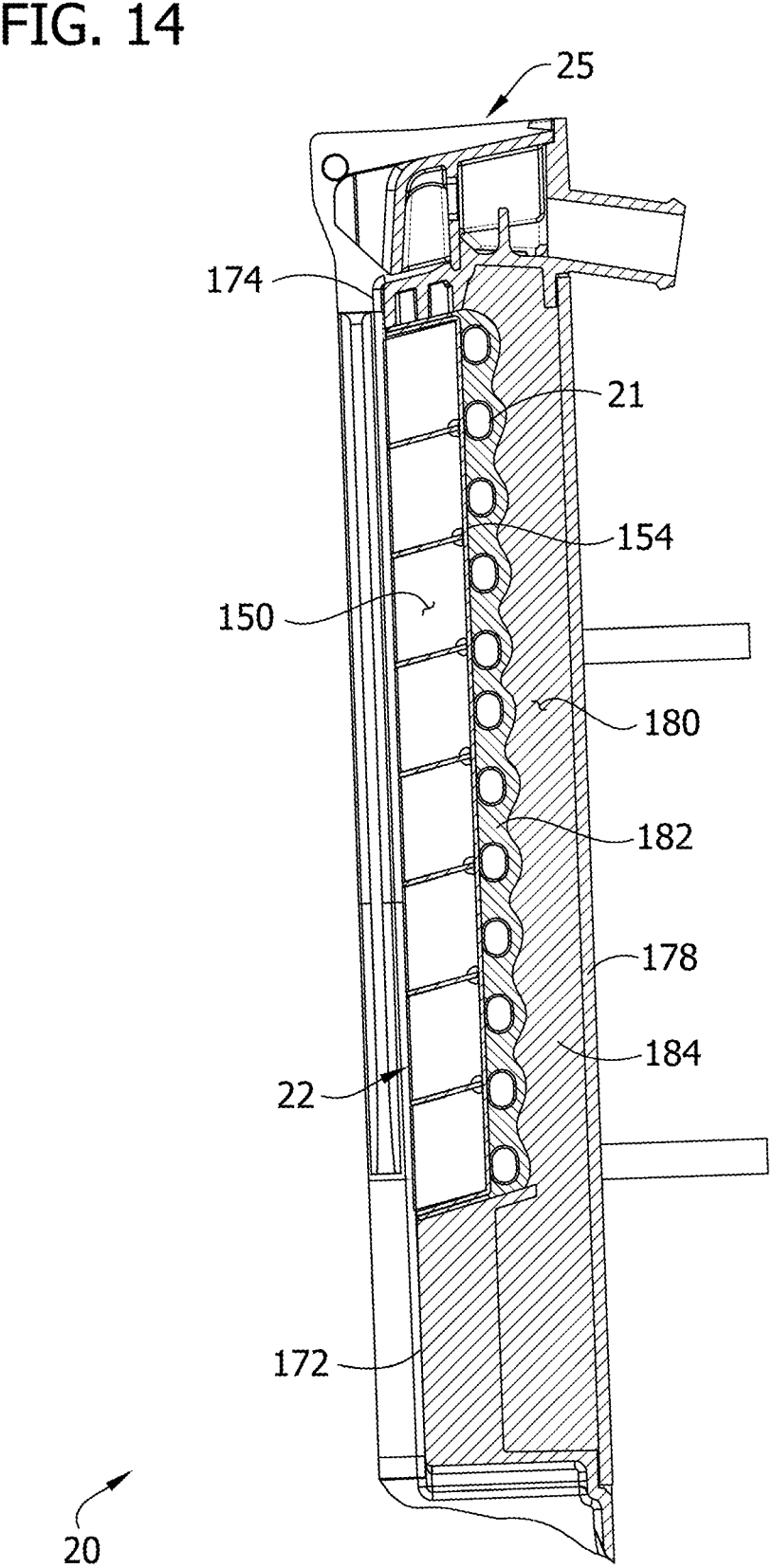
FIG. 14 is a cross section of the evaporator assembly taken in the plane of line 14-14 of FIG. 11.

A back wall 178 is supported on the assembled frame pieces 172, 174, 176, 178 in spaced apart relationship with the back wall 154 of the freeze plate 22. As shown in FIG. 14, the evaporator housing 170 defines an enclosed space 18o between the back wall 154 of the freeze plate 22 and the back wall 178 of the housing. As explained in U.S. Patent Application Publication No. 2018/0142932, which is hereby incorporated by reference in its entirety, in one or more embodiments, two discrete layers 182, 184 of insulation fills enclosed space 176 and thoroughly insulates the evaporator tubing 21.

The bottom piece 172, the top piece 174, the opposite side pieces 176, and/or the back wall 178 may have features that facilitate assembling them together to form the evaporator housing 170 in a variety of ways, including snap-fit features, bolts and nuts, etc. For example, each of the frame pieces 172, 174, 176 comprises stud openings 186 that are arranged to receive the studs 168 on the corresponding wall portion of the perimeter wall 156 of the freeze plate 22. Some of the stud holes 186 are visible in FIG. 12. In one or more embodiments, the back wall 178 is joined to the assembled frame pieces 172, 174, 176 by ultrasonic welding.

Figure 15:
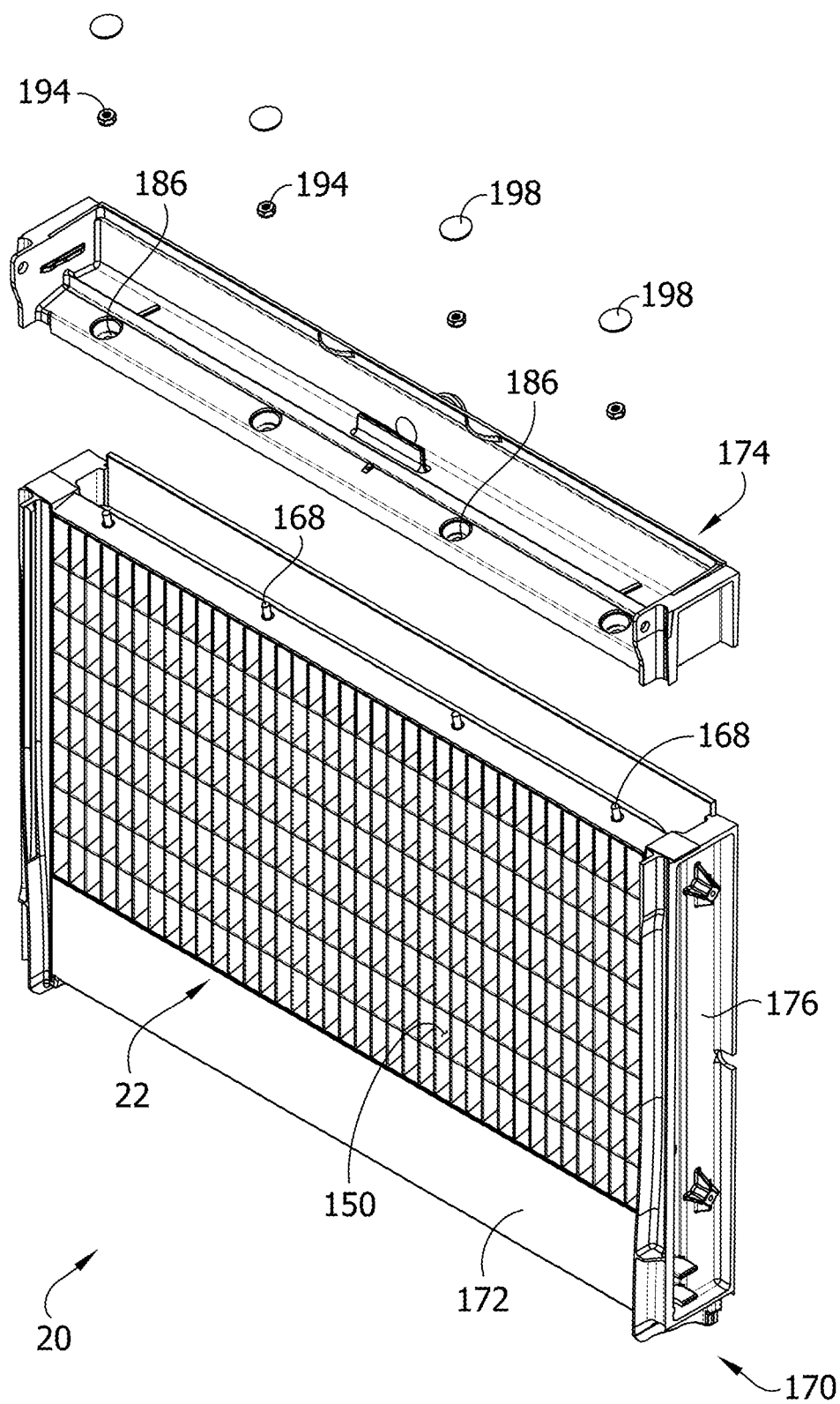
FIG. 15 is a perspective of the evaporator assembly with a top distributor piece removed and showing a bottom distributor piece/top evaporator housing piece and components associated therewith exploded away from the remainder of the evaporator assembly.
Figure 16:
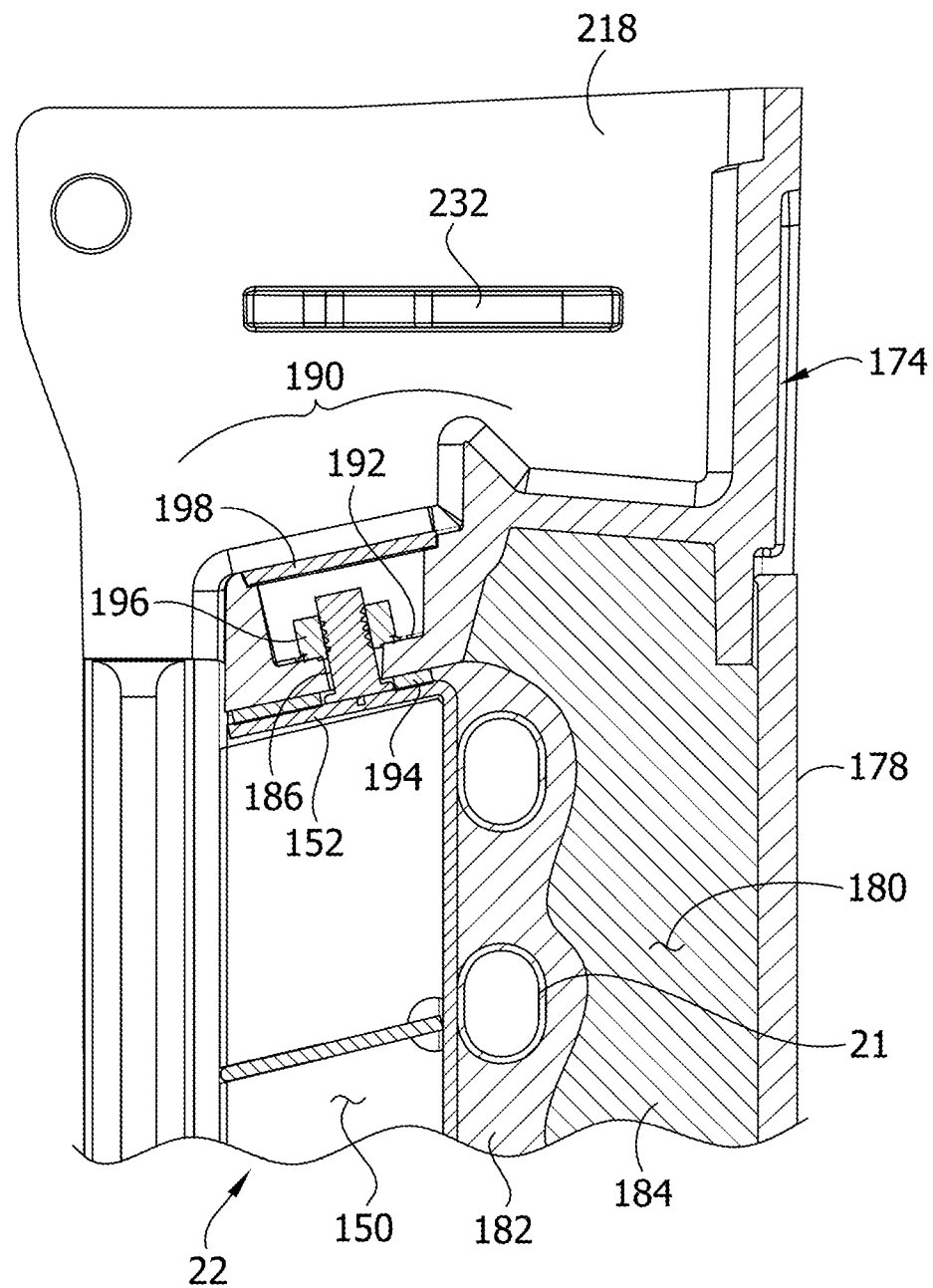
FIG. 16 is an enlarged vertical cross section of the components of the evaporator assembly shown in FIG. 15 taken in a plane that passes through a stud of the freeze plate.

Referring to FIGS. 15 and 16, one example of how the housing pieces 172, 174, 176 attach to the freeze plate 72 is shown in greater detail. Specifically, the top housing piece 174 is shown, but it will be understood that the other housing pieces may attach to the freeze plate in a like manner. The top piece 174 includes a front section that defines the stud openings 186. In the illustrated embodiment, each stud opening 186 comprises a countersunk screw recess that includes an annular shoulder 192. The top piece 174 is positioned atop the freeze plate 22 such that one stud 168 is received in each of the openings 186. In the illustrated embodiment, a gasket 194 is located between the top of the freeze plate 22 and the bottom of the top piece 174 to seal the interface between the two parts. Nuts 196 are tightened onto each of the studs 168 to attach the top piece 174 to the freeze plate 22. Further, because the housing top piece 174 forms the bottom piece of the distributor 25, tightening the nuts 196 onto the studs also attaches the distributor directly to the freeze plate in the illustrated embodiment. Each nut 196 is tightened against the shoulder 192 of a respective countersunk recesses 186 (broadly, the nuts are tightened directly against the top housing piece 170 or bottom distributor piece). In the illustrated embodiment, caps 198 are placed over the tops of the countersunk recesses 186. Suitably, the tops of the caps 198 are substantially flush with the surface of the piece 174 to present a smooth surface to water flowing through the distributor 25.

VIII. Mounting of Evaporator Assembly so that Freeze Plate Slants Forward

Figure 17:
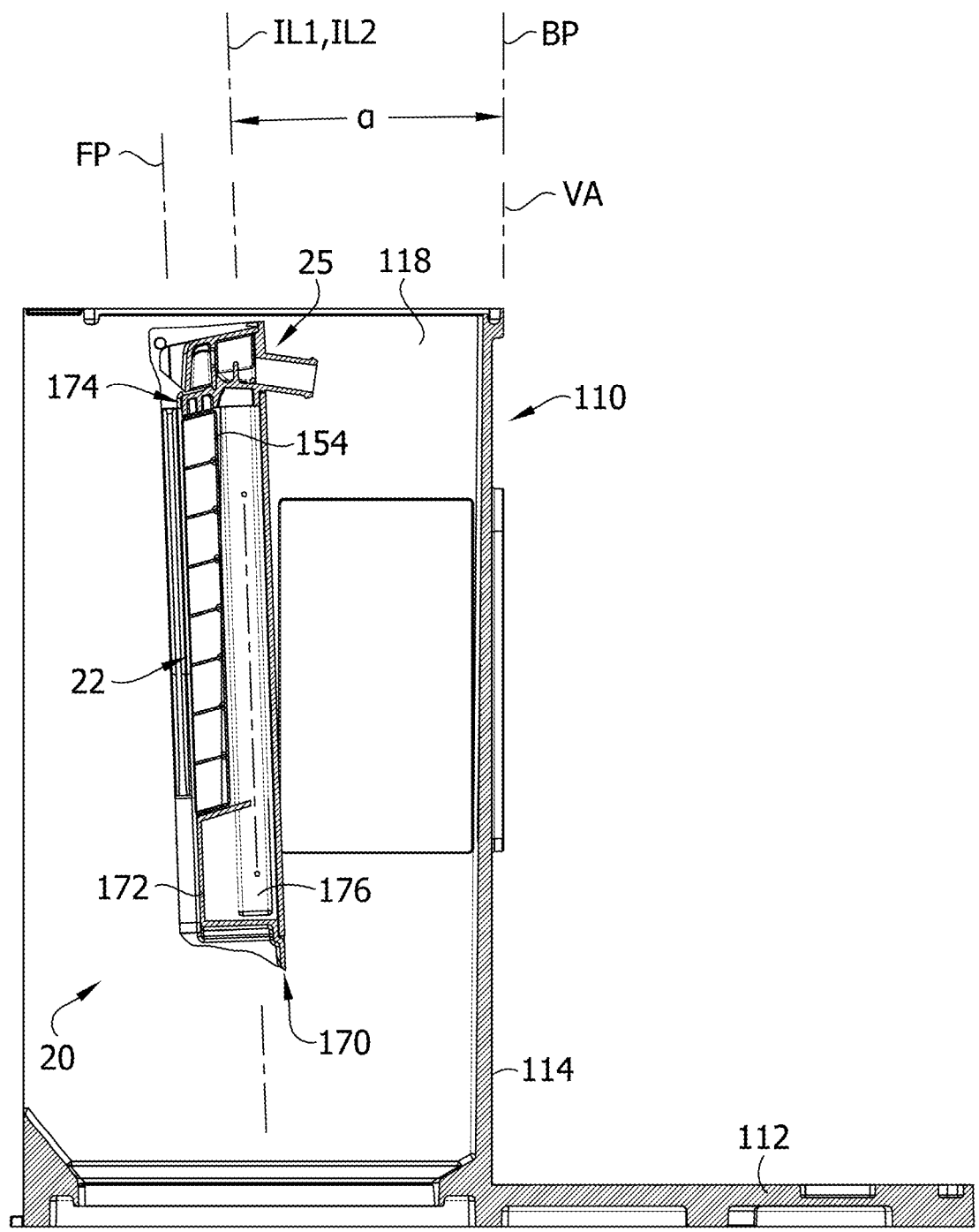
FIG. 17 is vertical cross section of the evaporator assembly mounted on the support.

Referring again to FIGS. 9 and 10, each of the side pieces 176 of the evaporator housing 170 include pre-formed lower and upper screw openings 200, 202 at vertically spaced apart locations. The upper and lower screw openings 200, 202 are configured to be positioned in registration with the screw openings 130, 132 of a respective side wall portion 116, 118 of the support 110. When each side piece 176 is secured to the freeze plate 22 via the studs 168, the screw openings 200, 202 are spaced apart along an imaginary line IL2 oriented substantially parallel to the back wall 154 and the front plane FP of the freeze plate 22. Referring to FIG. 17, when screws (not shown) secure the evaporator assembly 20 to the support 11o via the aligned lower screw openings 130, 200 and the aligned upper screw openings 132, 202, the imaginary line IL2 of the evaporator housing 170 is aligned with the forwardly slanted imaginary line IL1 of the support.

Thus, the screw openings 130, 132, 200, 202 position the freeze plate 22 on the support 11o so that the back wall 154 and front plane FP are oriented at the forwardly slanted angle α with respect to both the plumb vertical axis VA and the back plane BP of the support 110. In one or more embodiments, the included angle α between the back wall 154/front plane FP and the plumb vertical axis VA/back plane BP is at least about 1.5°. For example, in an exemplary embodiment, the included angle α is about 2.0°. Accordingly, the illustrated ice maker 10 is configured to mount the freeze plate 22 in the enclosure 29 so that the back wall 154 slants forward. It will be appreciated that, though the one-piece support 110 and the side pieces 176 of the evaporator housing 170 are used to mount the freeze plate 22 in the slanted orientation in the illustrated embodiment, other ways of mounting a freeze plate may be used in other embodiments.

It is believed that conventional wisdom in the field of ice makers held that orienting a freeze plate with grid-type divider plates so that the back wall of the freeze plate slants forward would adversely affect the water distribution performance of the ice maker. However, because of the high-quality flow distribution produced by the water distributor 25—achieved, for example, using one or more of the water distribution features described below-water is effectively distributed to the molds 150 even though the freeze plate 22 is mounted with the back wall 154 slanted forward. Further, the slanted freeze plate 22 enables the ice maker 10 to harvest ice quickly, using gravitational forces. In one or more embodiments, the ice maker 10 is configured to execute a harvest cycle by which ice is released from the molds 150 of the freeze plate 22, wherein substantially the only forces imparted on the ice during the harvest cycle are gravitational forces. For example, the harvest cycle is executed by actuating the hot gas valve 24 to redirect hot refrigerant gas back to the evaporator tubing 21, thereby warming the freeze plate 22. The ice in the molds 150 begins to melt and slides forward down the sloping widthwise divider plates 162, off the freeze plate, and into the ice bin 30. In a harvest cycle in which substantially the only forces imparted on the ice are gravitational forces, no mechanical actuators, pressurized air jets, or the like are used to forcibly push the ice off of the freeze plate 22. Rather, the slightly melted ice falls by gravity off of the freeze plate 22.

IX. Water Distributor

Figure 9:
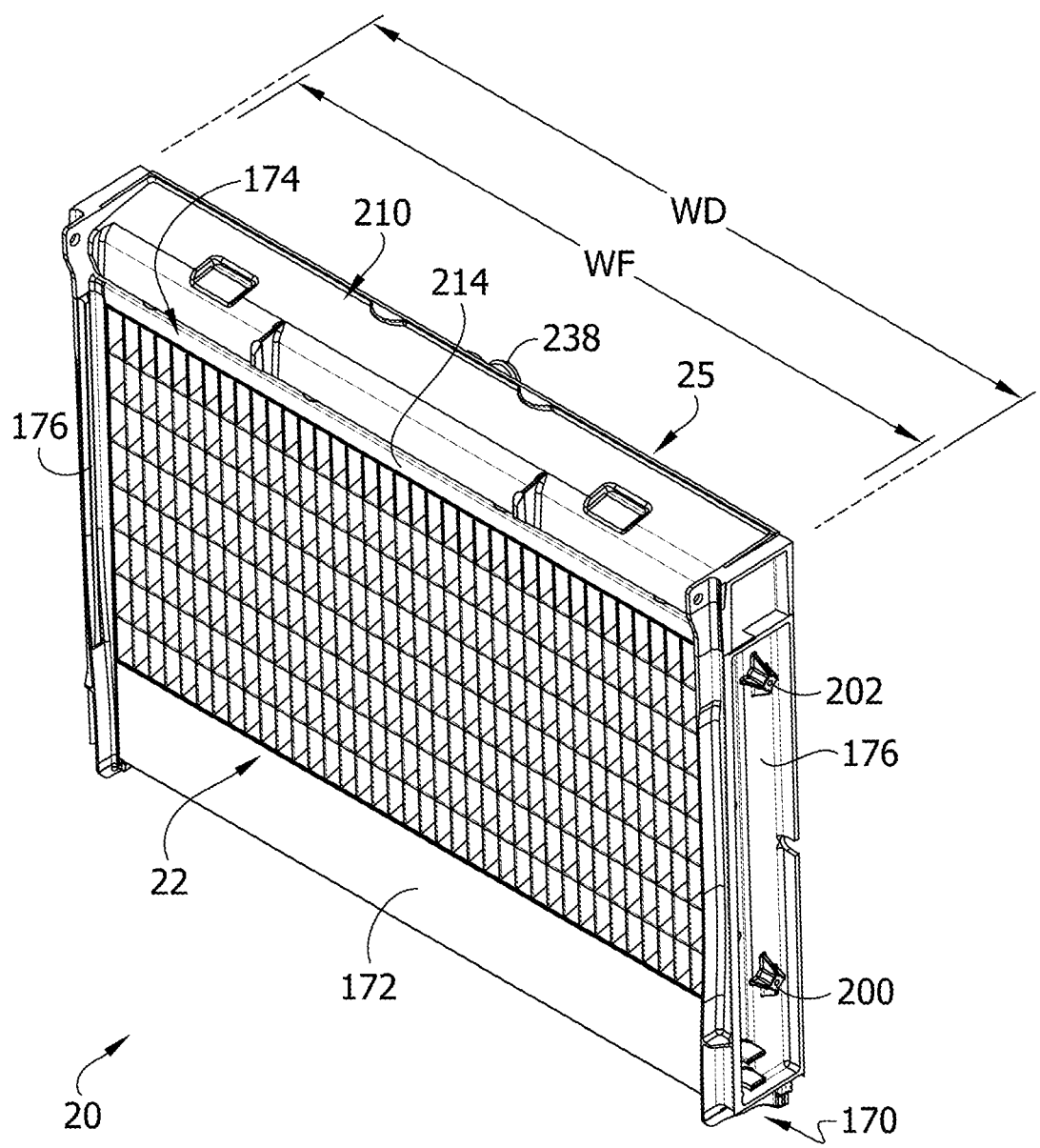
FIG. 9 is a perspective of the evaporator assembly.
Figure 10:
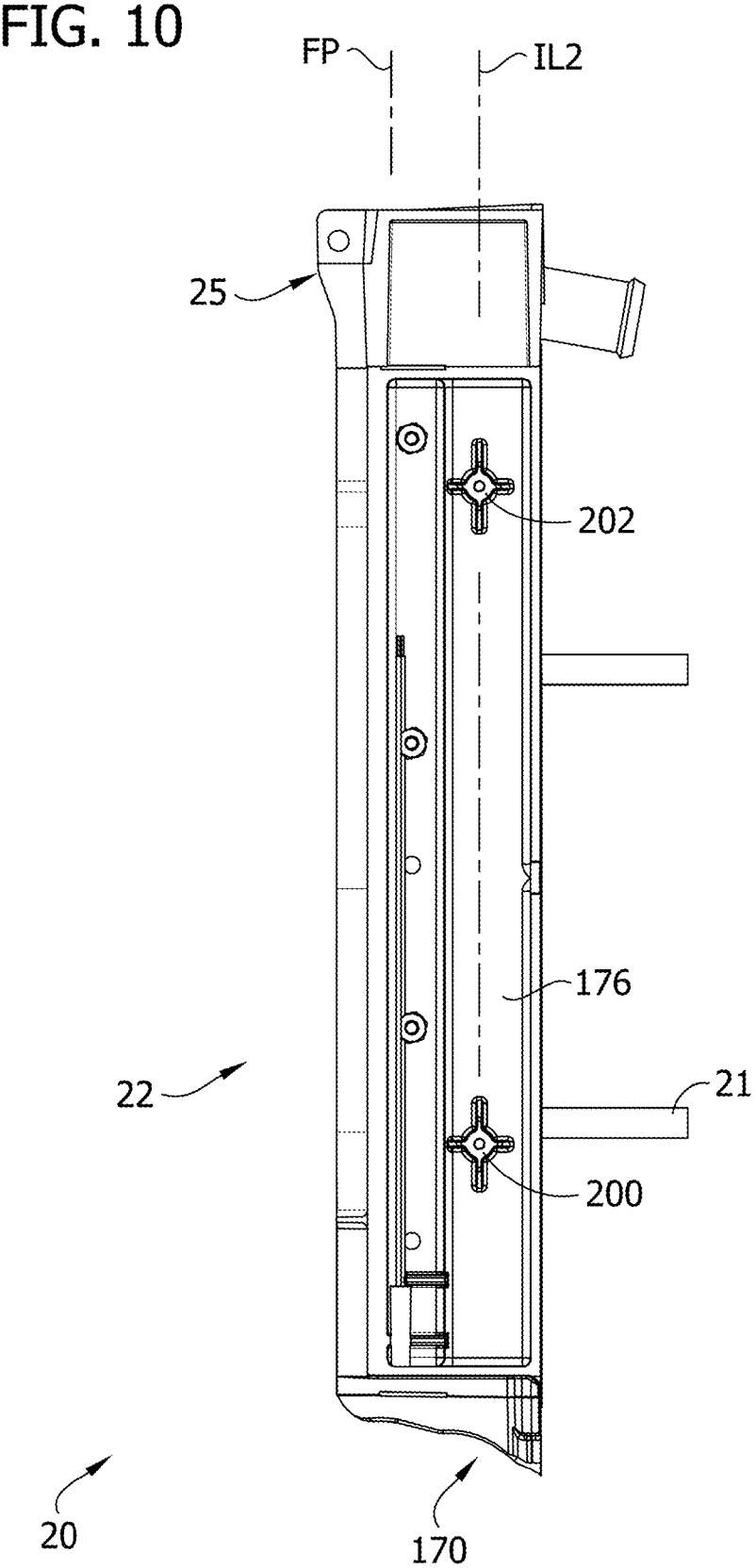
FIG. 10 is a side elevation of the evaporator assembly.
Figure 11:
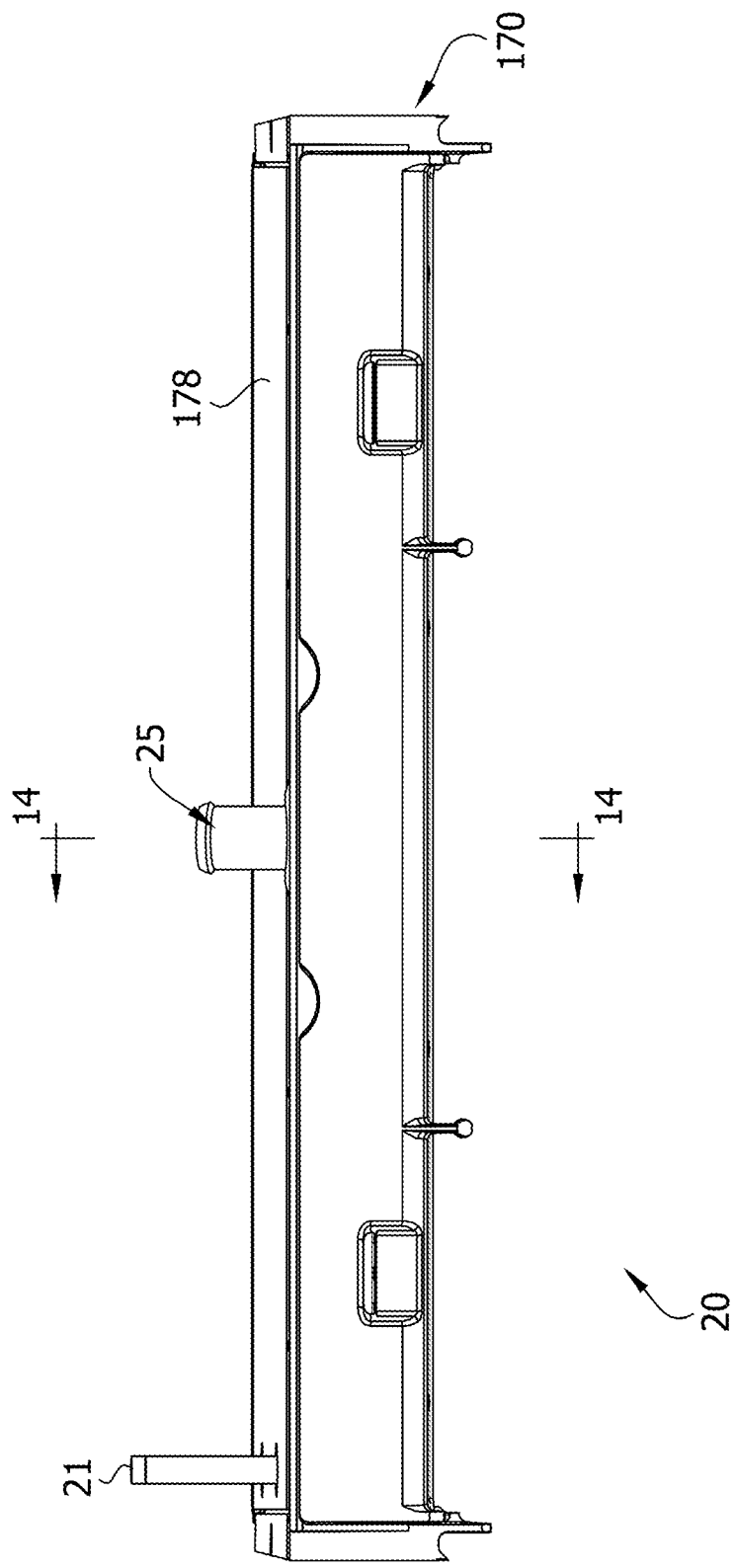
FIG. 11 is a top plan view of the evaporator assembly.
Figure 12:
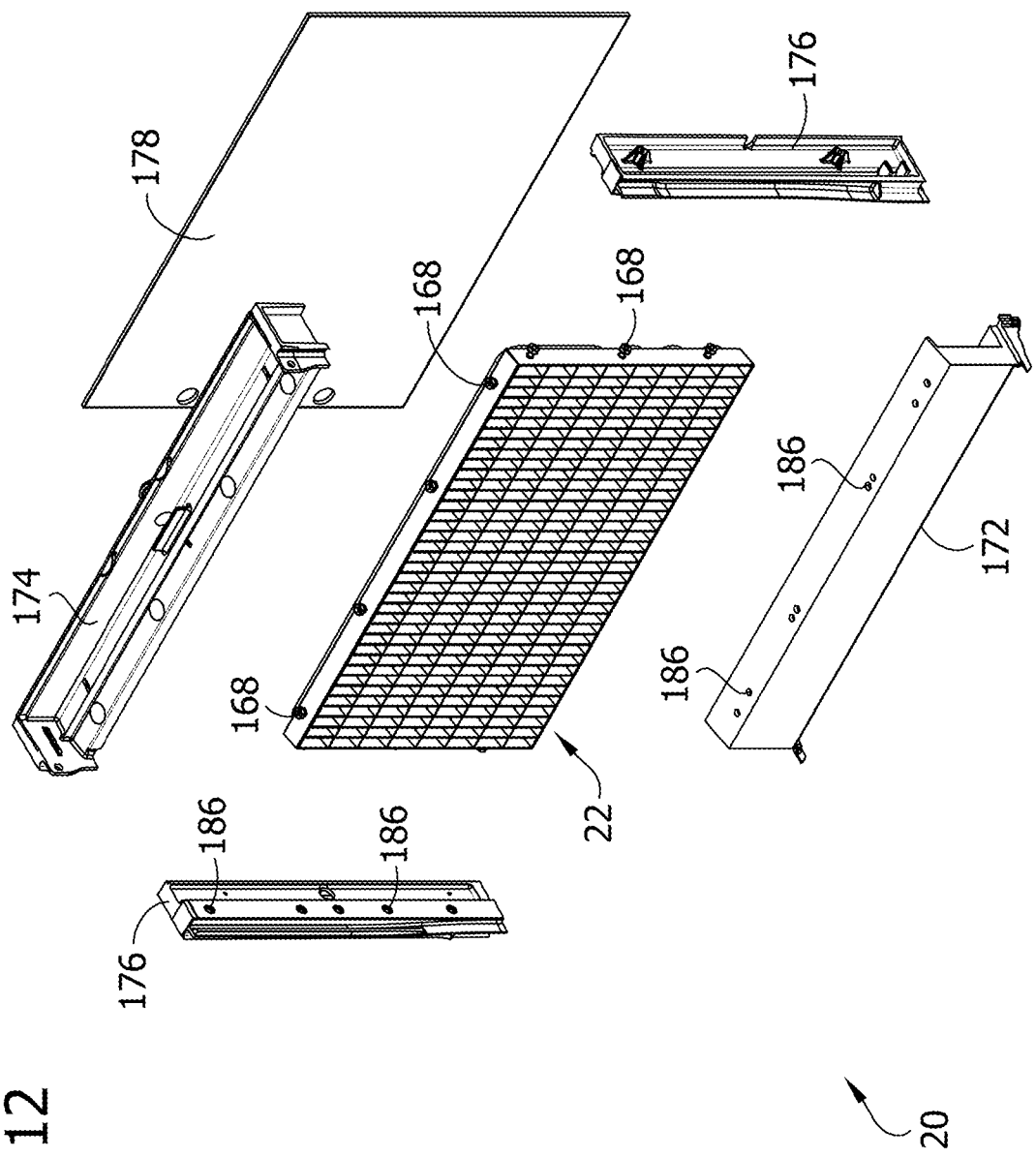
FIG. 12 is an exploded perspective of the evaporator assembly.
Figure 13:
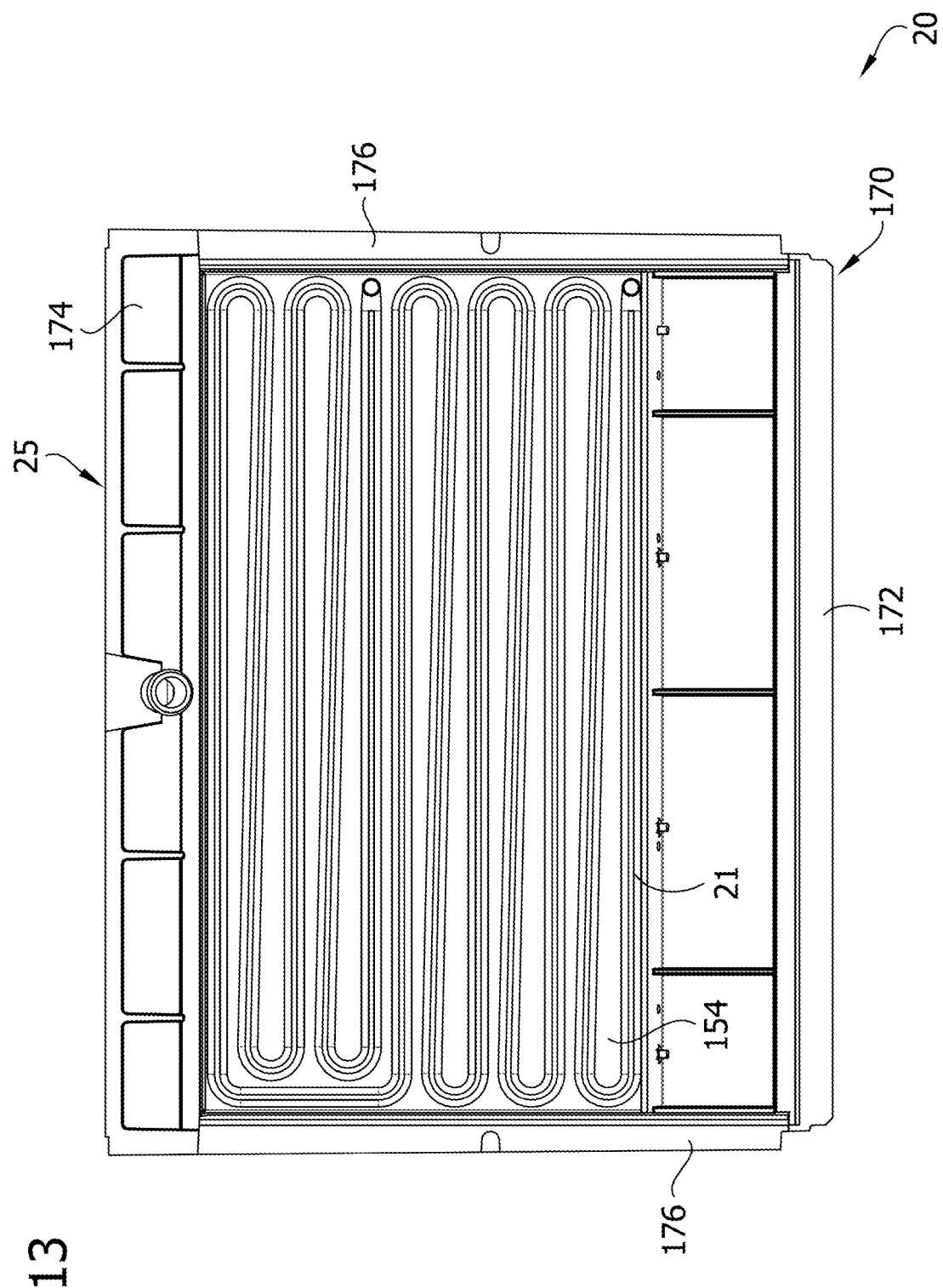
FIG. 13 is a rear elevation of the evaporator assembly with back wall removed to reveal serpentine evaporator tubing.
Figure 18:
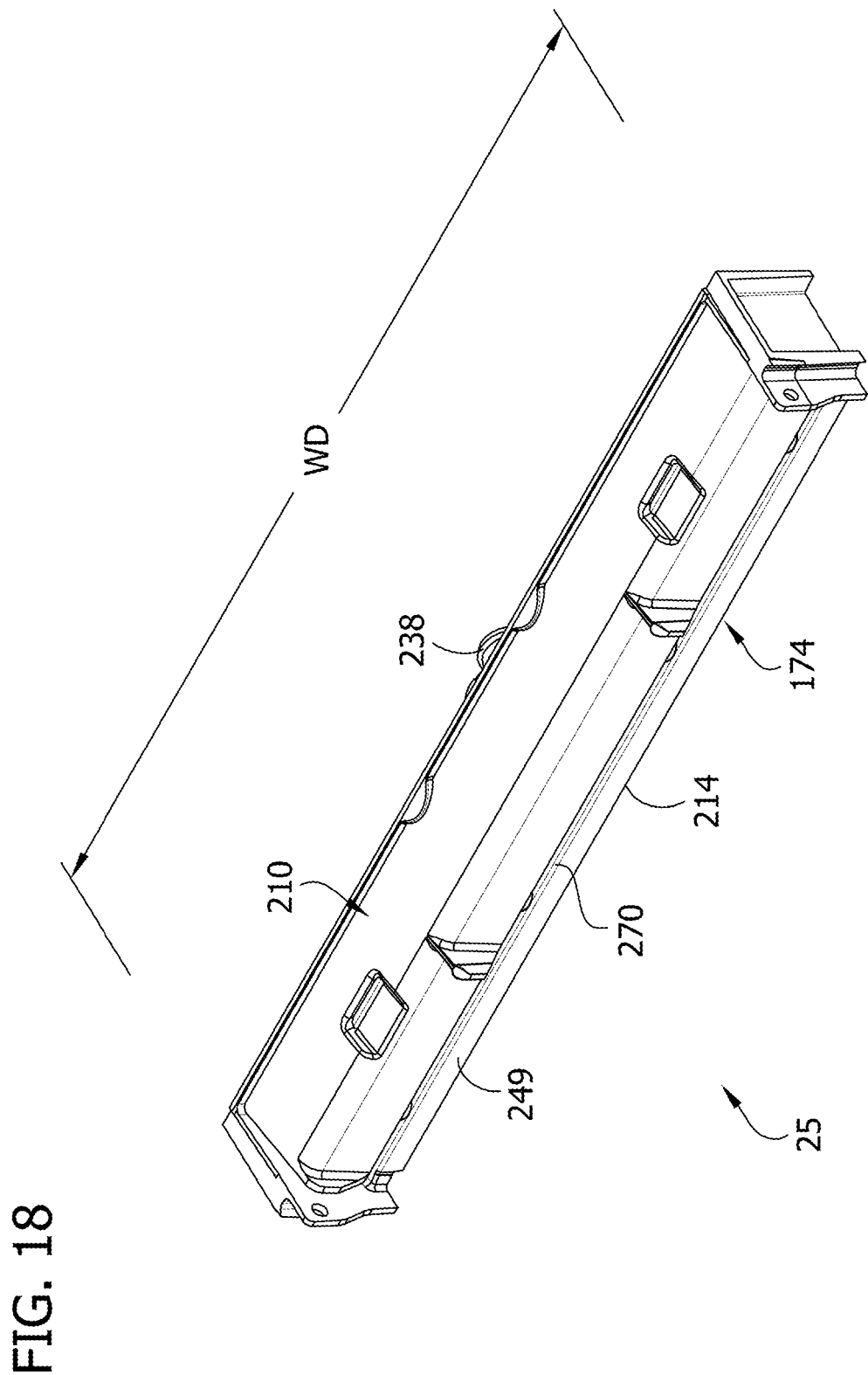
FIG. 18 is a perspective of a distributor of the evaporator assembly.
Figure 19:
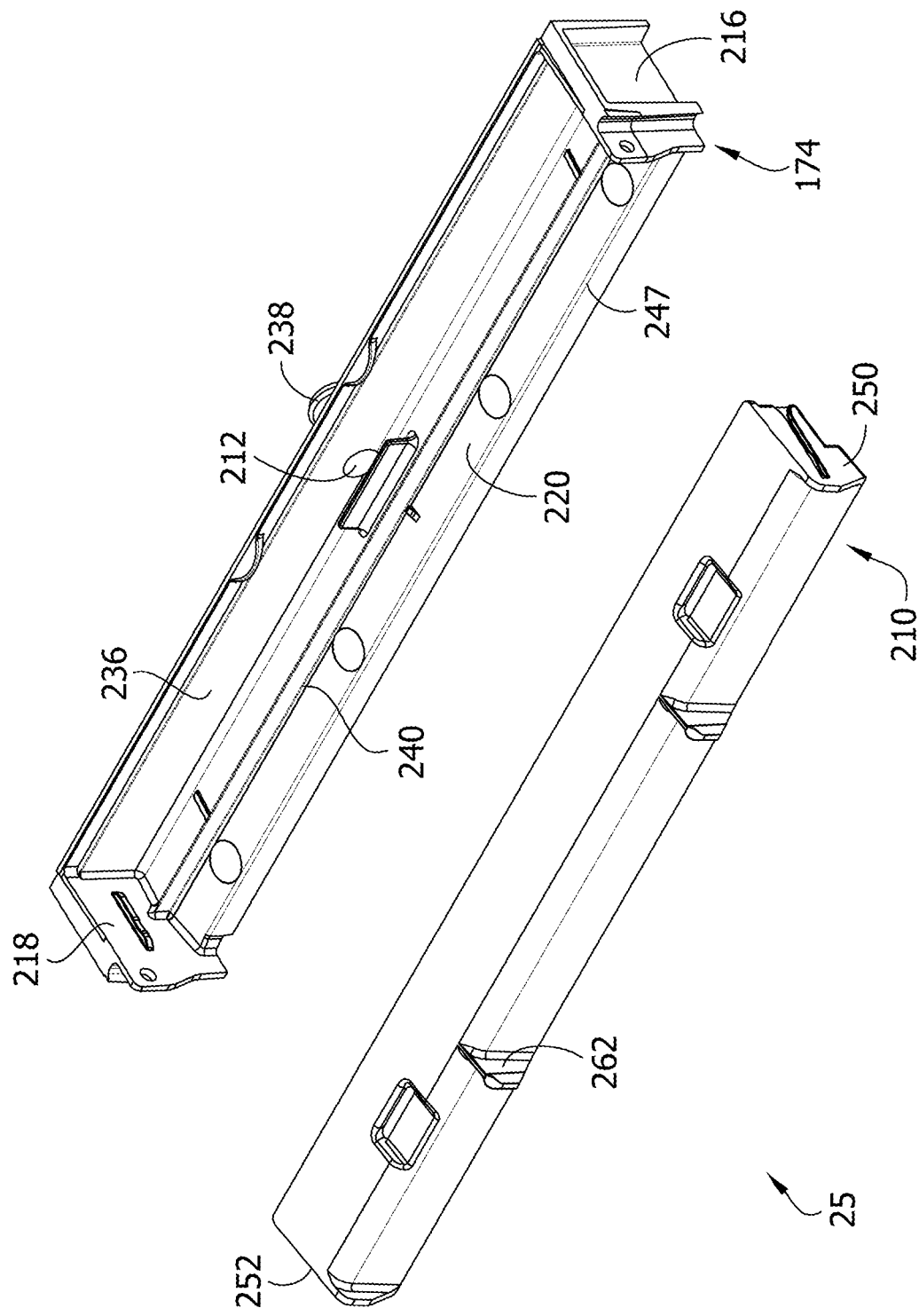
FIG. 19 is an exploded perspective of the distributor.

Referring now to FIGS. 9 and 18-19, an exemplary embodiment of the distributor 25 will now be described. As explained above, the distributor comprises a bottom piece 174 that forms a top piece of the evaporator housing 170. The distributor 25 further comprises a top piece 210 that releasably attaches to the bottom piece 174 to form the distributor. While the illustrated distributor 25 comprises a two-piece distributor that is integrated directly into the evaporator housing 170, it will be understood that distributors can be formed from other numbers of pieces and attach to the ice maker in other ways in other embodiments. As shown in FIG. 9, the distributor 25 is mounted on the evaporator assembly 20 adjacent the top of the freeze plate 22 and has a width WD that extends generally along the width WF of the freeze plate 22. The distributor 25 extends widthwise from a right end portion (broadly, first end portion) adjacent the right side of the freeze plate 22 to a left end portion (broadly, a second end portion) adjacent the left side of the freeze plate.

The distributor 25 has a rear, upstream end portion defining an inlet 212 and a front, downstream end portion defining an outlet 214. The downstream end portion extends widthwise adjacent the top-front corner of the freeze plate 22, and the upstream end portion extends widthwise at location spaced apart rearward from the downstream end portion. In the illustrated embodiment, the inlet 212 formed by an opening at the upstream end portion of the distributor, and the outlet 214 is defined by an exposed lower front edge of the distributor 25. In use, this edge is arranged so that water flows off of the edge onto the top portion of the freeze plate 22. It is contemplated that the inlet and/or outlet could have other configurations in other embodiments.

As shown in FIG. 20, the distributor 25 defines a distributor flow path FP extending generally forward from the inlet 212 to the outlet 214. The distributor 25 is generally configured to direct water imparted through the distributor along the distributor flow path FP to discharge the water from the outlet 214 such that the water flows from the top portion of the freeze plate 22 to the bottom portion generally uniformly along the width WF of the freeze plate. As will be explained in further detail below, the distributor 25 includes a number of water distribution features that direct the water flowing along the flow path FP to be distributed generally uniformly along substantially the entire width of the distributor.

Each of the bottom and top pieces 174, 210 will now be described in detail before describing how the distributor 25 is assembled and used to distribute water over the freeze plate 22.

IX.A. Distributor Bottom Piece

Figure 21:
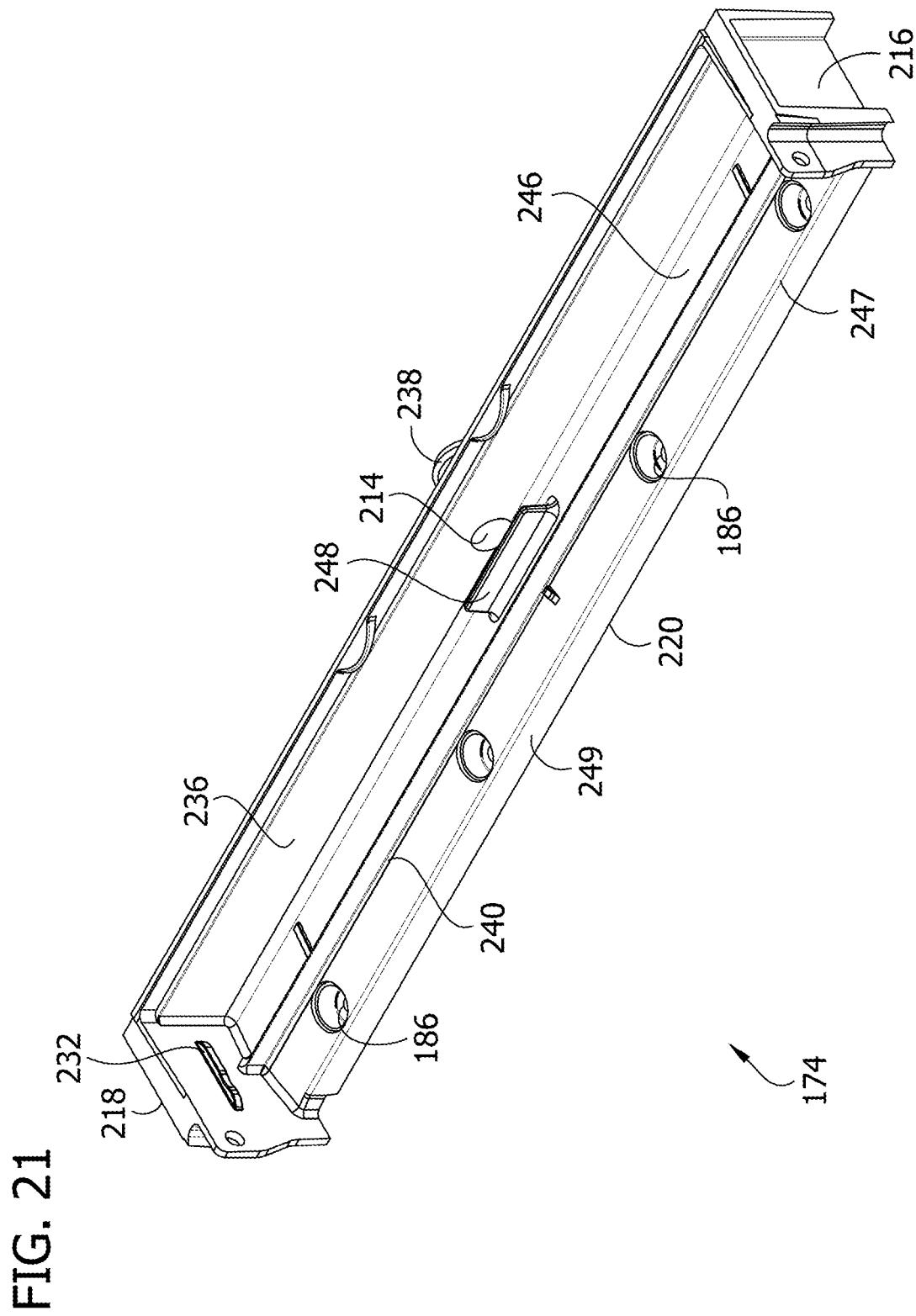
FIG. 21 is a top perspective of the bottom distributor piece.
Figure 22:
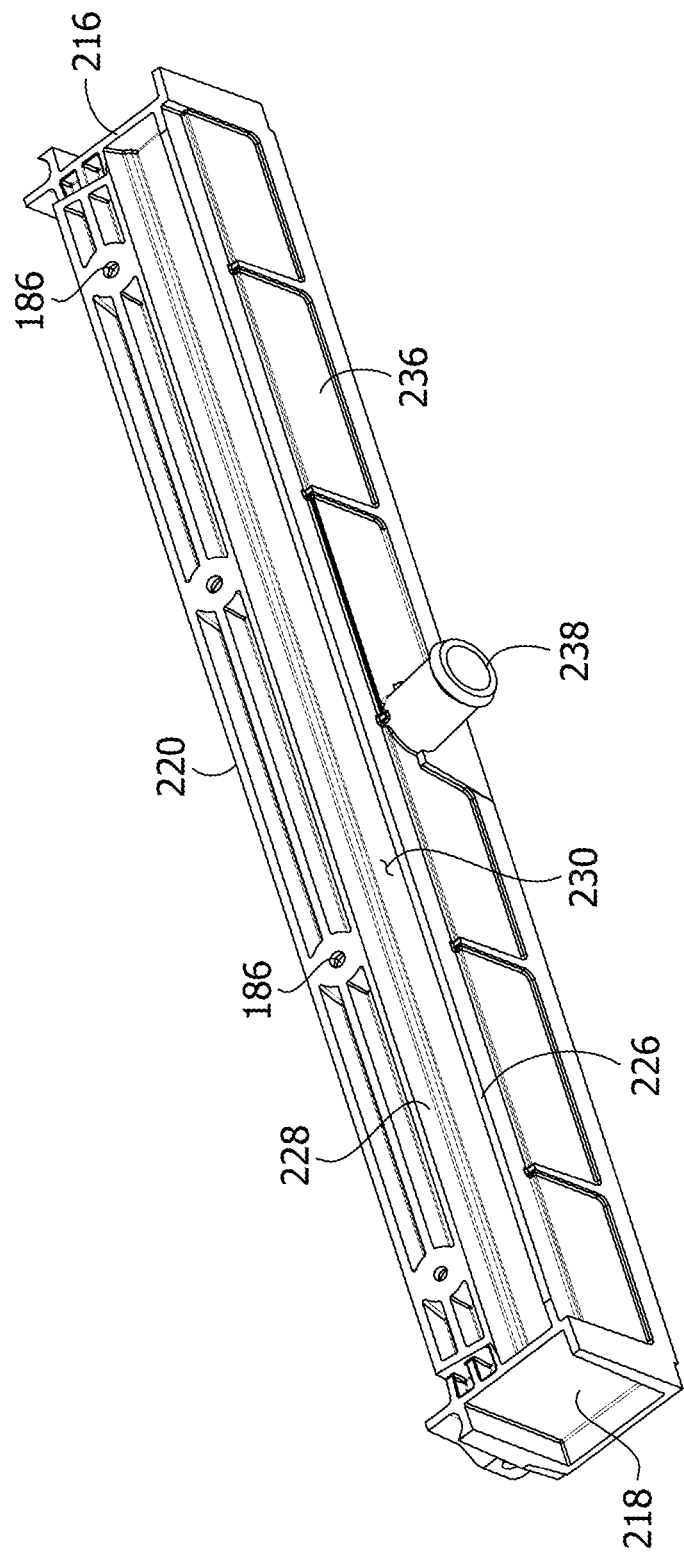
FIG. 22 is a bottom perspective of the bottom distributor piece.
Figure 23:
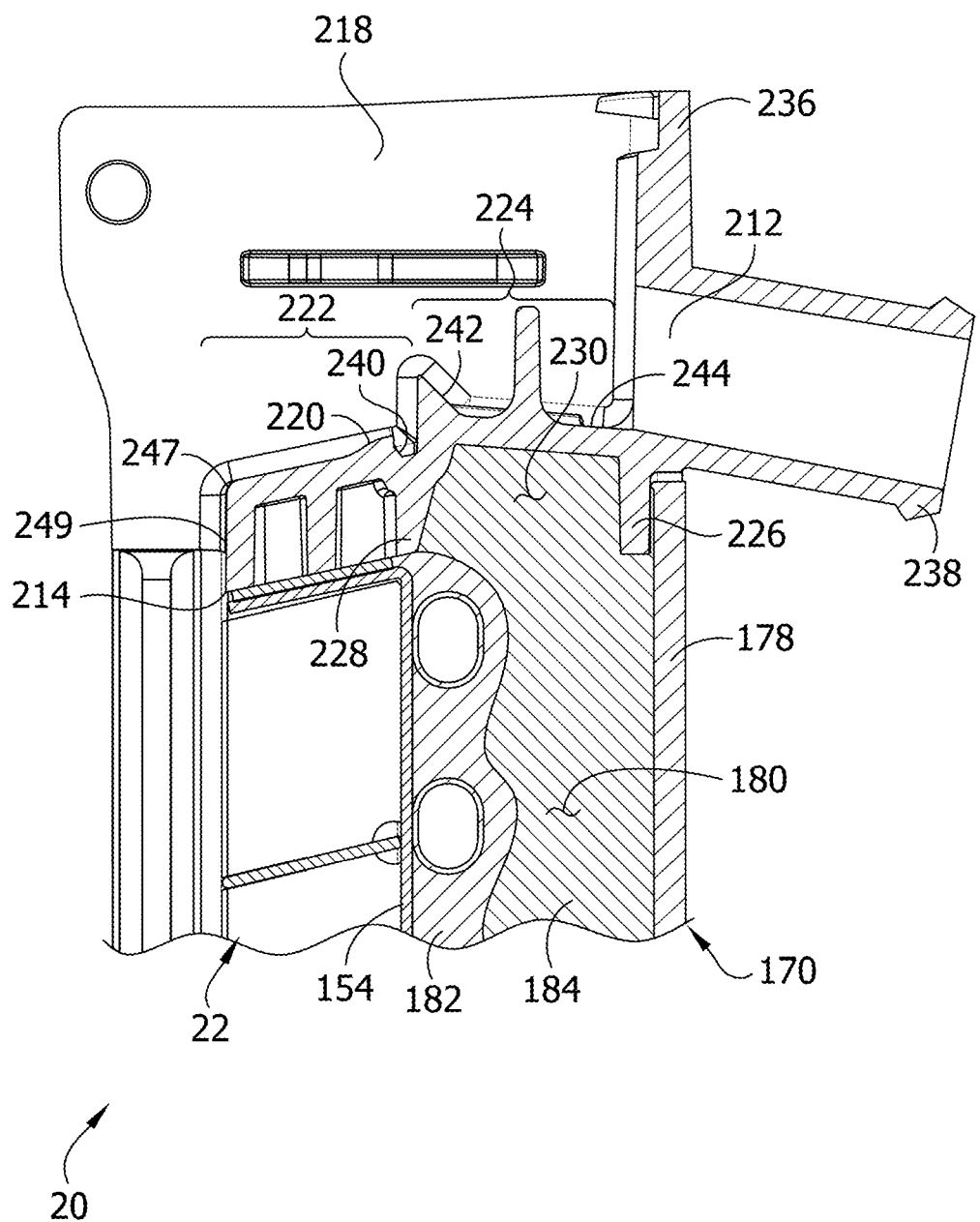
FIG. 23 is a vertical cross section similar to FIG. 15 except that the plane of the cross section passes through the center of an inlet tube of the bottom distributor piece.

Referring to FIGS. 21-22, the bottom distributor piece 174 has a right end wall 216 (broadly, a first end wall) at the right end portion of the distributor 25, a left end wall 218 (broadly, a second end wall) at the left end portion of the distributor, and a bottom wall 220 extending widthwise from the right end wall to the left end wall. Referring to FIG. 23, as explained above, the bottom distributor piece 174 is directly attached to the freeze plate 22. Further, in the illustrated embodiment, the bottom distributor piece 174 is in direct contact with the insulation 184 that fills the enclosed space 180 between the back wall 154 of the freeze plate and the back wall 178 of the evaporator housing 170. A front section 222 of the bottom wall 220 is located generally above the freeze plate 22 to mount the distributor piece 174 on the freeze plate as described above, and a rear section 224 of the bottom wall is located generally above the enclosed space 180 to directly contact the insulation 184.

In the illustrated embodiment, the rear section 224 includes a rear leg 226 extending downward at a rear end portion of the bottom wall and a front leg 228 extending downward at a location forwardly spaced from the rear leg. Each of the front and rear legs 226, 224 extends widthwise between the right and left end walls 216, 218 of the bottom distributor piece 174. The rear leg 226 is sealingly engaged with the back wall 178 of the evaporator housing 170 (e.g., the rear leg is ultrasonically welded to the back wall). The bottom wall 220 defines a lower recess 230 located between the front and rear legs 226, 228. The lower recess 230 extends widthwise between the right and left end walls 216, 218 and forms the top of the enclosed space 180. Thus a portion of the insulation 184 is received in the recess 230 and directly contacts the bottom distributor piece along three sides defining the recess. This is thought to thermal losses between the distributor and evaporator.

Figure 24:
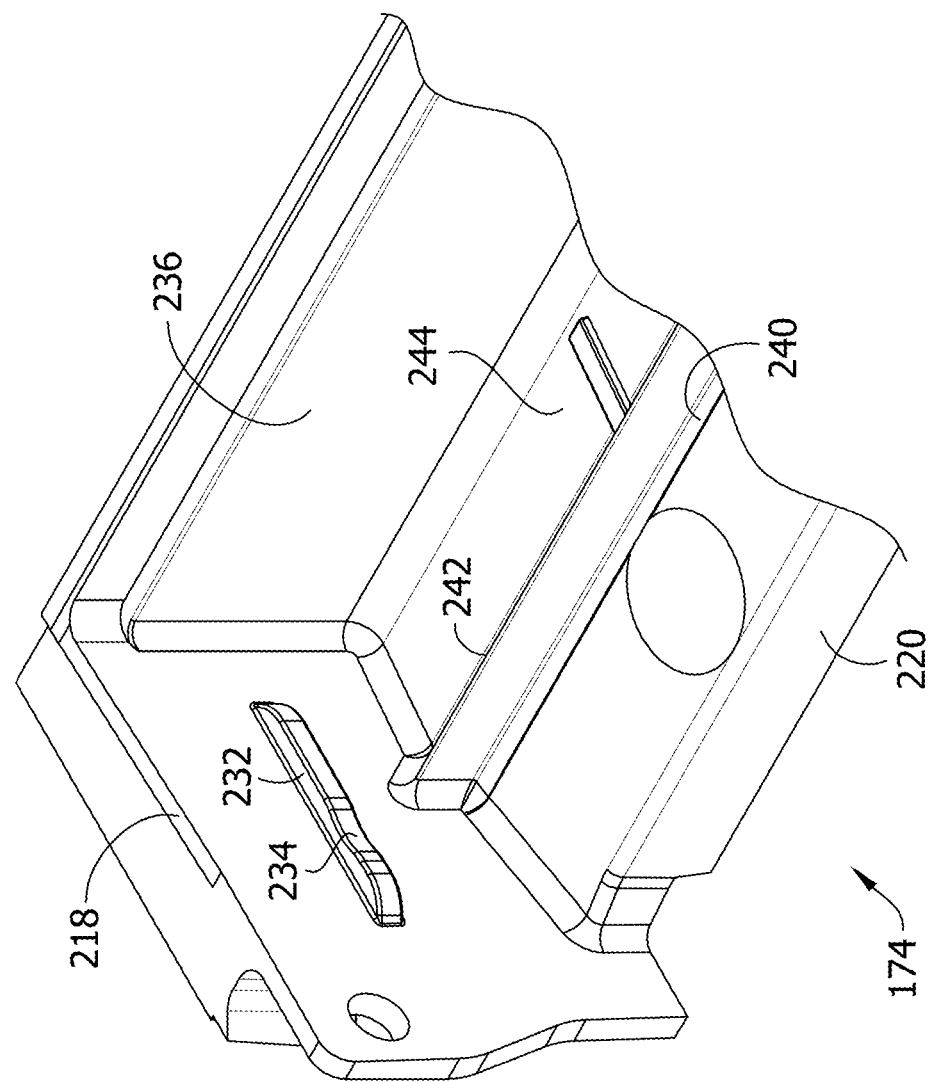
FIG. 24 is an enlarged perspective of an end portion of the bottom distributor piece.

Referring to FIG. 24, each end wall 216, 218 in the illustrated embodiment comprises an elongate tongue 232 formed along an inner surface. Only the left end wall 218 is shown in FIG. 24, but it will be understood that the right end wall 216 has a substantially identical, mirror image tongue 232. The elongate tongues 232 extend longitudinally in parallel, generally front-to-back directions. The elongate tongues 232 are generally configured to form male fittings that releasably couple the bottom distributor piece 174 to the top distributor piece 210 without the use of separate fasteners. Each elongate tongue 232 has a front end portion and a rear end portion spaced apart longitudinally from the front end portion. Between the front end portion and the rear end portion, each tongue comprises a slight depression 234.

Referring to FIGS. 19 and 20, the bottom wall 220 extends generally forward from a rear, upstream end portion to a front, downstream end portion. A rear wall 236 extends upward from the upstream end portion of the bottom wall 220. The inlet opening 212 is formed in the rear wall 236. In the illustrated embodiment, the inlet opening 236 is generally centered on the rear wall 236 at a spaced apart location between the end walls 216, 218. Thus, broadly speaking, the inlet opening 212 through which water is directed into the interior of the distributor 25 is spaced apart widthwise between the first end portion and the second end portion of the distributor. During use, the distributor 25 is configured to direct the water to flow from the inlet opening 212 along the bottom wall 220 in a generally forward direction FD from the upstream end portion of the bottom wall to the downstream end portion.

An integral inlet tube 238 protrudes rearward from the rear wall 236 and fluidly communicates through the rear wall via the inlet opening 212. The tube 238 slopes downward and rearward as it extends away from the rear wall 236. The inlet tube 238 is configured to be coupled to the ice maker's water line 63 (FIG. 1). Accordingly, when ice is being made, the pump 62 pumps water from the sump 70 through the water line 63 and into the distributor 25 via the integral inlet tube 238. When ice is not being made, residual water in the distributor 25 can drain through the inlet tube 238, down the water line 63, and into the sump 70.

In the illustrated embodiment, the rear section 224 of the bottom wall 220 slopes downward and rearward along substantially the entire width of the bottom wall. Conversely, the front section 222 of the bottom wall 220 slopes downward and forward along substantially the entire width. The front section 222 thus forms a runoff section along which water flows forward and downward toward the downstream end portion of the bottom wall 220. Between the sloping rear section 224 and the sloping front section 222 the bottom wall comprises a middle section that includes a widthwise groove 240. The widthwise groove is configured to sealingly receive a portion of the top distributor piece 210 when the top distributor piece is coupled to the bottom distributor piece 174. In one or more embodiments, the groove 240 is convex in the widthwise direction (see FIG. 33). An apex of the bottom wall 220 is located immediately upstream of the widthwise groove 240. The rear section 224 of the bottom wall slopes downward from the apex to the rear wall 236. As shown in FIG. 23, the rear section 224 of the bottom wall 220 includes a ramp surface 242 that defines the apex and a rearmost (or upstream-most) surface portion 244 (broadly, an upstream segment). The ramp surface 242 and the rearmost surface portion 244 extend widthwise from the right end wall 216 to the left end wall 218. The ramp surface 242 slopes upward in the generally forward direction and downward in the generally rearward direction. The rearmost surface portion 244 slopes upward in the generally forward direction more gradually than the ramp surface 242. The rearmost surface portion 244 is oriented at an angle of less than 180° with respect to the ramp surface 242 such that the rearmost surface portion slopes downward in the generally rearward direction at a more gradual angle than the ramp surface in the illustrated embodiment.

The bottom wall 220 is configured to passively drain water from the distributor 25 when the ice maker 10 stops making ice. Whenever the ice maker 10 stops making ice, residual water in the front portion of the distributor 25 flows forward along the sloping front section 222 (runoff section) of the bottom wall 220 and drains off of the outlet 214 onto the freeze plate 22. Similarly, residual water in the rear portion of the distributor 25 flows rearward along the sloping rear section 224 and drains through the inlet opening 212 into the inlet tube 238. The water directed forward flows downward along freeze plate 22 and then flows off the freeze plate into the sump 70. The water directed rearward flows downward through the water line 63 into the sump 70. Thus, the distributor 25 is configured to direct substantially all residual water into the sump 70 when the ice maker 10 is not making ice. Further, in one or more embodiments, the sump 70 is configured to drain substantially all of the water received therein through the discharge line 78 when the ice maker 10 is not in use. As can be seen, the shape of the bottom wall 220 of the distributor 25 facilitates total passive draining of the ice maker 10 when ice is not being made.

Referring to FIG. 21, a lateral diverter wall 246 extends upward from the bottom wall 220 along the rearmost surface portion 244. The lateral diverter wall 246 is spaced apart between the rear wall 236 and the ramp surface 242. The lateral diverter wall 246 extends upward from the bottom wall 220 to a top edge that is spaced apart below the top of the assembled distributor 25 (see FIG. 20). The diverter wall 246 extends widthwise from a right end portion (broadly, a first end portion) spaced apart from the right end wall 216 to a left end portion (broadly, a second end portion) spaced apart from the left end wall 216. The lateral diverter wall 246 is positioned in front of the inlet opening 214. As water flows into the distributor 25 through the inlet opening, the lateral diverter wall 246 is configured to divert at least some of the water laterally outward, forcing the water to flow around the left and right ends of the lateral diverter wall.

Figure 20A:
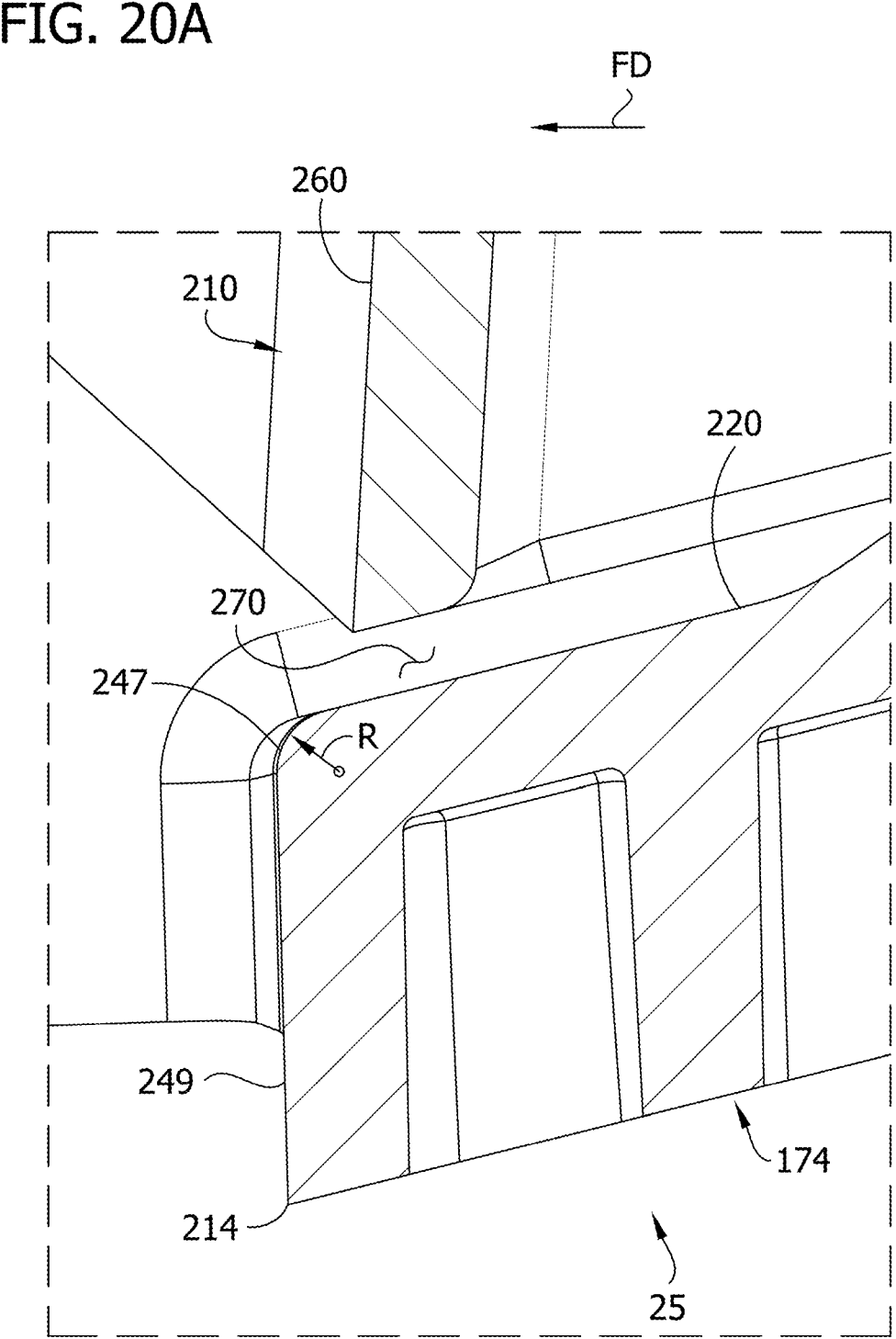
FIG. 20A is an enlarged view of a portion of FIG. 20.

Referring to FIGS. 20A and 23, the downstream end portion of the bottom wall 220 defines a downwardly curving surface tension curve 247 that extends widthwise from the right end wall 216 to the left end wall 218. The downwardly curving surface tension curve 247 is configured so that surface tension causes the water flowing along the bottom wall 220 to adhere to the curve and be directed downward by the curve toward the top end portion of the freeze plate 22. In one or more embodiments, the surface tension curve 270 is at least partially defined by a radius R of at least 1 mm. In certain embodiments, the surface tension curve 270 is defined by a radius of less than 10 mm. In one or more embodiments, the surface tension curve 270 is defined by a radius in an inclusive range of from 1 mm to 3 mm. In an exemplary embodiment, the surface tension curve 270 is defined by a radius of 1.5 mm.

The bottom wall 220 further comprises a waterfall surface 249 extending generally downward from the surface tension curve 274 to a bottom edge that defines the outlet 214 of the distributor 212. The waterfall surface 249 extends widthwise from the right end wall 216 to the left end wall 218. The waterfall surface 249 generally is configured so that surface tension causes the water imparted through the distributor 25 to adhere to the waterfall surface and flow downward along the waterfall surface onto the top end portion of the freeze plate 22. In one or more embodiments, the waterfall surface 249 slants forward in the ice maker 10 such that the waterfall surface is oriented generally parallel to the back wall 254 (and front plane FP) of the forwardly slanting freeze plate 22.

IX.B. Top Distributor Piece

Figure 25:
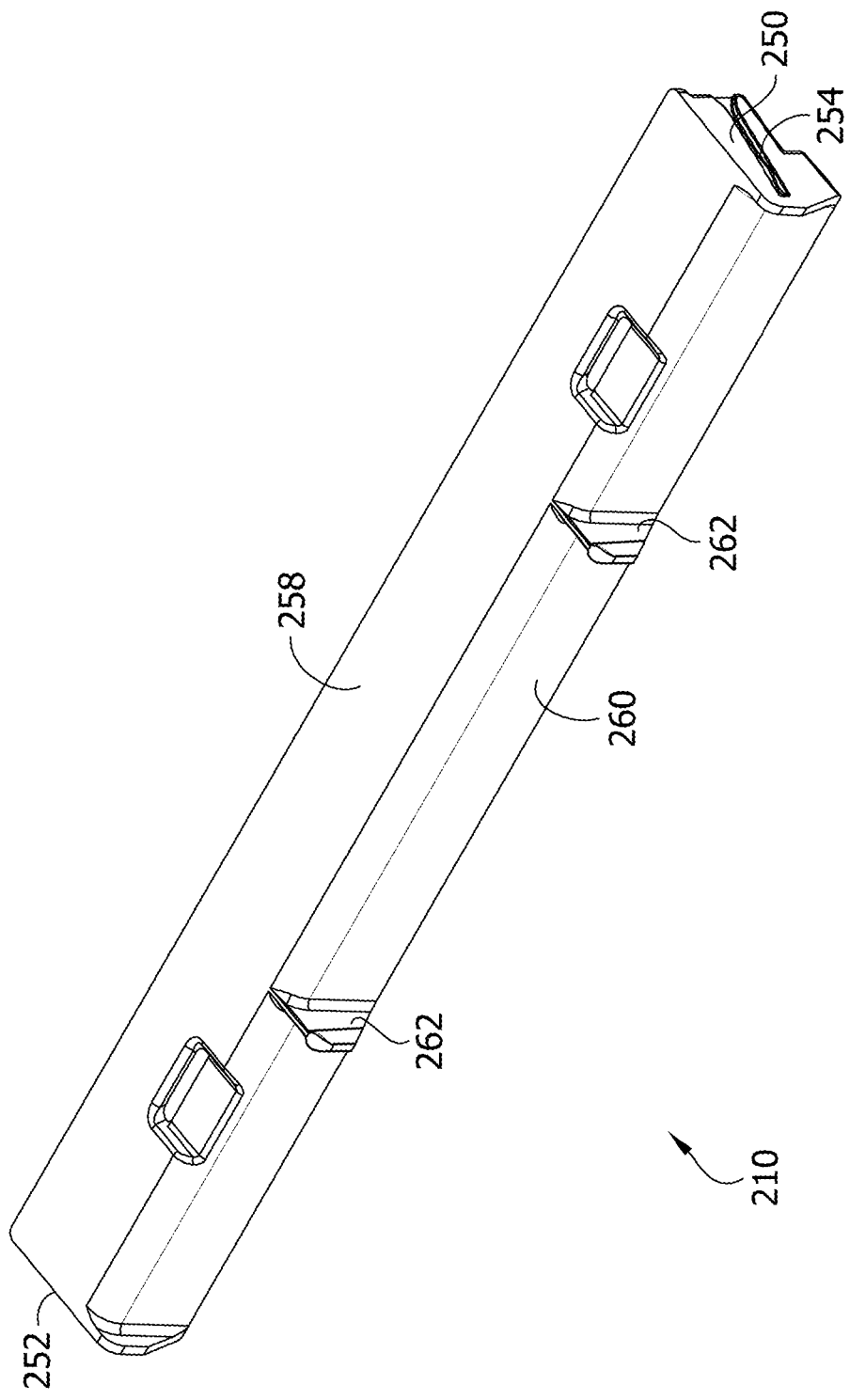
FIG. 25 is a perspective of the top distributor piece.
Figure 26:
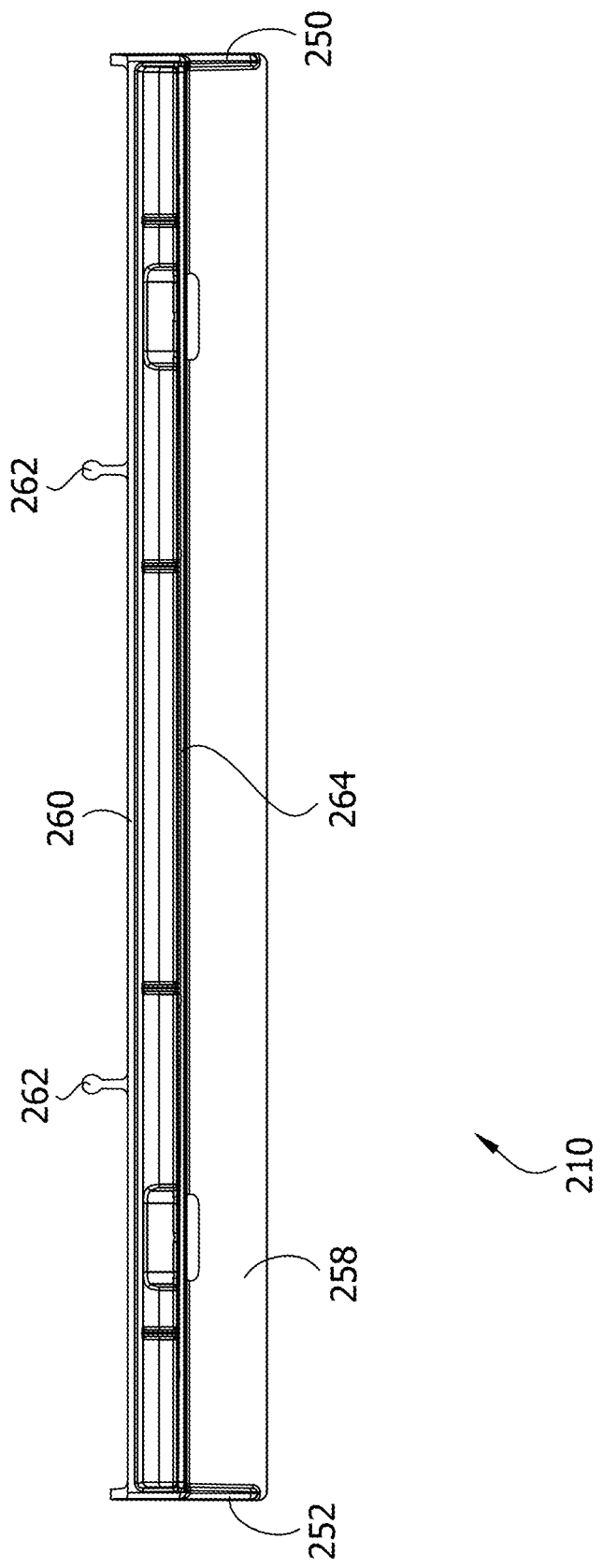
FIG. 26 is a bottom plan view of the top distributor piece.
Figure 27:
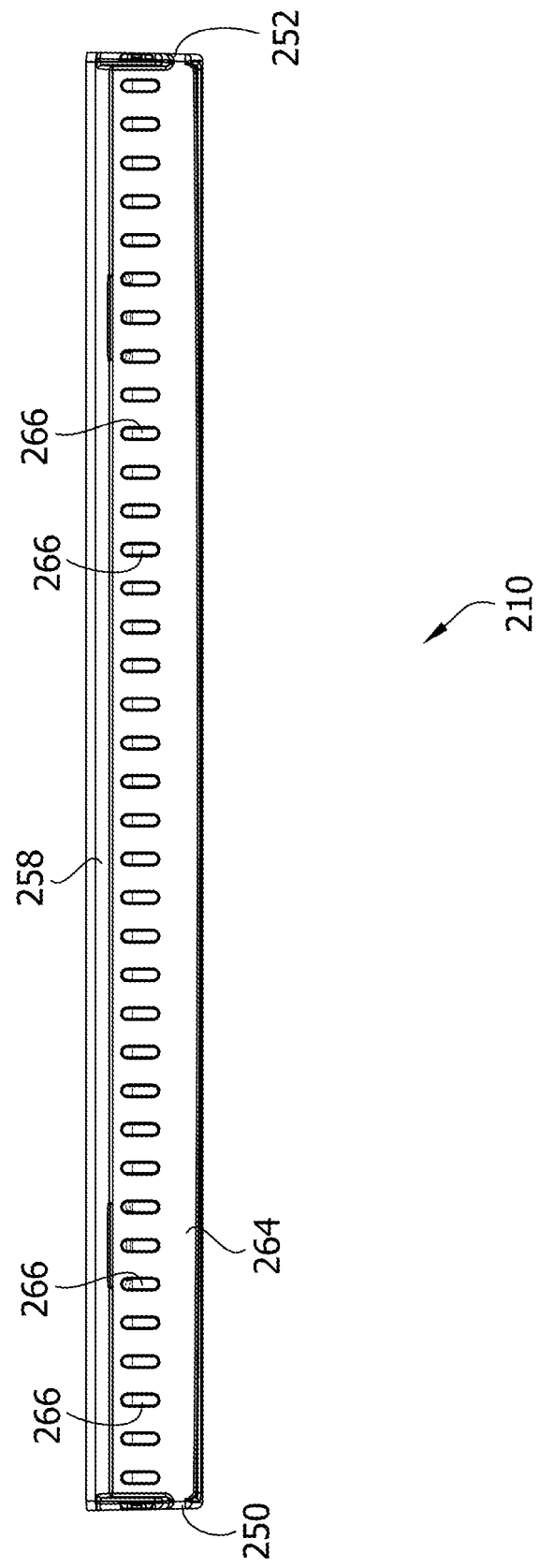
FIG. 27 is a rear elevation of the top distributor piece.

Referring to FIGS. 25-27, the top distributor piece 210 has a right end wall 250 (broadly, a first end wall) at the right end portion of the distributor 25 and a left end wall 252 (broadly, a second end wall) at the left end portion of the distributor. The width of the top distributor piece 210 is slightly less than the width of the bottom distributor piece 174 such that the top distributor piece is configured to nest between the end walls 216, 218 of the bottom distributor piece.

Figure 28:
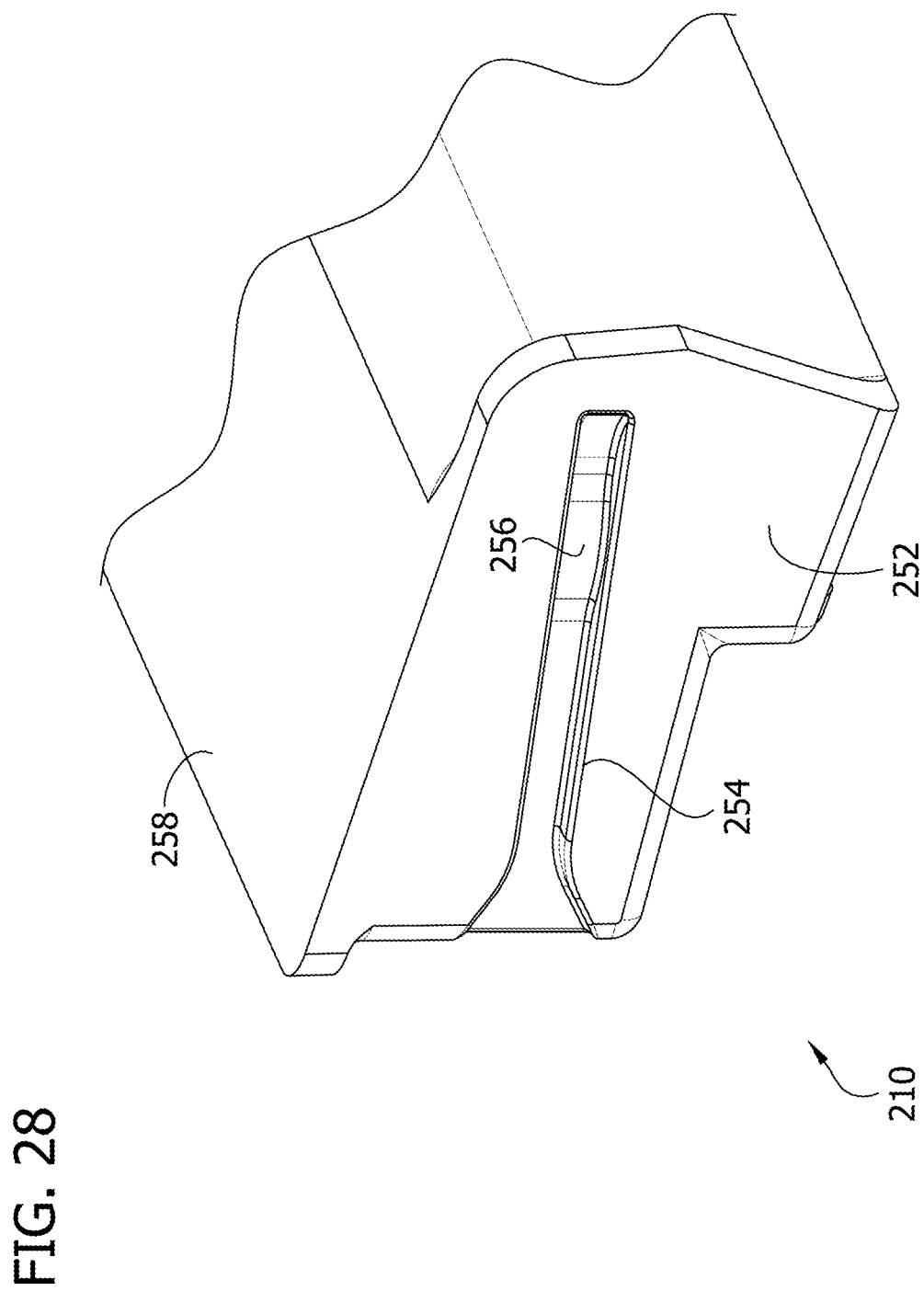
FIG. 28 is an enlarged perspective of an end portion of the top distributor piece.

Referring to FIG. 28, each end wall 250, 252 in the illustrated embodiment comprises an elongate groove 254 along an outer surface. Only the left end wall 252 is shown in FIG. 28, but it will be understood that the right end wall 250 has a substantially identical, mirror image groove 254. Generally, the elongate grooves 254 are configured to form complementary female fittings that mate with the male fittings formed by the elongate tongues 232 to releasably couple the top distributor piece 210 to the bottom distributor piece 174 without the use of separate fasteners. The elongate grooves 254 are generally parallel, extending longitudinally in a generally front-to back direction. The rear end portion of each elongate groove 254 defines a flared opening through which a respective elongate tongue 174 can pass into the groove. Each end wall further defines a protuberance 256 that protrudes into the groove at a location spaced apart between the front and rear ends of the groove 254.

Referring again to FIGS. 25-27, the top distributor piece 210 comprises a top wall 258 that extends widthwise from the right end wall 250 to the left end wall 252. The top wall 258 extends generally forward from a rear edge margin. A front wall 260 extends generally downward from a front end portion of the top wall to a free bottom edge margin. Two handle portions 262 extend forward from the front wall 260 in the illustrated embodiment.

As shown in FIGS. 26-27, the top distributor piece 210 further comprises a weir 264 that extends downward from the top wall 258 at a location spaced apart between the rear edge margin and the front wall 260. The weir 264 extends widthwise from the right end wall 250 to the left end wall 252 and has a free bottom edge margin that is configured to be received in the widthwise groove 240 of the bottom distributor piece 174. As shown in FIG. 27, the bottom edge margin of the weir 264 is convex in the widthwise direction. The weir 264 defines a plurality of openings 266 at spaced apart locations along the width WD of the distributor 25. A bottom portion of the weir 264 below the openings 266 is configured to hold back water until the water level reaches the bottom of the openings. The openings 266 are configured so that water is passable through the openings as it is imparted through the distributor 25. Adjacent openings are separated by portions of the weir 264, such that the weir is configured to form a segmented weir that allows water to cross at spaced apart segments along the width WD of the distributor 25 (through the openings).

IX.C. Assembly of Two-Piece Distributor

Figure 29:
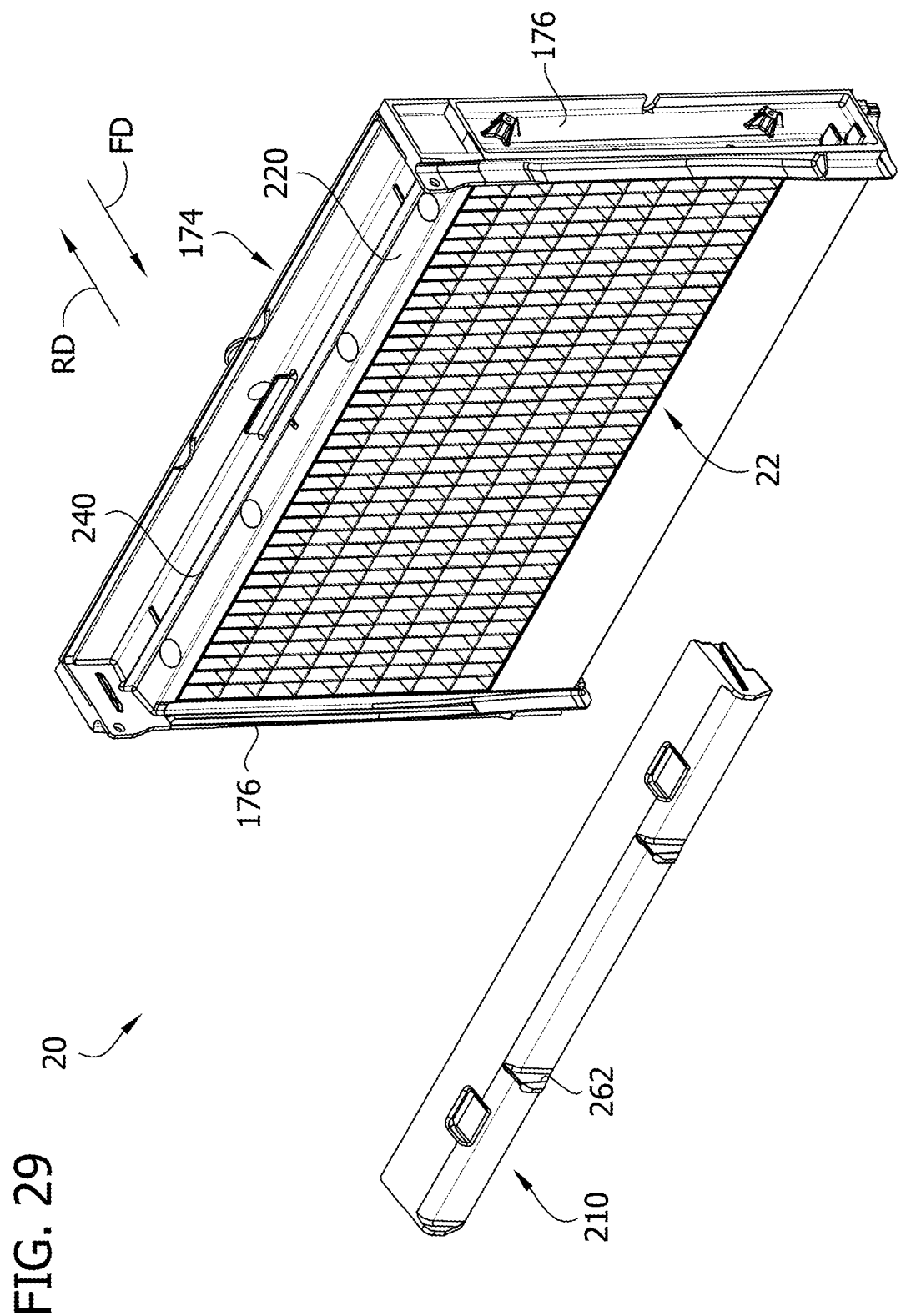
FIG. 29 is a perspective of the evaporator assembly with the top distributor piece spaced apart in front of the bottom distributor piece.
Figure 30:
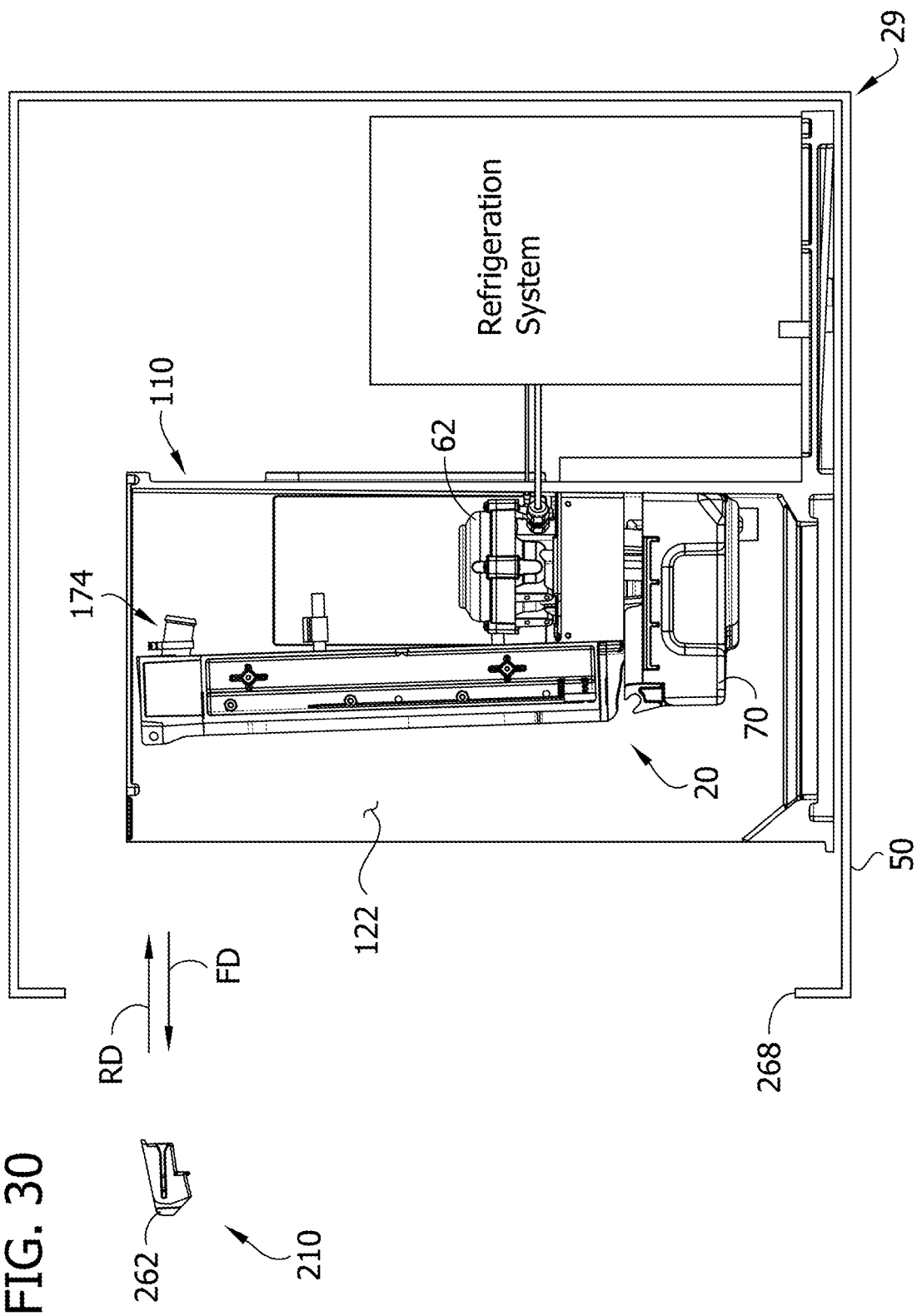
FIG. 30 is a vertical cross section of the subassembly of FIG. 3 received in a schematically illustrated ice maker enclosure, wherein the plane of the cross section is immediately inboard of a right side wall portion of a vertical side wall of the support as shown in FIG. 3 and wherein the top distributor piece is shown in a removed position outside of the enclosure.

Referring to FIGS. 29-30, to assemble the distributor 25, the top distributor piece 210 is aligned in the widthwise direction with the space between the end walls 216, 218 of the bottom distributor piece 174. Then the top piece 210 is moved in the rearward direction RD into the space between the rear walls 216, 218, such that the elongate tongues 232 of the bottom piece are slidably received in the elongate grooves 254 of the top piece.

As seen in FIG. 30, the evaporator assembly 20 is suitably arranged in the interior of the ice maker enclosure 29 so that the top piece 210 can be installed/removed through an access opening 268 such as the doorway of the cabinet 50. In the illustrated embodiment, the doorway 268 is spaced apart from the front of the evaporator assembly 20 in the forward direction FD. Further, the front opening 122 in the support 110 is located between the front of the evaporator assembly 20 and the doorway 268. Thus, the top distributor piece 210 can be installed by moving the piece through the doorway 268 and the opening 122 in the rearward direction RD. The top distributor piece 210 is removed by moving the piece through the opening 122 and the doorway 268 in the forward direction FD.

Each tongue 232 is configured to be slidably received in the respective groove 254 as the top distributor piece 210 moves toward the bottom distributor piece 174 in the rearward direction RD. That is, the parallel longitudinal orientations of the tongues 232 and grooves 254 facilitate coupling the top distributor piece 210 to the bottom distributor piece 174 simply by moving the top distributor piece in the rearward direction RD. Thus, the complementary fittings formed by the tongues 232 and grooves 254 are configured to be engaged by movement of the top distributor piece 210 inward into the interior of the enclosure 29 from the doorway 268. Further, the complementary fittings 232, 254 are configured to be disengaged simply by urging the top distributor piece 210 away from the bottom distributor piece 174 in the forward direction FD, toward the doorway 268. When maintenance or repair of the distributor 25 is required, a technician merely opens the door 52 (FIG. 2), grips the handles 262, and pulls the top distributor piece 210 outward in the forward direction FD through the doorway 268. To replace the top distributor piece 210, the technician inserts the piece through the doorway 268, aligns the open ends of the grooves 254 with the tongues 232, and pushes the top piece rearward. The tongues 232 are then slidably received in the grooves 254, and the complementary fittings thereby couple the top distributor piece 210 to the bottom distributor piece 174 without using any additional fasters such as screws or rivets.

Though the illustrated embodiment uses the bottom distributor piece's elongate tongues 232 as male fittings and the top distributor piece's elongate grooves 254 as complementary female fittings, other forms or arrangements of complementary integral fittings can be utilized to releasably couple one distributor piece to another in one or more embodiments. For example, it is expressly contemplated that in certain embodiments one or more male fittings could be formed on the top distributor piece and one or more complementary female fittings could be formed on the bottom distributor piece. It is further contemplated that the fittings could be formed at alternative or additional locations other than the end portions of the distributor.

Figure 31:
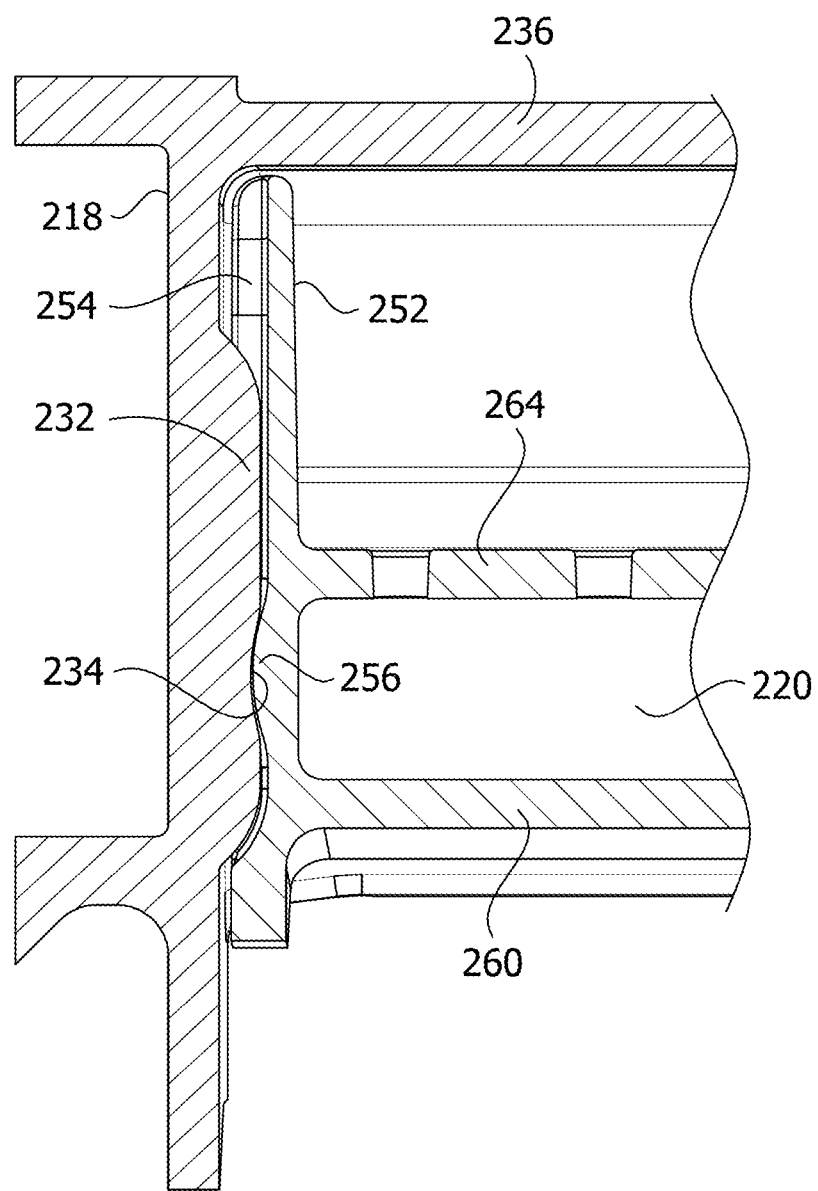
FIG. 31 is an enlarged horizontal cross section of an end portion of the distributor looking downward on a plane that passes through an elongate tongue of the bottom distributor piece received in an elongate groove of the bottom distributor piece.

Referring to FIG. 31, each pair of complementary fittings comprises a detent configured to keep the respective tongue 232 at a coupling position along the respective groove 254. More specifically, the protuberances 256 formed in the grooves 254 are configured to be received in the depressions 234 of the tongues 232 to provide a detent when the complementary fittings are at the coupling position. The detent resists inadvertent removal of the top distributor piece 210 from the bottom distributor piece 174 and provides a tactile snap when the tongue 232 slides along the groove 254 to the coupling position. It will be appreciated that the detent can be formed in other ways in one or more embodiments.

Figure 32:
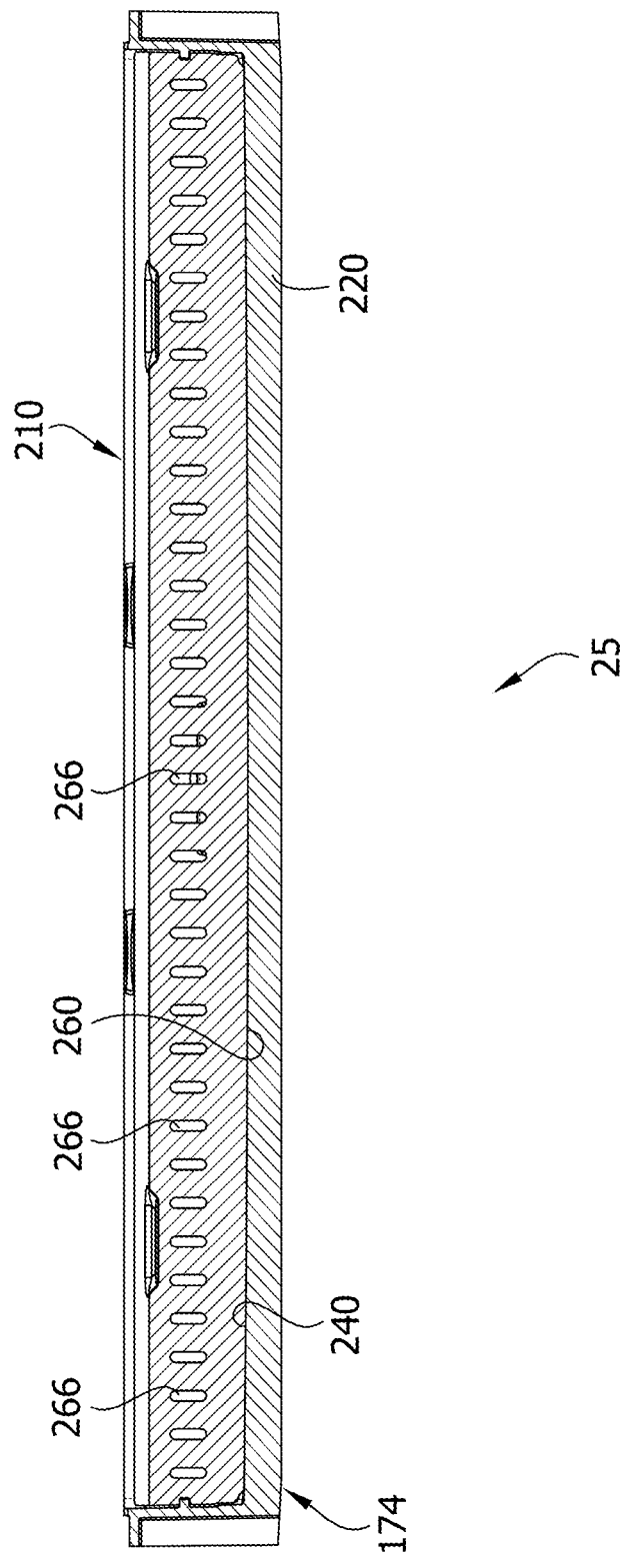
FIG. 32 is a vertical cross section of the distributor taken in a plane that passes through a segmented weir.

Referring to FIGS. 20 and 32, as the top distributor piece 210 slides in the rearward direction RD to couple the distributor pieces together, the bottom edge margin of the weir 264 slides along the downstream (front) section 222 of the bottom wall 220. When the top distributor piece 210 reaches the coupling position, the bottom edge margin of the weir 264 is received in the groove 240. In one or more embodiments, placing the weir 264 in the groove 240 requires pushing the top piece 210 rearward past a slight interference with the bottom piece 174. When the bottom edge margin of the weir 264 is received in the groove 240, the weir sealingly engages the bottom wall 220 such that water flowing along the distributor flow path FP is inhibited from flowing through an interface between the bottom edge margin of the weir and the bottom wall and is instead directed to flow across the weir through the plurality of openings 266.

The weir 264 extends widthwise along a middle section of the assembled distributor 25, at a location spaced apart between the front wall 260 and the rear wall 236. The only couplings between the top distributor piece 210 and the bottom distributor piece 174 at this middle section of the distributor 25 are the tongue-and-groove connections at the left and right end portions of the distributor. Thus, in the illustrated embodiment, the middle section of the distributor 25 includes couplings at the first and second end portions of the distributor that restrain upward movement of the top distributor piece 210 with respect to the bottom distributor piece 174, but the distributor is substantially free of restraints against upward movement of the top distributor piece relative the bottom distributor piece along the middle section of the distributor at locations between these couplings. However, because the bottom edge margin of the weir 264 is convex and the groove 240 is correspondingly concave in the widthwise direction (FIG. 32), even as the distributor pieces 174, 210 flex and deform during use, the seal between the weir and the bottom wall 220 is maintained and water is reliably directed to flow through of openings 266, instead of downward through the interface between the weir and the bottom wall.

IX.D. Water Flow Through Distributor

Referring to FIG. 20, the distributor 25 is configured to direct water to flow from the inlet 212 to the outlet 214 such that the water flows along the flow path FP between the bottom and top walls 220, 258 and then is directed downward along the surface tension curve 247 and the water fall surface 249 onto the top portion of the freeze plate 22. Initially, the water flows generally in the forward direction from the inlet tube 238 through the inlet opening 212 in the rear wall 236. The water then encounters the lateral diverter wall 246. The lateral diverter wall 246 diverts at least some of the water laterally outward, such that the water continues forward through the widthwise gaps between the end portions of the lateral diverter wall and the end portions of the distributor 25.

After flowing past the lateral diverter wall 246, the water encounters the ramp surface 242 and the segmented weir 264. The ramp surface 242 is immediately upstream of the weir 264 such that the water flowing along the bottom wall 220 of the distributor 25 must flow upward along the ramp surface before flowing across the weir. The weir 264 is configured so that the openings 266 are spaced apart above the bottom wall 220 (e.g., the bottom edges of the openings are spaced apart above the apex of the ramp surface 242). Thus, in the illustrated embodiment, the water must flow upward along the ramp surface 242, and upward along a portion of the height of the weir 264 before it can flow through the openings 266 across the weir. In one or more embodiments, the weir 264 is configured so that the portion of the distributor 25 upstream of the weir backfills with water to a level that generally corresponds with the height of the bottom edges of the openings 266 before the water begins to spill over the weir through the openings. In certain embodiments, the ramp surface 242 can direct at least some of the water flowing in the forward direction FD along the ramp surface to flow through the openings 266 before the upstream portion of the distributor 25 fills with water to a level that corresponds with the height of the bottom edges of the openings. After flowing across the weir 264, the water drops downward onto the sloped front runoff section 222 of the bottom wall 220 and then flows downward and forward.

As can be seen, the upper rear edge of the front runoff section 222 is spaced apart below the openings 266 by a substantially greater distance than the apex of the ramp surface 242. Thus, the water falls a relatively great distance from the segmented weir 264 onto the front runoff section 222, which may create turbulence on impact, enhancing the distribution of water in the distributor 25. In one or more embodiments, the vertical distance between the bottom edges of the openings 266 and the upper rear edge of the front runoff section 222 is at least 5 mm; e.g., at least 7 mm, e.g., at least 10 mm; e.g., about 12 to 13 mm.

Referring to FIG. 20A, in the assembled distributor 25, the front wall 260 of the top distributor piece 210 forms an overhanging front wall that overhangs the bottom wall 220. The bottom edge margin of the front wall 260 is spaced apart above the forwardly/downwardly sloping front runoff section 222 of the bottom wall 220 such that a flow restriction 270 is defined between the runoff section and the overhanging front wall. The flow restriction 270 comprises a gap (e.g., a continuous gap) that extends widthwise between the first end portion and the second end portion of the distributor 25. In general, the flow restriction 270 is configured to restrict a rate at which water flows through the flow restriction toward the outlet 214. In one or more embodiments, the flow restriction 270 has a height extending vertically from the runoff section 222 to the bottom of the front wall 260 of less than 10 mm, e.g., less than 7 mm; e.g., less than 5 mm; e.g., about 2 to 3 mm.

The water flowing forward along the front section 222 reaches the flow restriction 270, and the flow restriction arrests or slows the flow of water. In one or more embodiments, the overhanging front wall 260 acts as a kind of inverted weir. The flow restriction 270 slows the flow of water to a point at which water begins to slightly backfill the front portion of the distributor 25. This creates a small reservoir of water behind the flow restriction 270. A metered amount of water flows continuously from this back-filled reservoir through the flow restriction 270 along substantially the entire width WD of the distributor 25.

The surface tension curve 247—and more broadly the downstream end portion of the bottom wall 220—is forwardly proud of the overhanging front wall 260 and the flow restriction 270. After the water flows (e.g., is metered) through the flow restriction 270, the water adheres to the downwardly curving surface tension curve 247 as it flows generally forward. The surface tension curve 247 directs the water downward onto the waterfall surface 249. The water adheres to the waterfall surface 249 and flows downward along it. Finally the water is discharged from the outlet edge 214 of the waterfall surface 249 onto the top end portion of the freeze plate 22.

Because of water distribution features such as one or more of the lateral diverter wall 246, the ramp surface 242, the segmented weir 264, the flow restriction 270, the surface tension curve 247, and the waterfall surface 249, water is discharged from the outlet 214 at a substantially uniform flow rate along the width WD of the distributor 25. The distributor 25 thus directs water imparted through the distributor to flow downward along the front of the freeze plate 22 generally uniformly along the width WF of the freeze plate during an ice making cycle. Moreover, the distributor 25 controls the dynamics of the flowing water so that the water generally adheres to the surfaces of the front of the freeze plate 22 as it flows downward. Thus, the distributor 25 enables ice to form at a generally uniform rate along the height HF and width WF of the freeze plate 22.

X. Use

Referring again to FIG. 1, during use the ice maker 10 alternates between ice making cycles and harvest cycles. During each ice making cycle, the refrigeration system is operated to cool the freeze plate 22. At the same time, the pump 62 imparts water from the sump 70 through the water line 63 and further through the distributor 25. The distributor 25 distributes water along the top portion of the freeze plate 22 which freezes into ice in the molds 150 at a generally uniform rate along the height HF and width WF of the freeze plate 22. When the ice reaches a thickness that is suitable for harvesting, the pump 62 is turned off and the hot gas valve 24 redirects hot refrigerant gas to the evaporator tubing 21. The hot gas warms the freeze plate 22, causing the ice to melt. The melting ice falls by gravity from the forwardly slanted freeze plate 22 into the bin 30. When harvest is complete, the pump 62 can be reactivated to begin a new ice making cycle. But if additional ice is not required, the discharge valve 79 is opened. Residual water in the distributor 25 drains into the sump 70 as described above, and the water from the sump drains through the discharge line 78. The discharge valve 79 can be closed when the water level sensor 64 detects that the sump 70 is empty. If repair or maintenance of the distributor 25 should ever be required, a technician can simply open the door 52 to the enclosure and pull out the top piece 210 as described above. No fasteners are used when removing and replacing the top distributor piece 210.

XI. Ice Level Sensing

Figure 33:
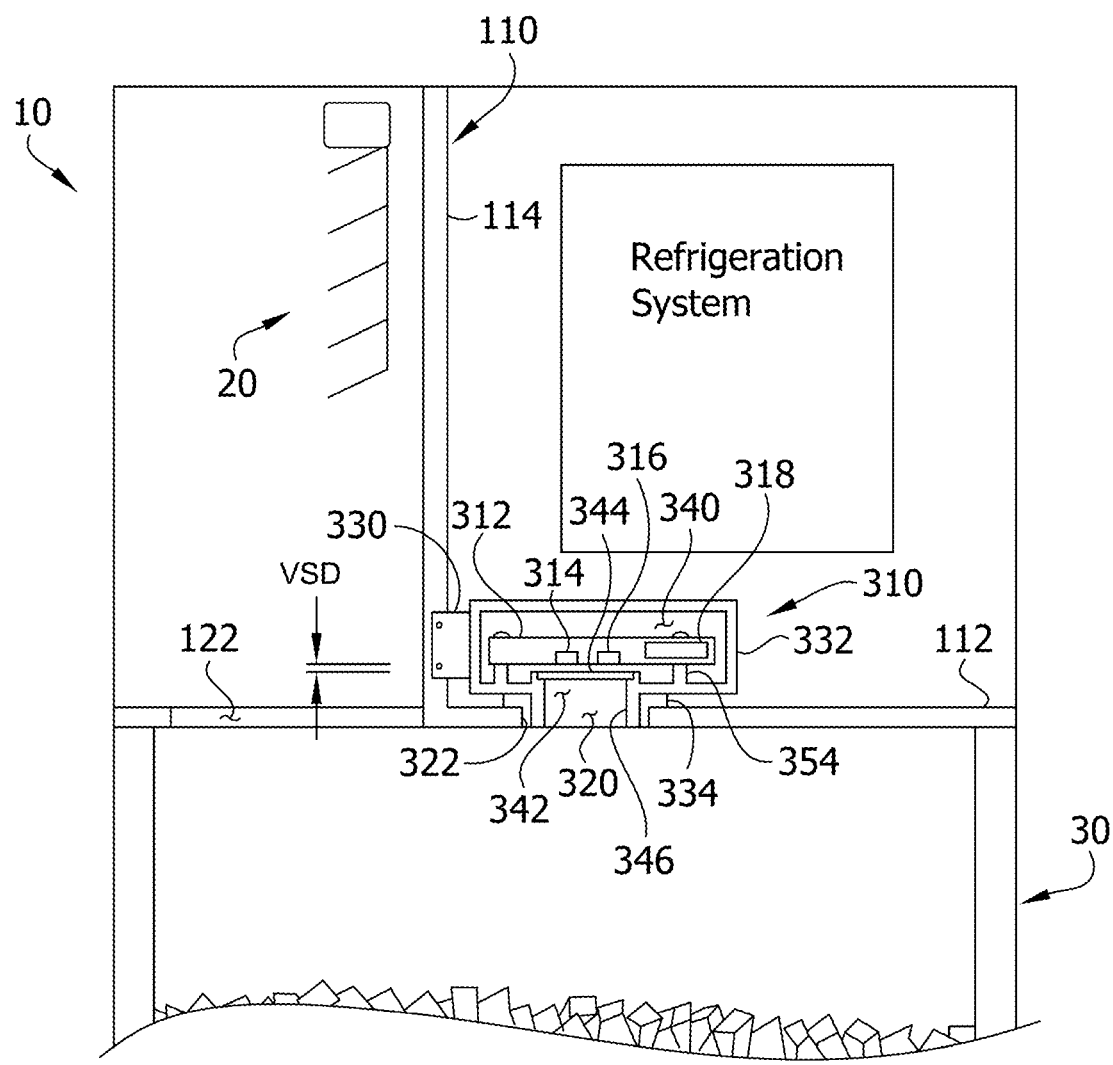
FIG. 33 is a schematic diagram of an ice level sensing system of the ice maker.
Figure 34:
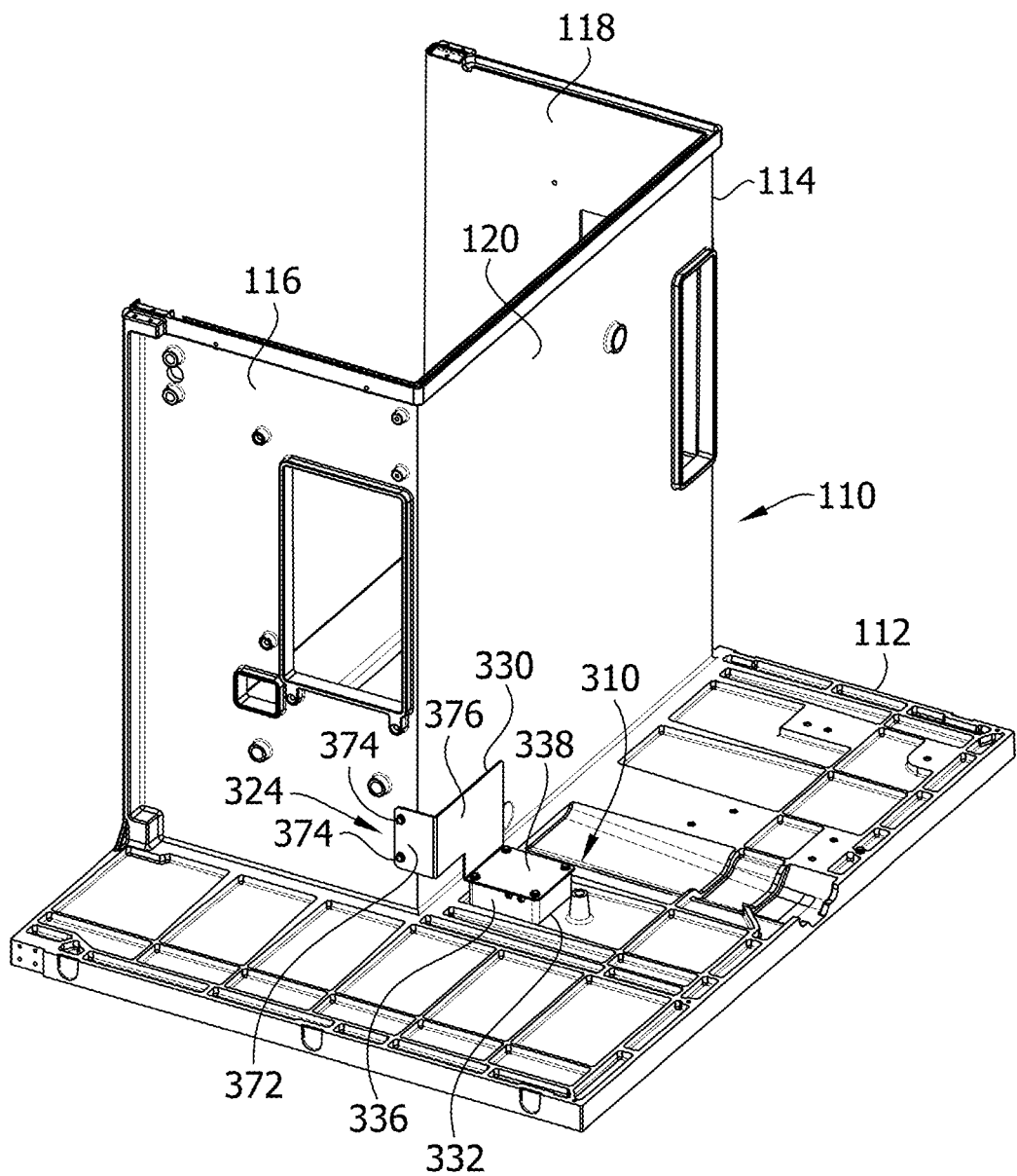
FIG. 34 is a perspective of a subassembly of the ice maker comprising the one-piece support and a time-of-flight sensor.

Referring now to FIGS. 33-34, the illustrated ice maker 10 comprises an ice level sensor 310 that is configured to detect the level of ice in the bin 30 while the ice maker is in use. Various uses for ice level sensing are known or may become known to those skilled in the art. For example, it is known to shut off an ice maker when an ice level sensor indicates that the ice bin is full of ice.

In one or more embodiments, the ice level sensor 310 comprises a time-of-flight sensor. In general, a suitable time-of-flight sensor 310 may comprise a sensor board 312 (e.g., a printed circuit board) including a light source 314, a photon detector 316, and an onboard control and measurement processor 318. Exemplary time-of-flight sensor boards are sold by STMicroelectronics, Inc., under the name FlightSense™ Certain non-limiting embodiments of time-of-flight sensors within the scope of this disclosure are described in U.S. Patent Application Publication No. 2017/0351336, which is hereby incorporated by reference in its entirety. Broadly speaking, the light source 314 is configured to emit, at a first time, an optical pulse toward a target. The photon detector 316 is configured to detect, at a second time, a target-reflected photon of the optical pulse signal that returns to the time-of-flight sensor 310. The control and measurement processor 318 is configured to direct the light source to emit the optical pulse and determine a duration (time-of-flight) between the first time and the second time. In one or more embodiments, the control and measurement processor 318 is further configured to determine, based on the determined duration, a distance between the time-of-flight sensor and the target and cause the sensor board 312 to output a signal representative of the determined distance. In certain embodiments, the ice maker controller 80 is configured to receive the measurement signal from the sensor board 312 and to use the measurement signal to control the ice maker.

In the illustrated embodiment, the target of the time-of-flight sensor 310 is the uppermost surface within the interior of the ice bin 30. That is, the time-of-flight sensor 310 is configured to direct the optical pulse through the bottom of the ice maker 10 toward the bottom of the ice bin 30. The optical pulse will reflect off of the bottom of the ice bin 30 if no ice is present or, if ice is present, off of the top of the ice received in the bin. Based on the duration (time-of-flight) of the photon(s), the control and measurement processor 318 determines the distance the photon(s) traveled, which indicates the level (broadly, amount or quantity) of ice that is present in the bin 30—e.g., the determined distance is inversely proportional to the quantity of ice in the bin. The time-of-flight sensor 310 can provide a rapid, very accurate indication of level of ice in the bin. Moreover, in comparison with conventional ice level detection systems that utilize capacitive, ultrasonic, infrared, or mechanical sensors, the time-of-flight sensor 310 has been found to provide much greater measurement accuracy and responsiveness in the typical dark, irregularly-shaped conditions of an ice bin.

Referring to FIGS. 34-37, in one or more embodiments the one-piece support no is constructed and arranged for time-of-flight sensor integration. For example, in the illustrated embodiment, the bottom wall 112 of the support no defines a sensor opening 320 through which the time-of-flight sensor 310 is configured to emit the optical pulse and receive the reflected photon(s). In one or more embodiments, the sensor opening 320 is located on a rear side of the vertical support wall 114. Suitably, the sensor opening 320 extends through an entire thickness of the bottom wall 112, from the upper surface thereof through the lower surface. Thus, the sensor opening 320 is defined by an inner perimeter surface 322 of the bottom wall 112 that extends circumferentially around the sensor opening and extends heightwise along the thickness of the bottom wall. In the illustrated embodiment, the perimeter of the sensor opening 320 is generally circular; although sensor openings of other shapes may be used in one or more embodiments.

In the illustrated embodiment, the vertically extending support wall 114 of the support no comprises an integrally formed sensor mount 324 (FIG. 36) that is configured to mount the time-of-flight sensor 310 on the support. The illustrated sensor mount 324 comprises a pair of integral connection points 326 formed on the side wall portion 116 of the vertically extending support wall 114. In one or more embodiments, each connection point 326 comprises an integral screw hole. In the illustrated embodiment, each connection point 326 comprises a boss projecting laterally outward from the main side surface of the side wall portion 116 and a screw hole formed within the boss. The time-of-flight sensor 310 comprises a mounting bracket 330 that is configured to couple to the vertically extending support wall 114 via the screw holes. As will be explained in further detail below, the mounting bracket 330 mounts the time-of-flight sensor board 312 so that the light source 314 can broadcast the optical pulse through the sensor opening 320 toward the bottom of the ice bin 30 and so that the photon detector 316 can detect a photon reflected from the ice bin through the sensor opening.

As will be apparent to those skilled in the art from the description of the vertically extending support wall 114 provided in Section V above, the vertically extending support wall can separate a food-safe side of the ice maker 10 from a mechanical systems side. In the illustrated embodiment, the sensor opening 320 is located on the mechanical systems side of the ice maker 10 (e.g., to the rear of the vertically extending support wall 114), which allows the time-of-flight sensor 310 to be mounted on the ice maker in the mechanical systems side, out of the wall of ice as it falls during harvest. Drain passaging and certain electrical and refrigeration system components are also located in the mechanical systems side of the ice maker 10 in one or more embodiments. By contrast, the ice drop opening 123 and the ice formation device 20 are located in the food-safe side so that ice produced by the ice maker 10 and harvested into the bin 30 is never contaminated by mechanical systems equipment that may be contained in the mechanical systems side.

To prevent contamination of the food-safe side of the ice maker 10 and the ice bin 30 through the sensor opening 320, the illustrated time-of-flight sensor 310 is sealingly engaged with the bottom wall 112 of the support 110 to seal the sensor opening. More specifically, the illustrated time-of-flight sensor 310 comprises a sensor enclosure 332 and a gasket 334 that is sealingly compressed between the sensor enclosure and the bottom wall 112.

In the illustrated embodiment, the enclosure 332 comprises a base piece 336 and a cover portion 338 of the mounting bracket 330 that is releasably fastened to the base piece, e.g., via removable fasteners such as screws. The base piece 336 defines a lower wall of the enclosure 332, and a cover portion 338 of the mounting bracket 330 defines an upper wall of the enclosure. In one or more embodiments, the cover portion 338 is connected to the base piece 336 to define an interior chamber 340 (FIG. 37) between the cover portion and the base piece. The time-of-flight sensor board 312 is operatively received in the interior chamber 340 of the enclosure 332. In one or more embodiments, the interior chamber 340 can be environmentally sealed to protect the time-of-flight sensor board 312 received in the interior chamber. For example, a compressible gasket (not shown) can be compressed between the base piece and the cover portion to seal the interface therebetween.

In the illustrated embodiment, the lower wall of the sensor enclosure 332 defines a window opening 342. A window pane 344 is mounted on the lower wall across the window opening 342. Suitably, the window pane 344 is transparent to the optical pulse emitted by the light source 314 of the time-of-flight sensor board 312 and is thus likewise transparent to the photon(s) reflected from the ice and/or ice bin to the photon detector 316.

Figure 37:
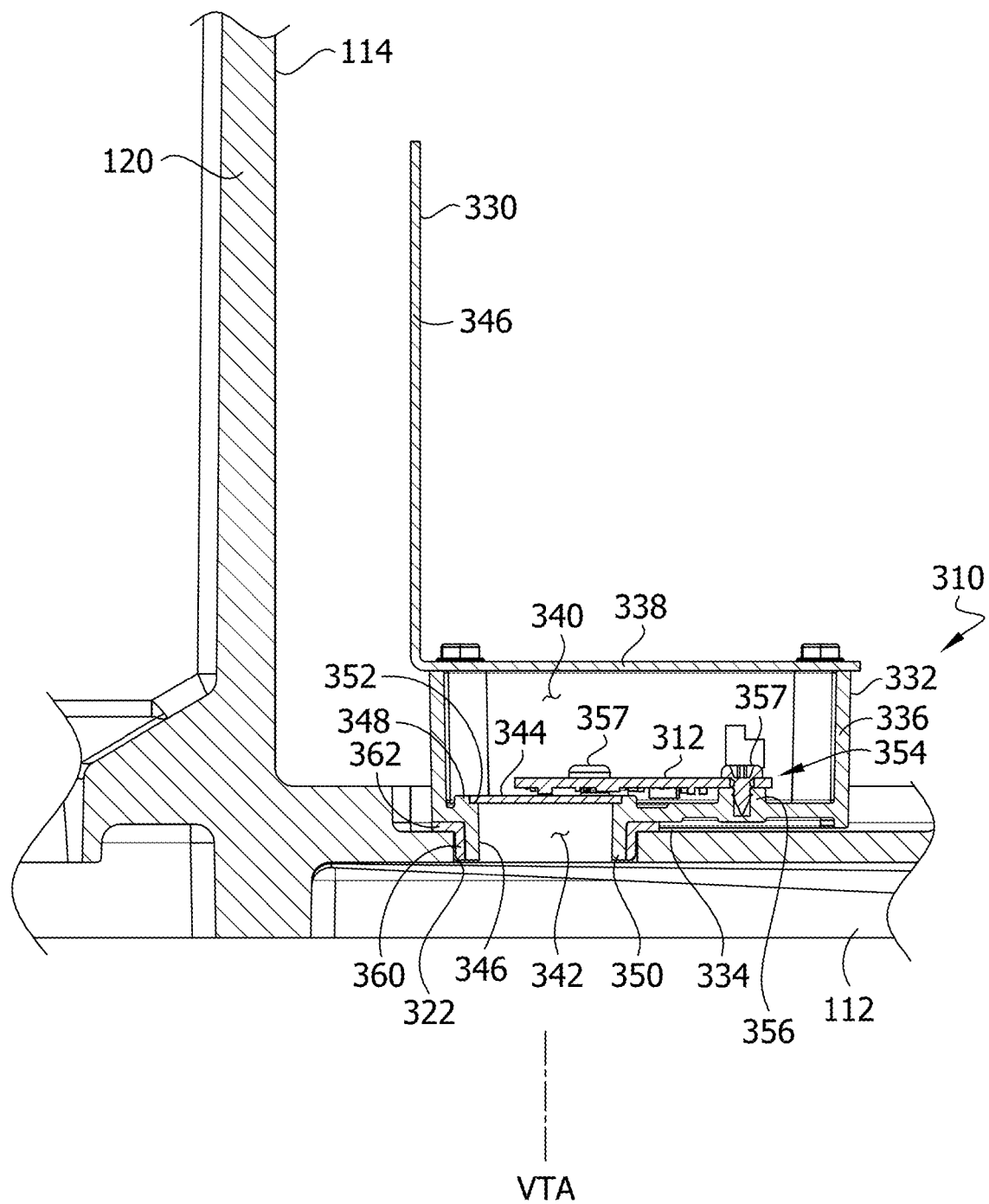
FIG. 37 is a cross section taken in the plane of line 37-37 of FIG. 35.

Referring to FIG. 37, in the illustrated embodiment, the window opening 342 is defined by an annular window frame 346 formed on the lower wall. The window frame includes an inner annular projection 348 that projects upward from the lower wall and an outer annular projection 350 that projects downward from the lower wall. The inner annular projection 348 defines an annular shoulder 352 that supports the window pane 344. Suitably, the window pane is sealingly engaged with the annular shoulder 352 such that the window pane seals the window opening 342. In one or more embodiments, the seal between the window pane 344 and the window frame 346 is created by an adhesive (not shown) that bonds the window pane to the window frame. In certain embodiments, the window pane can be fastened to the window frame such that the window pane compresses an annular gasket (not shown) against the annular shoulder to form the seal between the window pane and the window frame. It will be apparent that providing a seal between the window pane 322 and the lower wall of the base piece 336 enables the sensor enclosure to seal the sensor opening 320.

Referring to FIG. 33, the base piece 336 of the sensor enclosure 332 comprises an integral board mount 354 configured to mount the sensor board 312 in the interior chamber 340 at a precise vertical spacing distance VSD from the window pane 344. For example, the illustrated board mount 354 is configured to mount the board 312 such that the light source 314 is vertically spaced apart from the upper surface of the window pane 344 by a spacing distance VSD of greater than 0.0 mm and less than 0.5 mm (e.g., 0.05 mm to 0.45 mm). The size of the vertical spacing distance VSD is exaggerated in the schematic illustration of FIG. 33 to better illustrating the relationship between the parts. However, FIG. 37 depicts the relative positions of the window pane 344 and the sensor board 312 to scale.

Figure 38:
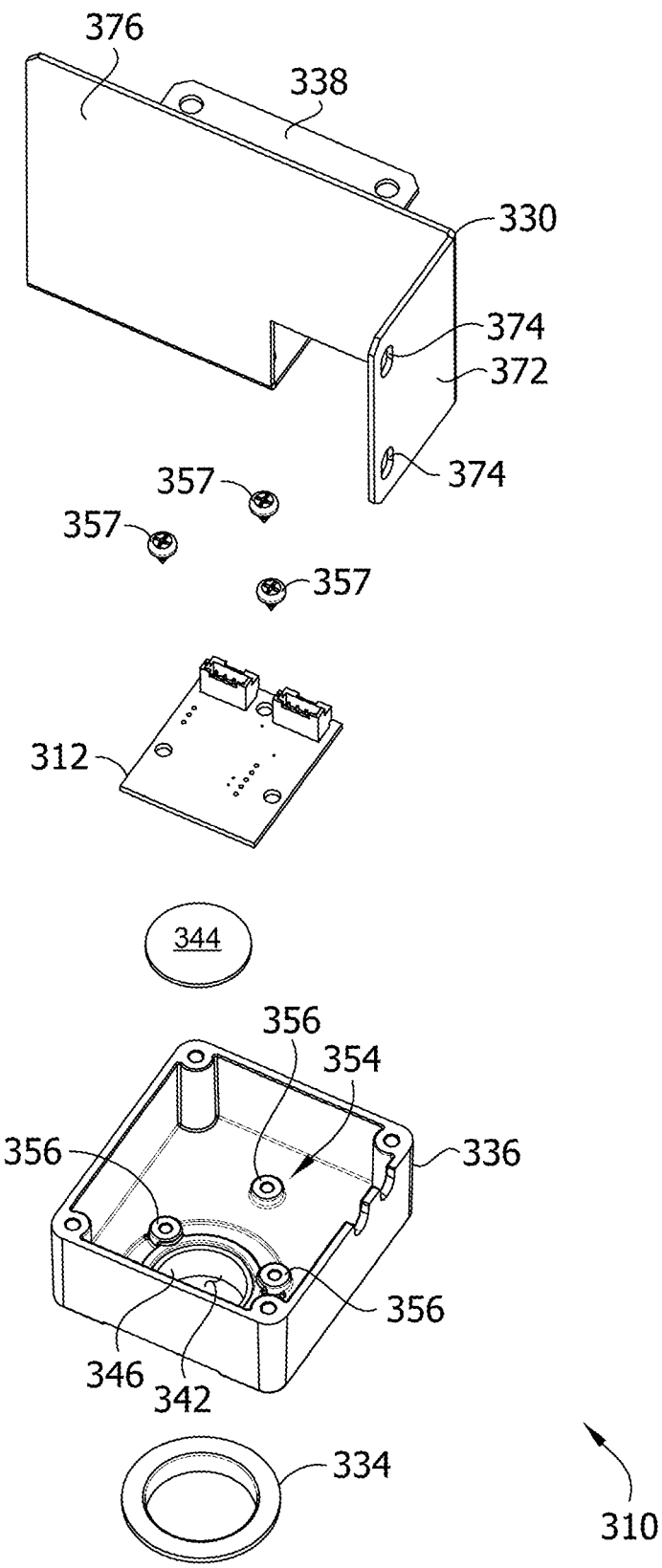
FIG. 38 is an exploded perspective of the time-of-flight sensor.

Any suitable board mount for securely mounting the board at the desired spacing distance VSD may be used without departing from the scope of the disclosure. Referring to FIG. 38, in one or more embodiments, the board mount 354 can comprise at least one integral mounting boss 356 (broadly, at least one or a plurality of integral connection points) that extends upward from the lower wall of the base 336 and or downward from the upper wall of the cover. In the illustrated embodiment, the board mount 354 comprises three spaced-apart mounting bosses 356 that extend upward from the lower wall of the base piece 336. Suitably each mounting boss 356 is configured to receive a removable fastener 357 (e.g., a threaded fastener such as a screw) that extends through a respective fastener opening in the sensor board 312 to fasten the board to the sensor enclosure 332. It can be seen that the mounting bosses 336 have specified heights in relation to the height of the window frame shoulder 352, which ensures that the sensor board 312 is mounted at the proper spacing distance VSD. (In one or more embodiments, the base piece 336 can be an injection molded plastic part manufactured to very tight tolerances to ensure the proper spacing distance VSD).

Referring to FIG. 37, the gasket 334 has a shape (e.g., an inverted top hat shape) that generally corresponds with the bottom portion of the sensor enclosure 332 and the bottom wall 112 of the support 110. For example, the illustrated gasket 334 comprises a tube section 360 configured to extend circumferentially around the outer annular projection 350 of the window frame 346. The tube section 360 has a vertical tube axis VTA and extends along the vertical tube axis from a lower end portion to an upper end portion. An inner perimeter surface of the tube section 360 is configured to conformingly engage an outer perimeter of the outer annular projection 350 about the entire circumference thereof. An outer perimeter surface of the tube section 360 is configured to conformingly engage the inner perimeter surface 322 of the bottom wall 112 of the ice maker support 110 about the entire circumference thereof. In one or more embodiments the tube section 360 is radially compressed (with respect to the vertical tube axis VTA) between the outer perimeter surface of the outer annular projection 350 and the inner perimeter surface 322 of the bottom wall 112.

The illustrated gasket 334 further comprises a flange section 362 that extends radially outward from the upper end portion of the tube section 360. An upper surface of the flange section 362 conformingly engages a bottom surface of the lower wall of the base piece 336 and a lower surface of the flange section 362 conformingly engages the upper surface of the bottom wall 112 adjacent the sensor opening 320. The flange section 362 is axially (with respect to the vertical tube axis VTA) compressed between the lower wall of the base piece 336 and the bottom wall 112 of the support no. Although the illustrated ice maker 10 utilizes a time-of-flight sensor gasket 334 having an inverted top hat shape to seal the sensor opening 310 through which the time-of-flight sensor 310 operates, it will be understood that other configurations for sealing the sensor opening are also possible without departing from the scope of this disclosure.

Referring to FIG. 34, in the illustrated embodiment, the mounting bracket 330 supports the sensor enclosure 332 such that the lower wall of the base piece 336 axially (with respect to the vertical tube axis VTA) compresses the flange section 362 against the bottom wall 112 of the ice maker support no. The mounting bracket 330 comprises a generally vertical, front-to-back-extending mounting flange portion 372 configured to extend along the side wall portion 116 of the vertically extending support wall 114 proximate the sensor mount 324. The mounting flange portion 372 has first and second screw holes 374 through which respective removable fasteners are configured to extend and be releasably affixed to the connection points 326 of the vertically extending support wall 114 to mount the mounting bracket on the vertically extending support wall 114. A generally vertical, laterally extending connecting web portion 376 extends at a transverse (e.g., perpendicular) angle relative to the mounting flange, along the rear wall portion 120 of the vertically extending support wall 114. The generally horizontal cover portion 338 is connected to a bottom end of the connection web portion 376 and extends rearward therefrom over the top of the base piece 336. As explained above, the base piece is fastened to the cover portion 338 to form the sensor enclosure 332.

In addition to providing a highly accurate measurement of ice level under many conditions, the illustrated time-of-flight sensor 310 also advantageously facilitates periodic service of the time-of-flight sensor to maintain ice level measurement accuracy over the life of the ice maker. In one exemplary method of servicing the ice maker 10, an access panel of the cabinet 29 is removed to provide access to the time-of-flight sensor 310. Subsequently, the removable fasteners which connect the mounting bracket 330 to the connection points 326 are removed (e.g., unscrewed). Then, the user can remove the time-of-flight sensor 310 from the ice maker 10 as a unit. For example, in one or more embodiments, the user lifts the enclosure 332 and the mounting bracket 330 together to remove the sensor 310 from the sensor opening 320. In some cases, the gasket 334 may be removed with the enclosure 332; and in other cases, the gasket may remain in the opening 320. In either case, after removing the removable fasteners from the connection points 326, the time-of-flight sensor 310 is separated from the bottom wall 112 of the ice maker 10 to expose the sensor opening 320.

When the time-of-flight sensor 310 is removed, the user can perform various servicing or maintenance tasks. For example, in one or more embodiments, the user may connect a processor to the time-of-flight sensor 310 that updates software or firmware of the time-of-flight sensor, retrieves stored data from the time-of-flight sensor, or performs another control or data processing task. In an exemplary embodiment, the user cleans the outer surface of the window pane 344 when the time-of-flight sensor 310 is removed from the ice maker. Cleaning the window pane 344 involves removing debris and scale (e.g., mineral deposits) that may form on the window pane during use of the ice maker. Maintaining a clean window pane may be important to ensure to the long-term accuracy of the time-of-flight sensor 310. For example, debris and scale may cloud the transparency of the window pane 344 to the photons utilized in the time-of-flight measurement. Thus, periodically removing debris and scale ensures that the time-of-flight sensor 310 consistently functions as intended.

After the window pane 344 has been cleaned and/or another time-of-flight sensor service task has been performed, the sensor 310 can be reinstalled as a unit. The sensor enclosure 332 and bracket 330 are positioned as a unit to cover the sensor opening 320. In addition, the step of repositioning the sensor 310 in the ice maker 10 suitably reestablishes the seal between the enclosure 332 and the bottom wall 112 of the support 110. For example, the time-of-flight sensor 310 is repositioned so that the gasket 334 is compressed between the bottom wall 112 and the enclosure 332. After repositioning the time-of-flight sensor, the removable fasteners are inserted through the holes 374 in the mounting bracket 330 and fastened to the connection points 326 of the vertical support wall 114.

If the time-of-flight sensor 310 ever becomes inoperable, a new time-of-flight sensor can also be installed in the same way that the existing unit is described as being reinstalled above.

Accordingly, it can be seen that the support no and the time-of-flight sensor 310 have been constructed to facilitate periodic removal of the time-of-flight sensor from the ice maker 10. Periodic removal allows the time-of-flight sensor 310 to be maintained, updated, and/or replaced as needed to preserve the accuracy of the ice level sensing measurements. Moreover, the ice maker 10 facilitates removal and reinstallation/replacement of the time-of-flight sensor 310 in such a way that ensures that the seal of the food-safe side of the ice maker is preserved when the time-of-flight sensor is placed in the operative position. Furthermore, because the time-of-flight sensor 310 is mounted in the mechanical systems side of the ice maker 10, it remains out of the way of ice harvest during use.

In certain embodiments, the time-of-flight sensor may be configured automatically determine the size of the ice bin on which the ice maker is mounted. For example, in one or more embodiments, the controller is configured to automatically execute an ice bin size determination routine when the ice maker is powered on. Similar to the ice level measuring routines described above, after the ice maker is powered on and set up, the controller causes the time-of-flight sensor, during its first operation or operations performed after start-up (e.g., before the ice maker has begun making ice after start-up), to emit, at a first time, an optical pulse signal through the sensor opening toward the ice bin; detect, at a second time, a photon of the optical pulse signal that returns to the time-of-flight sensor through the sensor opening after reflecting off of one of a floor of the ice bin; and determine a duration between the first time and the second time. However, during the first time-of-flight measurement routine performed after start-up, the controller may be configured to automatically determine a size of the ice bin based on the determined duration. In one or more embodiments, the ice maker can have predefined ice bin definitions stored in memory, and the controller can automatically determine which model of ice bin the ice maker is mounted on by comparison of the determined duration of the first time-of-flight routine executed after start-up with the predefined ice bin definitions. After determining the size and/or model of the ice bin, the controller can store an indication thereof in memory and use that information when assessing the amount of ice in the bin during subsequent time-of-flight-based ice level sensing routines conducted generally as described above. Awareness of the size of the bin may provide richer data from which to execute ice level-based control of the ice maker.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A method of servicing an ice maker, the method comprising:
   removing a time-of-flight sensor from the ice maker;
   cleaning a window pane on a sensor enclosure of the time-of-flight sensor; and
   reinstalling, after said cleaning the window pane, the time-of-flight sensor in the ice maker;
   wherein said removing the time-of-flight sensor comprises separating the time-of-flight sensor from a bottom wall of the ice maker to expose a sensor opening in the bottom wall;
   wherein said reinstalling the time-of-flight sensor comprises covering the sensor opening and forming a seal between the time-of-flight sensor and the bottom wall.

2. The method of claim 1, wherein the time-of flight sensor is configured to:
   emit, at a first time, an optical pulse signal through the sensor opening toward the ice bin,
   detect, at a second time, a photon of the optical pulse signal that returns to the time-of-flight sensor through the sensor opening after reflecting off of one of a floor of the ice bin and ice in the ice bin, and
   determine a duration between the first time and the second time, the duration being usable to determine an amount of ice in the ice bin.

3. The method of claim 1, wherein the time-of-flight sensor comprises a sensor enclosure having a lower wall defining a window opening and wherein the window pane is mounted on the lower wall across the window opening.

4. The method of claim 3, wherein the time of flight sensor further comprises a sensor board including a light source configured to emit the optical pulse signal through the window pane.

5. The method of claim 4, wherein the lower wall defines a window pane mount and a board mount, the window pane mount configured to mount the window pane in the sensor enclosure and the board mount configured to mount the sensor board in the sensor enclosure so that the light source is spaced apart from the window pane by a heightwise gap having a predefined height.

6. The method of claim 5, wherein the predefined height is less than 0.5 mm.

7. The method of claim 5, wherein the board mount includes at least three connection points formed on the lower wall, the time-of-flight sensor further comprising a removable fastener fastened to each connection point to secure the sensor board to the sensor enclosure.

8. The method of claim 4, wherein the sensor enclosure has a sealed interior chamber and the sensor board is received in the sealed interior chamber.

9. The method of claim 3, wherein the time-of-flight sensor further comprises a gasket configured to be compressed between the lower wall of the sensor enclosure and the bottom wall of the ice maker.

10. The method of claim 9, wherein the sensor enclosure comprises an outer annular projection projecting from the lower wall, the outer annular projection configured to be received in the sensor opening along a thickness of the bottom wall.

11. The method of claim 10, wherein the gasket comprises a tube section having a lower end portion and an upper end portion, the gasket further comprising a flange section extending outward from the upper end portion of the tube section.

12. The method of claim 11, wherein the flange section is configured to be compressed between an upper surface of the bottom wall and the lower wall and the tube section is configured to be compressed between the outer annular projection and an inner perimeter surface of the bottom wall that defines the sensor opening.

13. The method of claim 1, wherein said reinstalling the time-of-flight sensor comprises compressing a flange section of a gasket of the time-of-flight sensor between a sensor enclosure of the time-of-flight sensor and an upper surface of the bottom wall.

14. The method of claim 13, wherein said reinstalling the time-of-flight sensor comprises compressing an annular projection of the gasket between the sensor enclosure and an inner perimeter surface of the bottom wall defining the sensor opening.

15. The method of claim 1, wherein said reinstalling the time-of-flight sensor comprises compressing an annular projection of a gasket of the time-of-flight sensor between a sensor enclosure of the time-of-flight sensor and an inner perimeter surface of the bottom wall defining the sensor opening.

16. The method of claim 1, wherein said removing the time-of-flight sensor comprises removing a fastener securing the time-of-flight sensor to a sensor mount integrally formed in a vertical support wall extending up from the bottom wall.

17. The method of claim 16, wherein said removing the fastener releases a bracket of the time-of-flight sensor from the vertical support wall.

18. A method of using an ice maker serviced after the ice maker is serviced by the method of claim 1, the method comprising: emitting, at a first time, an optical pulse signal from a time-of-flight sensor through a sensor opening formed in a bottom wall of an ice maker mounted on the ice bin for depositing the ice into the ice bin; detecting, at a second time, a photon of the optical pulse signal that returns to the time-of-flight sensor through the sensor opening after reflecting off of one of a floor of the ice bin and ice in the ice bin; and determining a duration between the first time and the second time.

19. A method of servicing an ice maker, the method comprising:

removing a time-of-flight sensor from the ice maker;
cleaning a window pane on a sensor enclosure of the time-of-flight sensor; and
reinstalling, after said cleaning the window pane, the time-of-flight sensor in the ice maker;
wherein said removing the time-of-flight sensor comprises separating the time-of-flight sensor from a wall of the ice maker to expose a sensor opening in the wall;
wherein said reinstalling the time-of-flight sensor comprises forming a seal between the time-of-flight sensor and the wall.

20. The method of claim 19, wherein said reinstalling the time-of-flight sensor comprises compressing a flange section of a gasket of the time-of-flight sensor between a sensor enclosure of the time-of-flight sensor and an upper surface of the wall.

21. The method of claim 20, wherein said reinstalling the time-of-flight sensor comprises compressing an annular projection of the gasket between the sensor enclosure and an inner perimeter surface of the wall defining the sensor opening.

22. The method of claim 19, wherein said reinstalling the time-of-flight sensor comprises compressing an annular projection of a gasket of the time-of-flight sensor between a sensor enclosure of the time-of-flight sensor and an inner perimeter surface of the wall defining the sensor opening.

23. The method of claim 19, wherein said wall of the ice maker is a horizontal wall, said removing the time-of-flight sensor comprising removing a fastener securing the time-of-flight sensor to a sensor mount integrally formed in a vertical support wall extending up from the horizontal wall.

24. The method of claim 23, wherein said removing the fastener releases a bracket of the time-of-flight sensor from the vertical support wall.

* * * * *